Jan. 7, 1964  E. P. MOSLO  3,116,516
BOTTLE BLOWING MACHINE
Filed Dec. 23, 1960  18 Sheets-Sheet 1

INVENTOR.
ERNEST P. MOSLO
BY
ATTORNEYS

Jan. 7, 1964  E. P. MOSLO  3,116,516
BOTTLE BLOWING MACHINE
Filed Dec. 23, 1960  18 Sheets-Sheet 5

INVENTOR.
ERNEST P. MOSLO
BY
Meyer, Baldwin, Doran & Young
ATTORNEYS

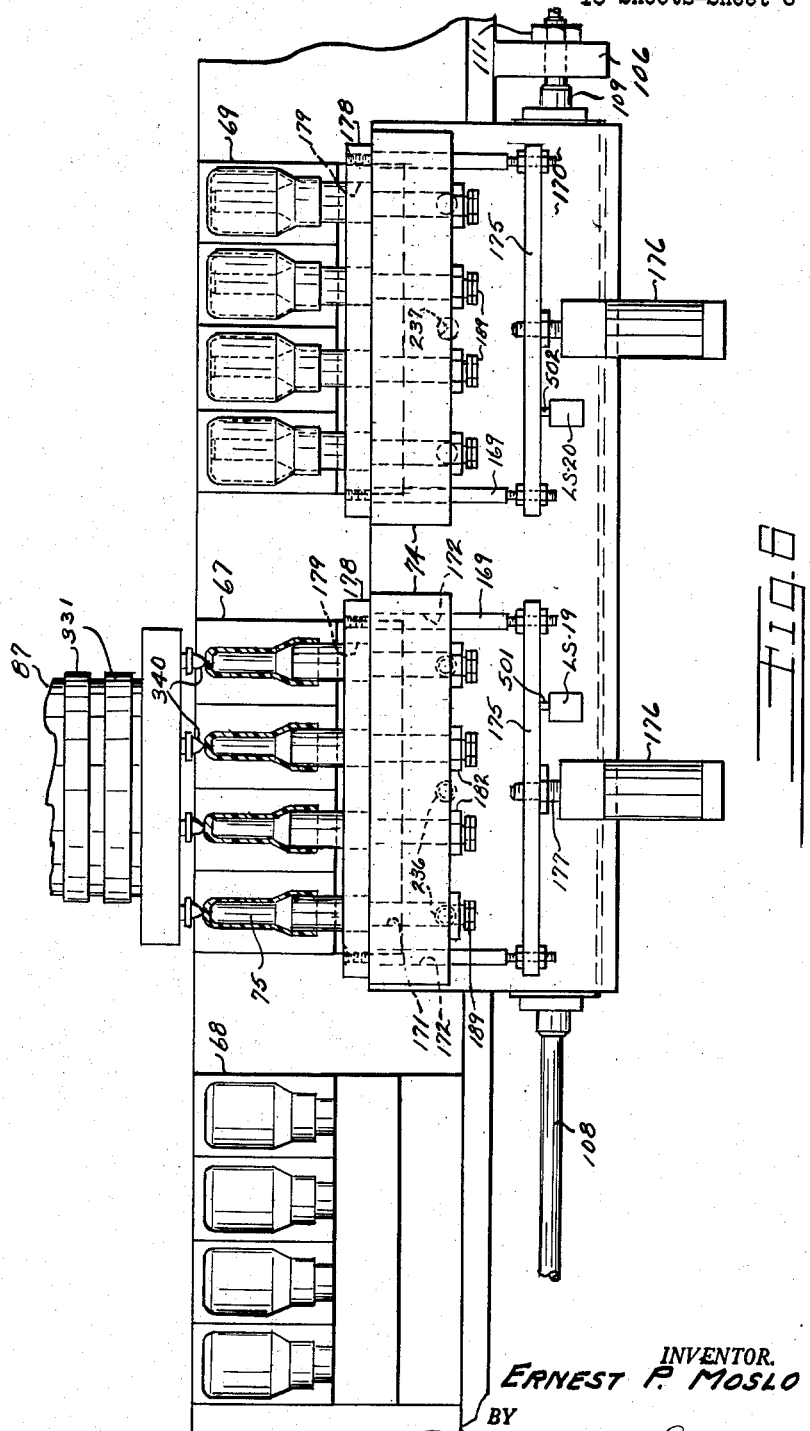

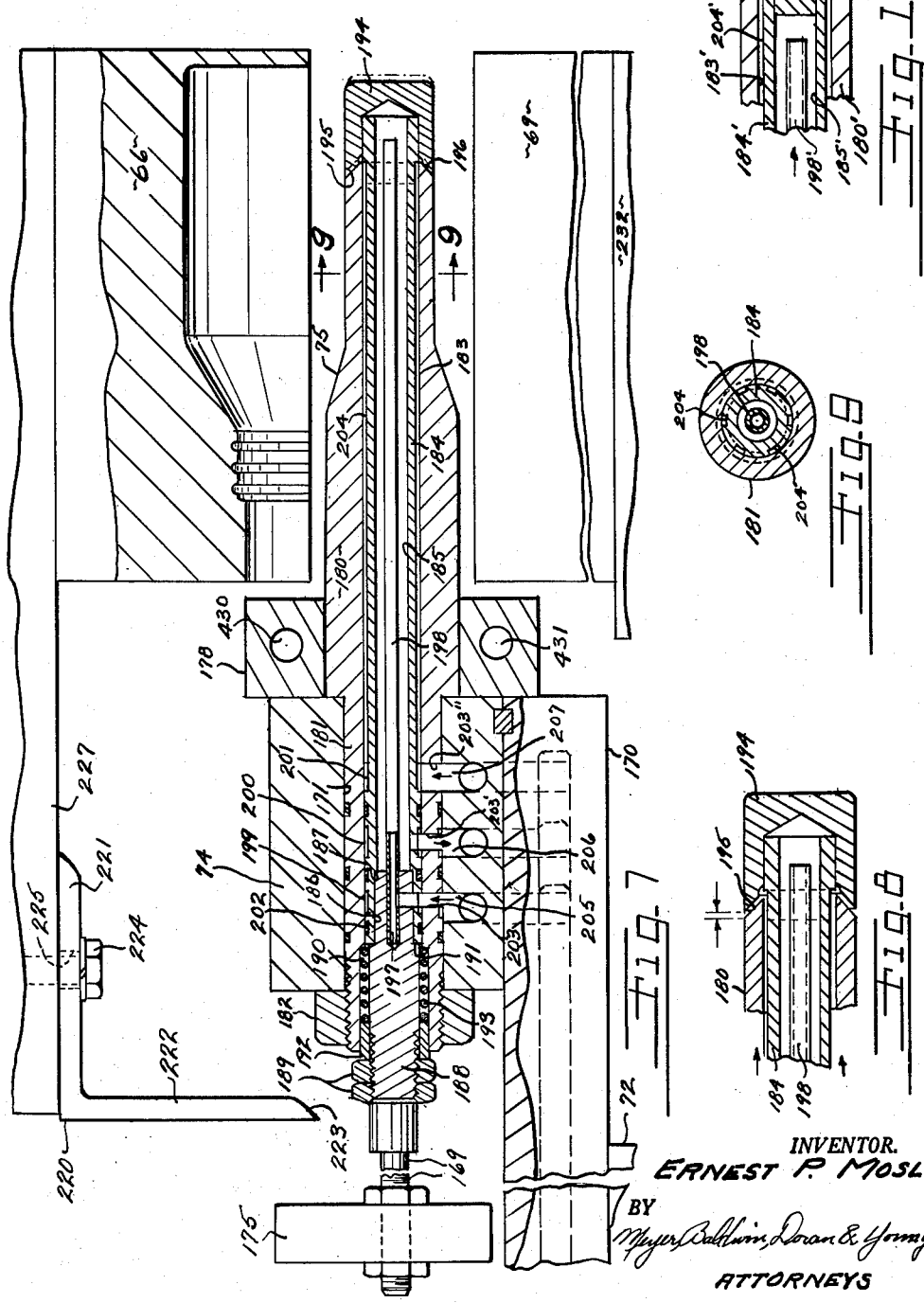

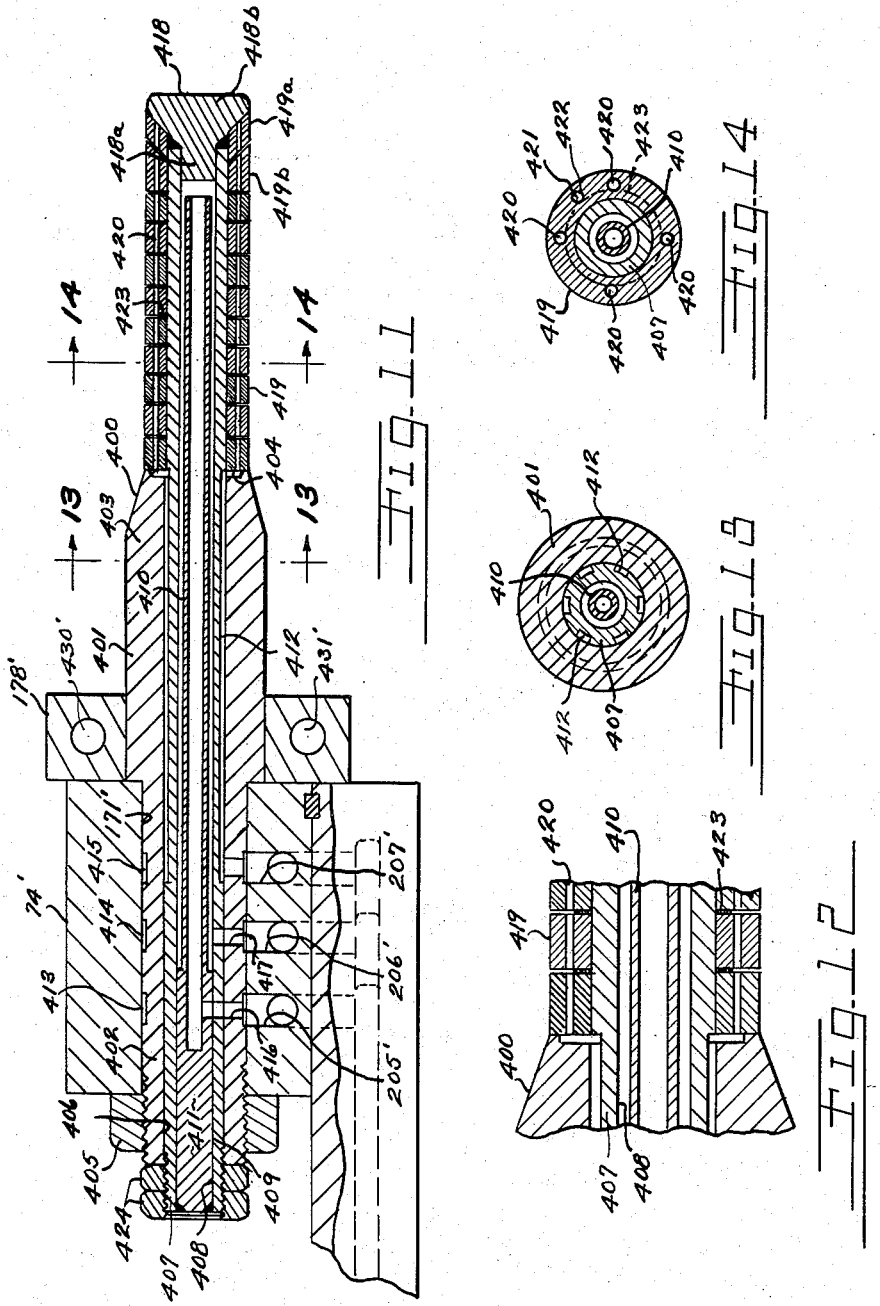

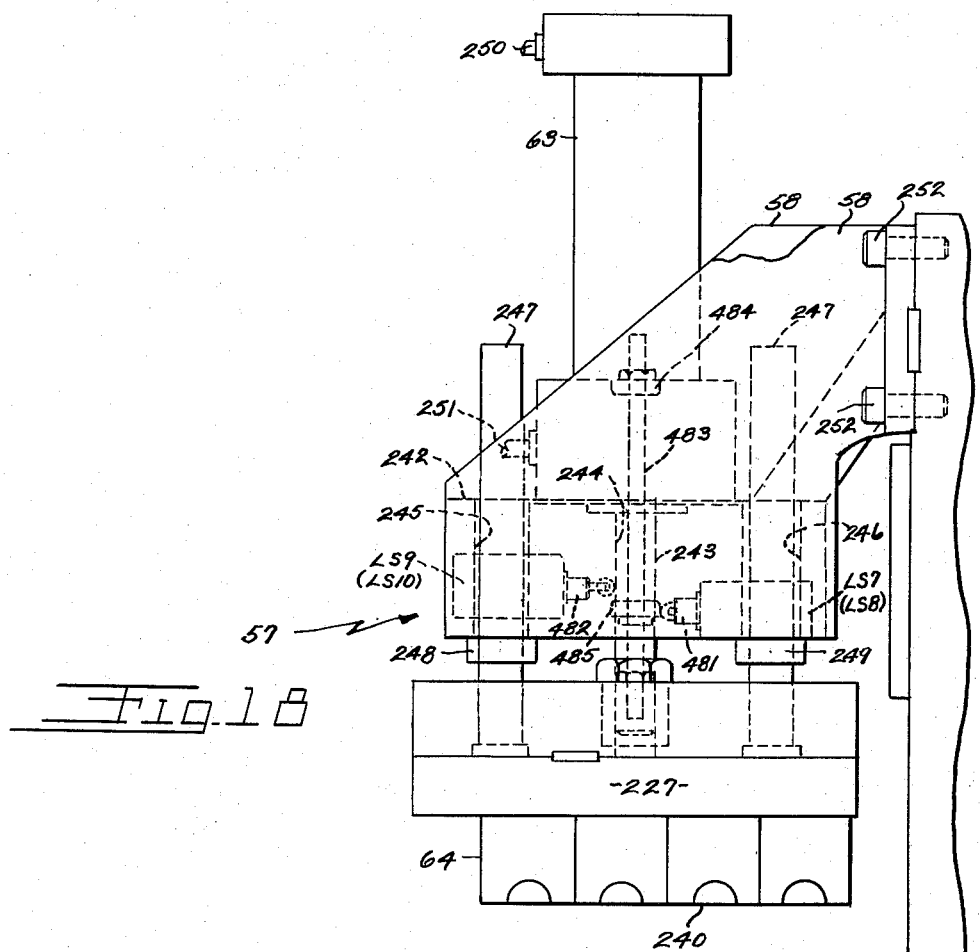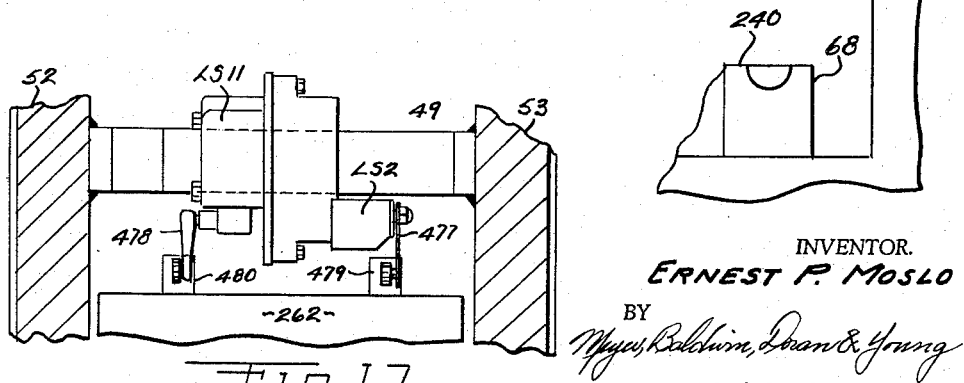

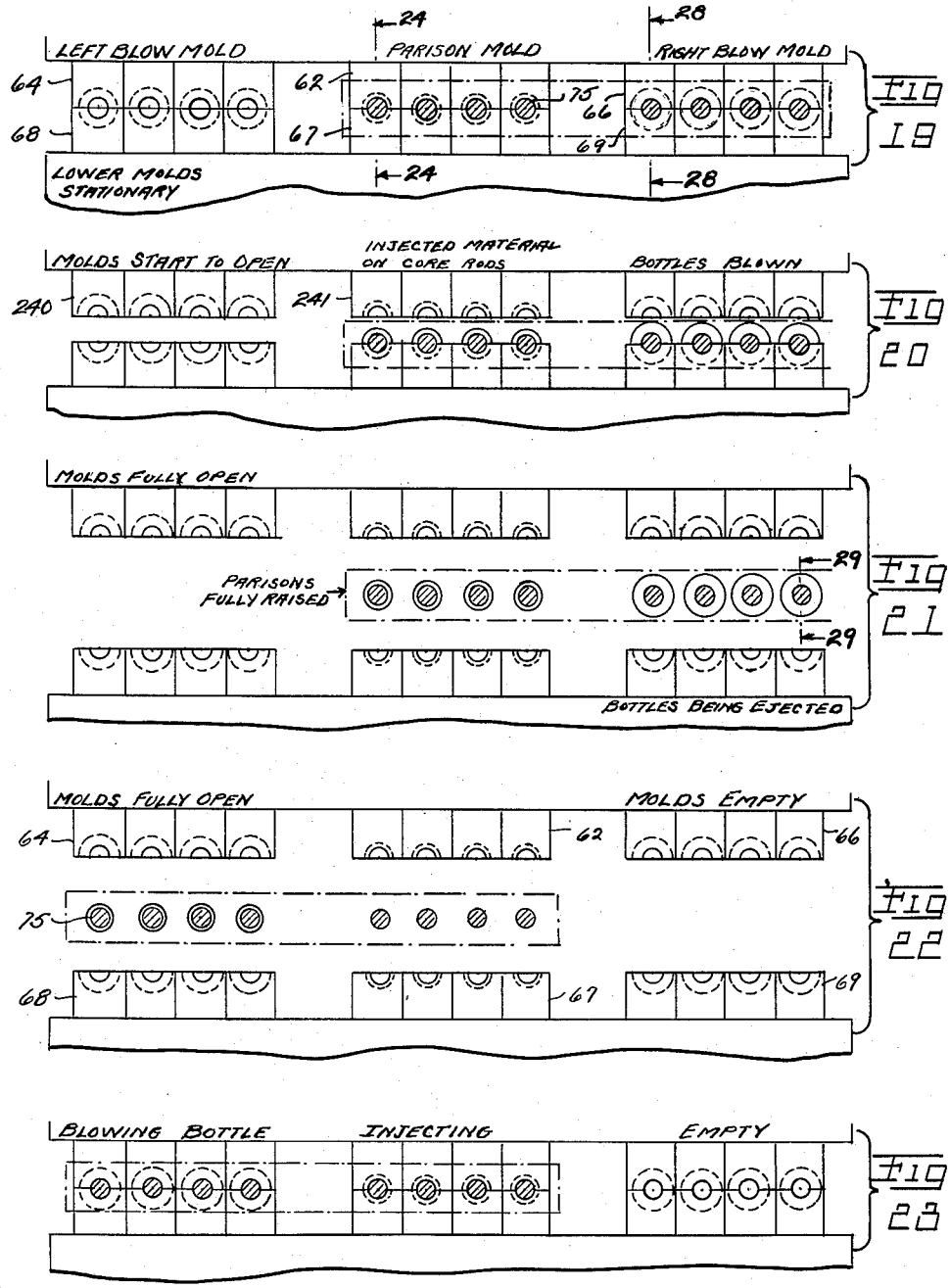

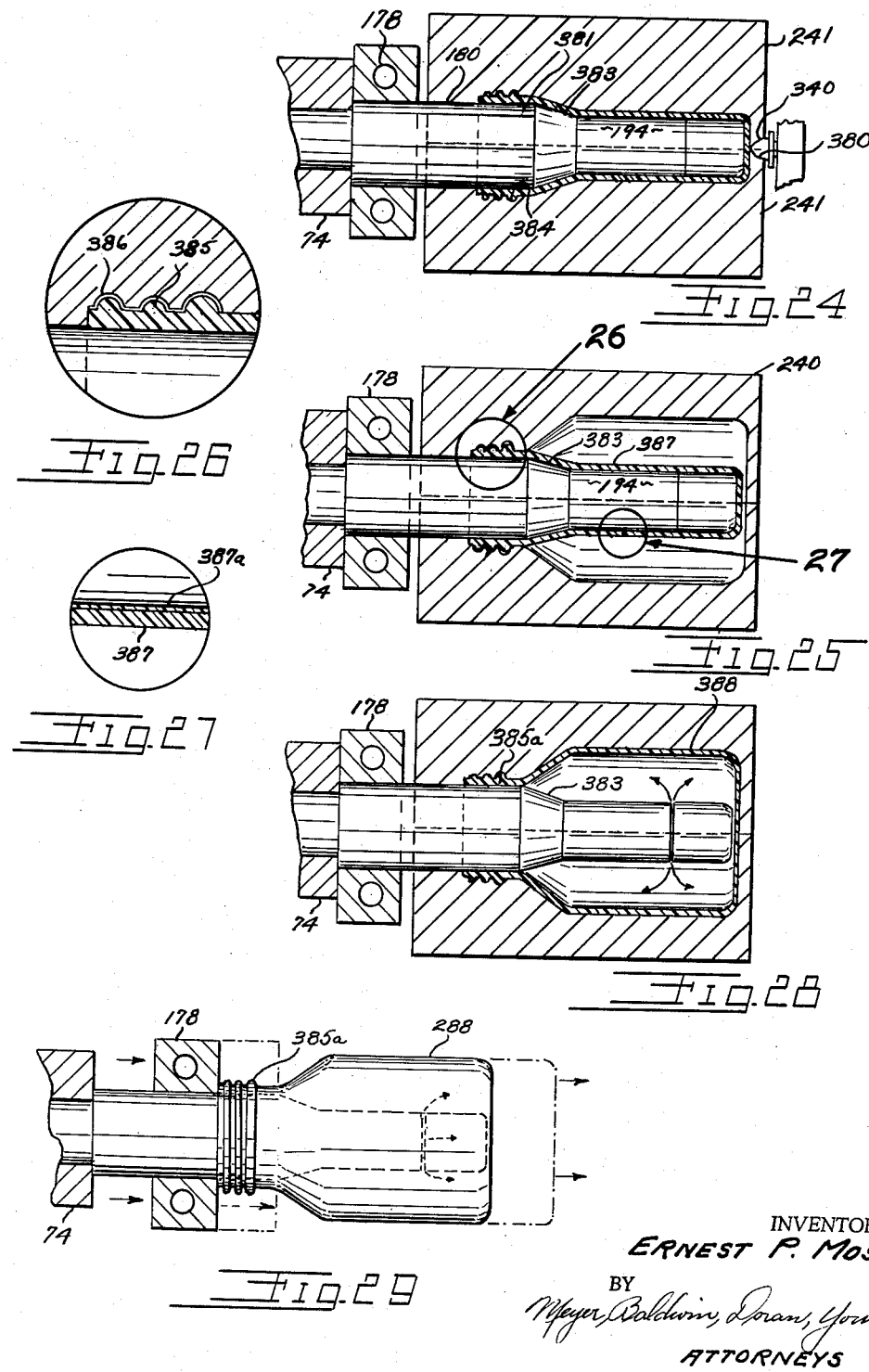

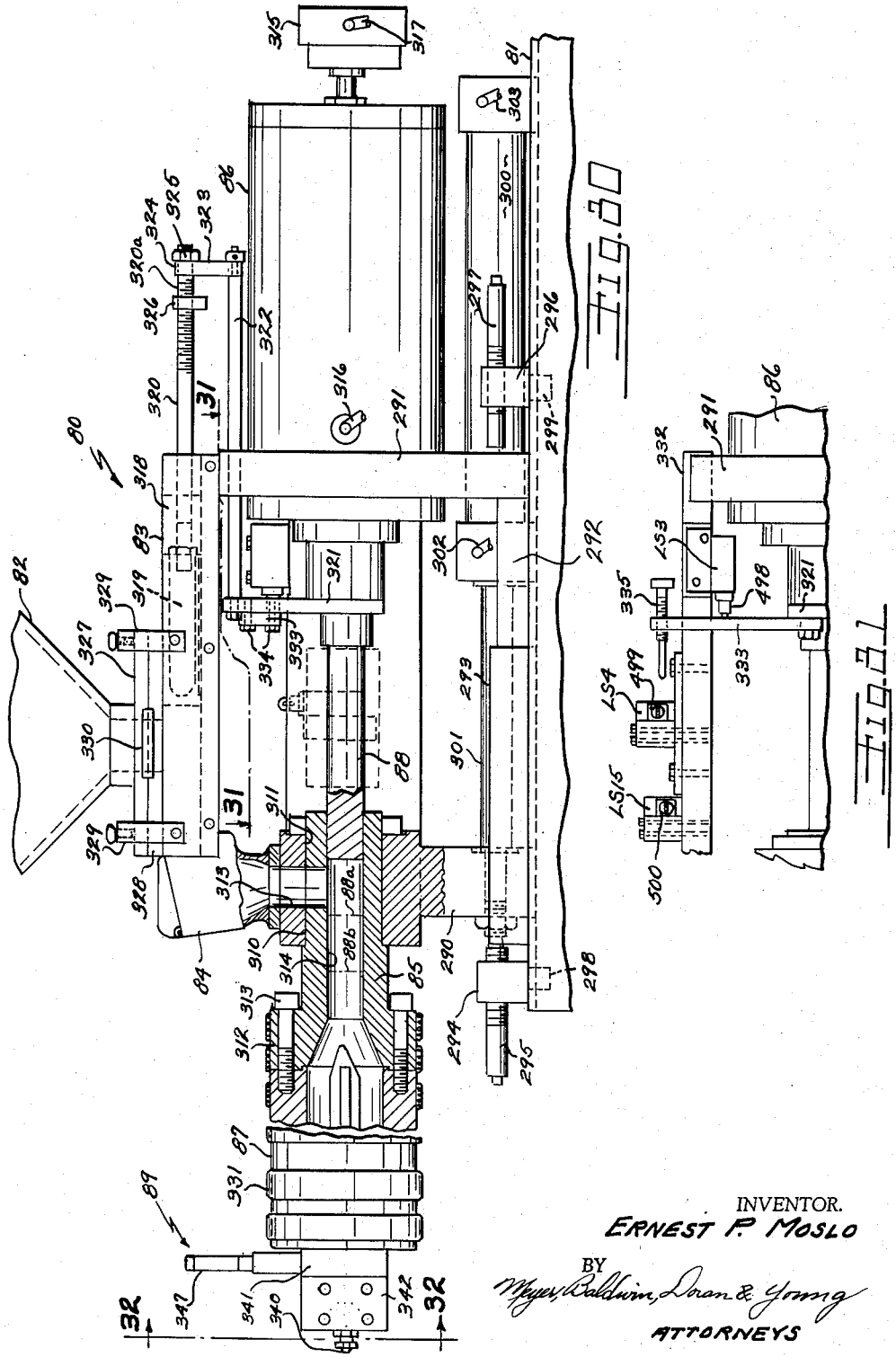

Jan. 7, 1964 — E. P. MOSLO — 3,116,516
BOTTLE BLOWING MACHINE
Filed Dec. 23, 1960 — 18 Sheets-Sheet 14

INVENTOR.
ERNEST P. MOSLO
BY
Meyer, Baldwin, Doran & Young
ATTORNEYS

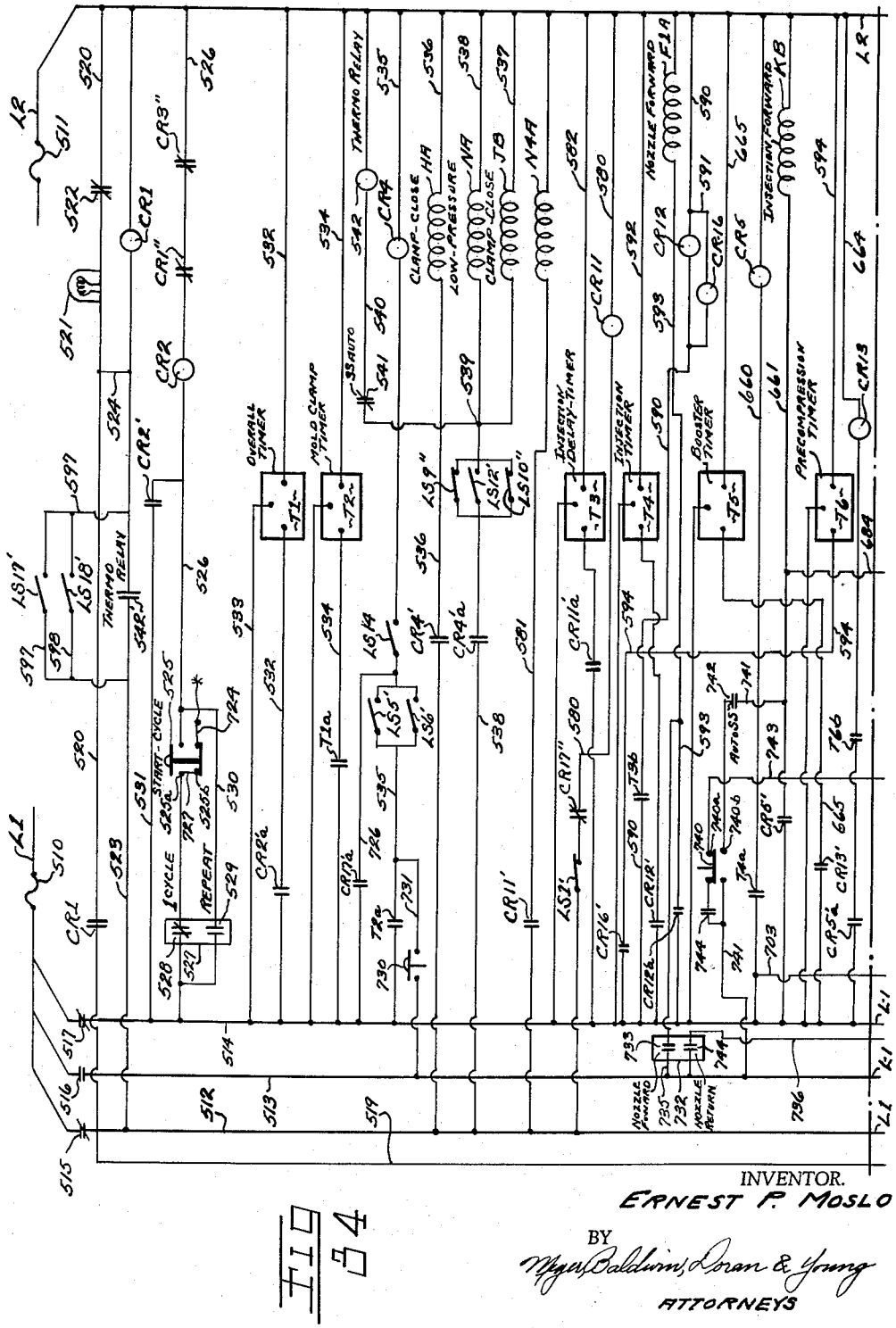

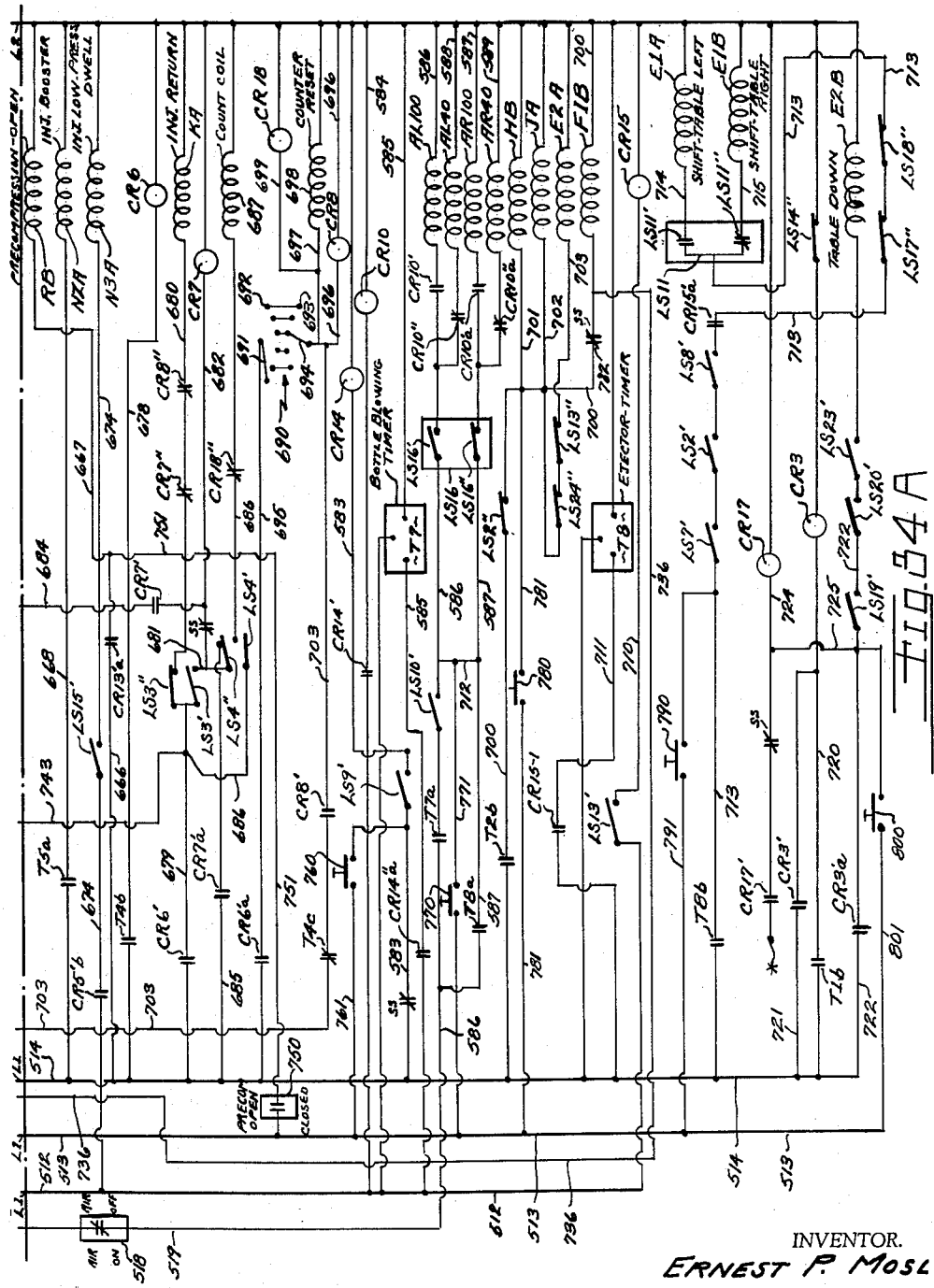

Jan. 7, 1964     E. P. MOSLO     3,116,516
BOTTLE BLOWING MACHINE
Filed Dec. 23, 1960     18 Sheets-Sheet 17
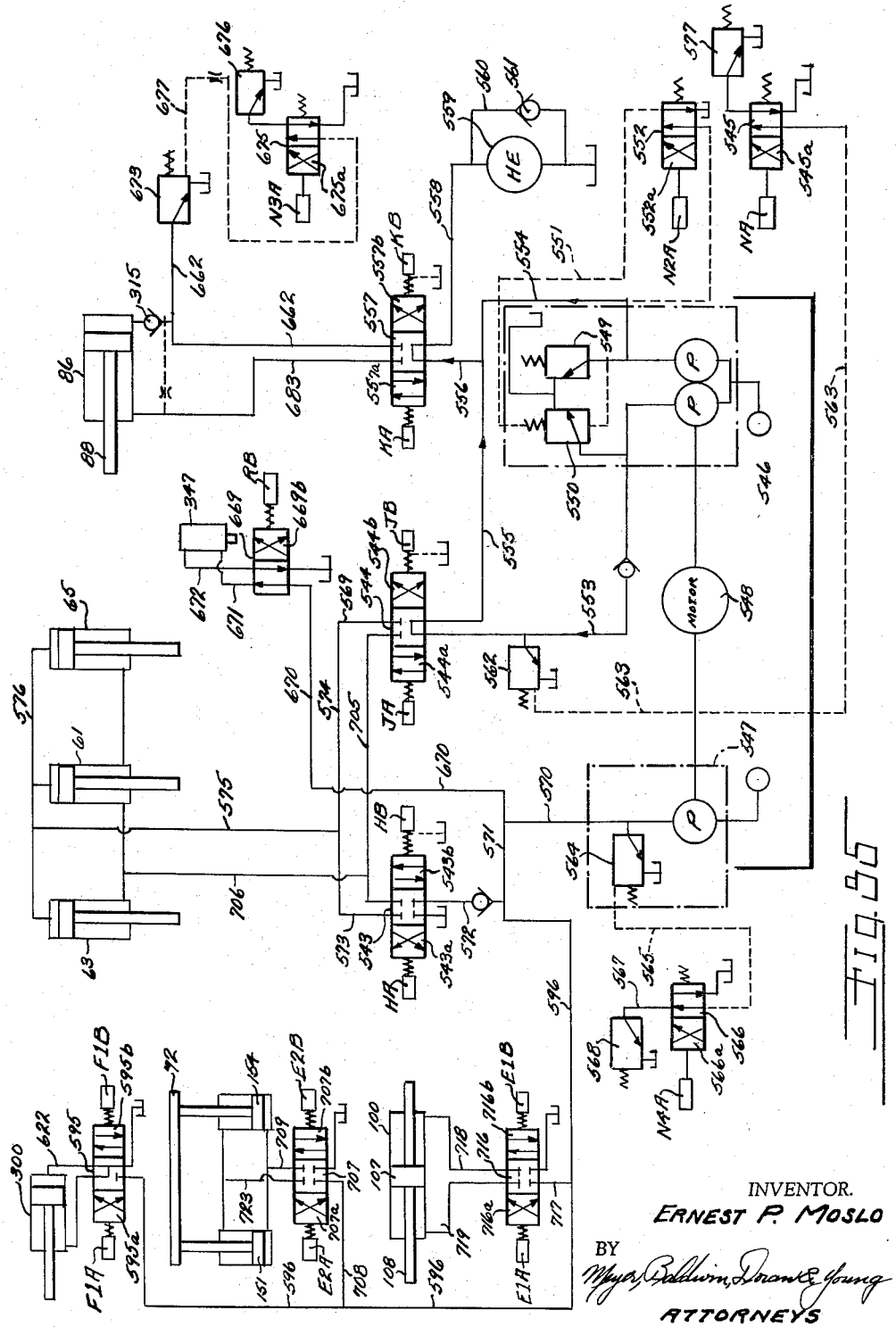
INVENTOR.
ERNEST P. MOSLO
BY
ATTORNEYS Jan. 7, 1964  E. P. MOSLO  3,116,516
BOTTLE BLOWING MACHINE
Filed Dec. 23, 1960  18 Sheets-Sheet 18

INVENTOR.
ERNEST P. MOSLO
BY
Meyer, Baldwin, Doran & Young
ATTORNEYS

United States Patent Office 3,116,516
Patented Jan. 7, 1964

3,116,516
BOTTLE BLOWING MACHINE
Ernest P. Moslo, 2443 Prospect Ave., Cleveland, Ohio
Filed Dec. 23, 1960, Ser. No. 78,100
20 Claims. (Cl. 18—5)

This invention relates generally to the art of forming hollow objects out of thermoplastic materials such as polyethylene, polystyrene, or vinyl and more particularly to a machine for making bottles or similar articles by the method of inflating a preformed parison of flowable plastic inside a hollow mold of desired shape whereby the plastic is forced outwardly in every direction until it conforms to the mold walls.

Basically, the present invention as herein illustrated and described comprises three molds with corresponding mold clamps positioned side-by-side and two unitarily mounted groups of parison core rods adapted to be selectively disposed within adjacent pairs of the molds. The groups of core rods are mounted upon a vertically movable and laterally shiftable table and extend horizontally outwardly into the area of the molds whereby when the molds are closed, the core rods are disposed therein. Each mold comprises a plurality of individual mold units corresponding to the number of core rods in each group. The central mold is adapted for the injection molding of parisons upon the core rods, and the side molds are adapted for blow molding the finished articles.

Injection means is provided adjacent the parison mold for plasticizing granular molding material of the type referred to and injecting it into the closed molds to form the parisons upon, for example, a first group of core rods. Concurrently with the injection of the plastic, air is introduced under pressure through the second or remaining group of core rods disposed within one of the side molds whereby previously formed parisons thereon are blown into completed articles.

Subsequent to the above, the molds are opened by the clamps, all of the core rods are raised by the table, and the finished articles are ejected from the second group of core rods disposed adjacent the side mold. The table then shifts laterally whereby the first group of core rods with their newly formed parisons are transferred to the opposite mold, this movement simultaneously disposing the second group of core rods in alignment with the parison molds. The core rods are then lowered, the molds are closed, and the above cycle is repeated; the parisons are injection molded upon the second group of core rods while the articles are blown by the first group of core rods, the clamps are opened, the core rods are raised, and the newly blown articles are ejected.

The primary object of the present invention is to provide a machine of the type as set forth above wherein the various elements of the machine are so operatively interrelated and controlled as to be fully automatic in use and completely adaptable to a wide variety of thermoplastic materials of the type suitable for blow molding. To attain this end, means are provided for carefully controlling the temperature of the plastic at every stage of production including means for regulating the temperature of the core rods, parison mold, blow molds, and ejection apparatus as well as the plasticized molding material within the injection means.

A further objective is to provide control means regulating and timing each movement and operation of the machine automatically whereby it repeats the manufacturing cycle indefinitely without further manipulation by an operator.

A still further object is to provide, in a machine having the above characteristics, safety interlocks between the various operating elements which make it impossible for the machine to operate in other than the correct manner. These interlocks are aimed at protecting persons near the machine as well as the machine itself against damage caused by inadvertent interference with the operation of the machine or the improper operation of a single part. Such interlocks also prevent waste of time and material such as would be caused by the continuing operation of a faulty machine.

This invention also contemplates specific improvements in the individual operating elements of the machine as well as improvements in the interrelation between different elements such as will become readily evident from the following specification and the accompanying drawings, in which said drawings:

FIG. 6 is a top plan view of the molds and table showing the parisons in section, the direction of the view being indicated by the line 6—6 of FIG. 3;

FIG. 7 is a longitudinal section of a core rod and a blow mold associated therewith;

FIG. 8 is a detail sectional view of the end of the core rod of FIG. 7 enlarged and showing it in another position;

FIG. 9 is a transverse section taken along the line 9—9 of FIG. 7;

FIG. 10 is a view similar to FIG. 8 showing a modified end portion of a similar core rod;

FIG. 11 is a view similar to FIG. 7 showing another embodiment of the core rod;

FIG. 12 is an enlarged detail of a mid portion of the core rod as shown in FIG. 11;

FIG. 13 is a transverse section taken along the line 13—13 of FIG. 11;

FIG. 14 is a transverse section taken along the line 14—14 of FIG. 11;

FIG. 17 is a fragmental section taken along the line 17—17 of FIG. 16;

FIG. 18 is a front elevation of the left hand mold clamp assembly;

FIGS. 19 through 23 are schematic views showing, in sequential steps, the relative motions of the molds and core rods;

FIG. 24 is an enlarged section taken along the line 24—24 of FIG. 19;

FIG. 25 is a section of a core rod with parison positioned in a closed blow mold just prior to blowing the article;

FIG. 27 is an enlarged detail as indicated in the circle 27 of FIG. 25;

FIG. 28 is an enlarged section taken along the line 28—28 of FIG. 19;

FIG. 29 is a view in full lines of a completed article positioned on a core rod just prior to ejection of the article, with dot-dash lines showing the direction of ejection;

FIG. 30 is an enlarged side view of the material injection assembly mechanism of FIG. 1 shown in partial section;

FIG. 31 is a fragmental plan view of a portion of the material injection assembly as seen from the line 31—31 of FIG. 30;

FIG. 32 is a front elevational view of the injector manifold as seen from the line 32—32 of FIG. 30;

FIG. 33 is a fragmental vertical section taken along the line 33—33 of FIG. 32;

FIG. 34—34A is a diagrammatic showing of the electrical circuits for operating the machine;

FIG. 35 is a diagrammatic showing of the hydraulic system of this machine; and

FIG. 36 is a diagrammatic showing of the pneumatic circuits of this invention.

Figure 1:
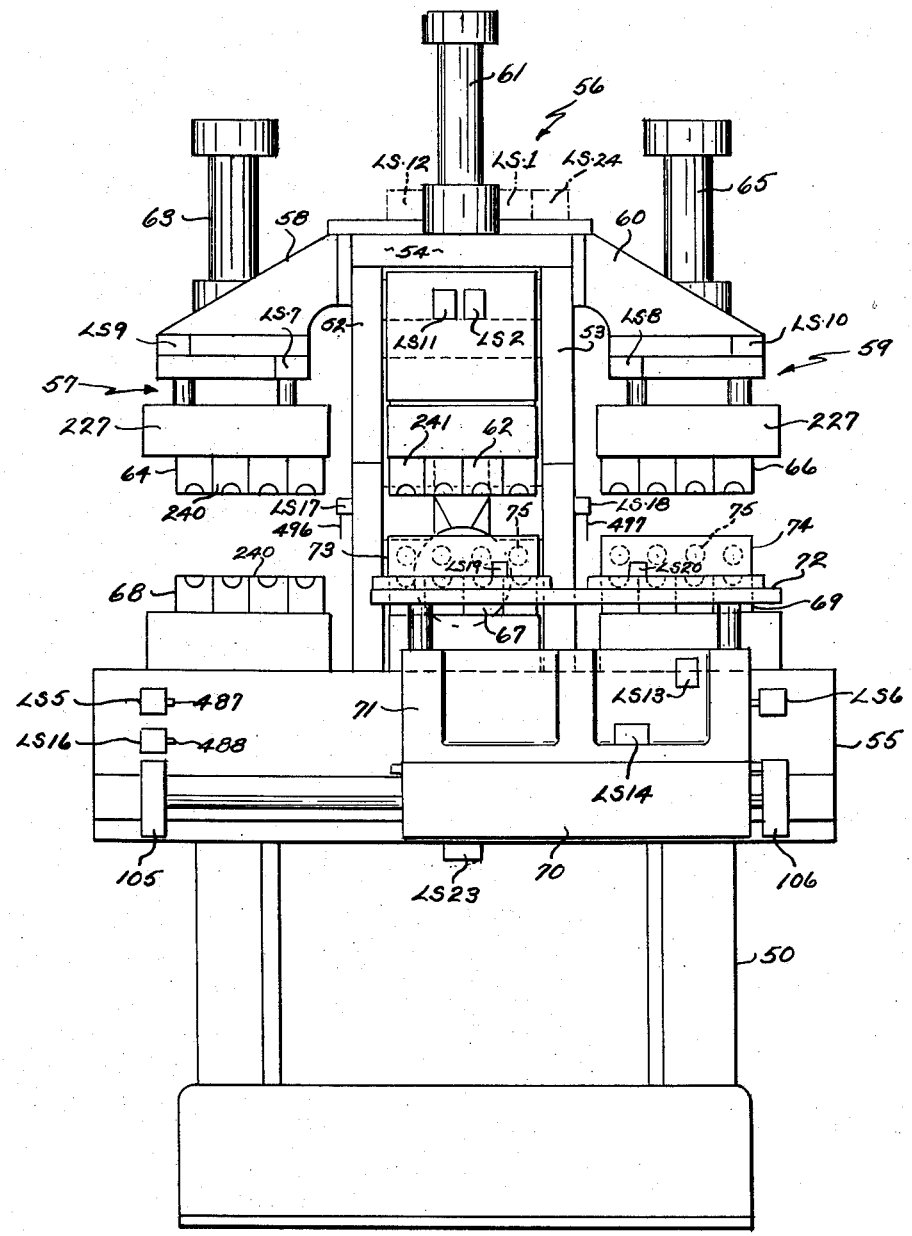
FIG. 1 is a front elevation of the bottle blowing machine of this invention.
Figure 2:
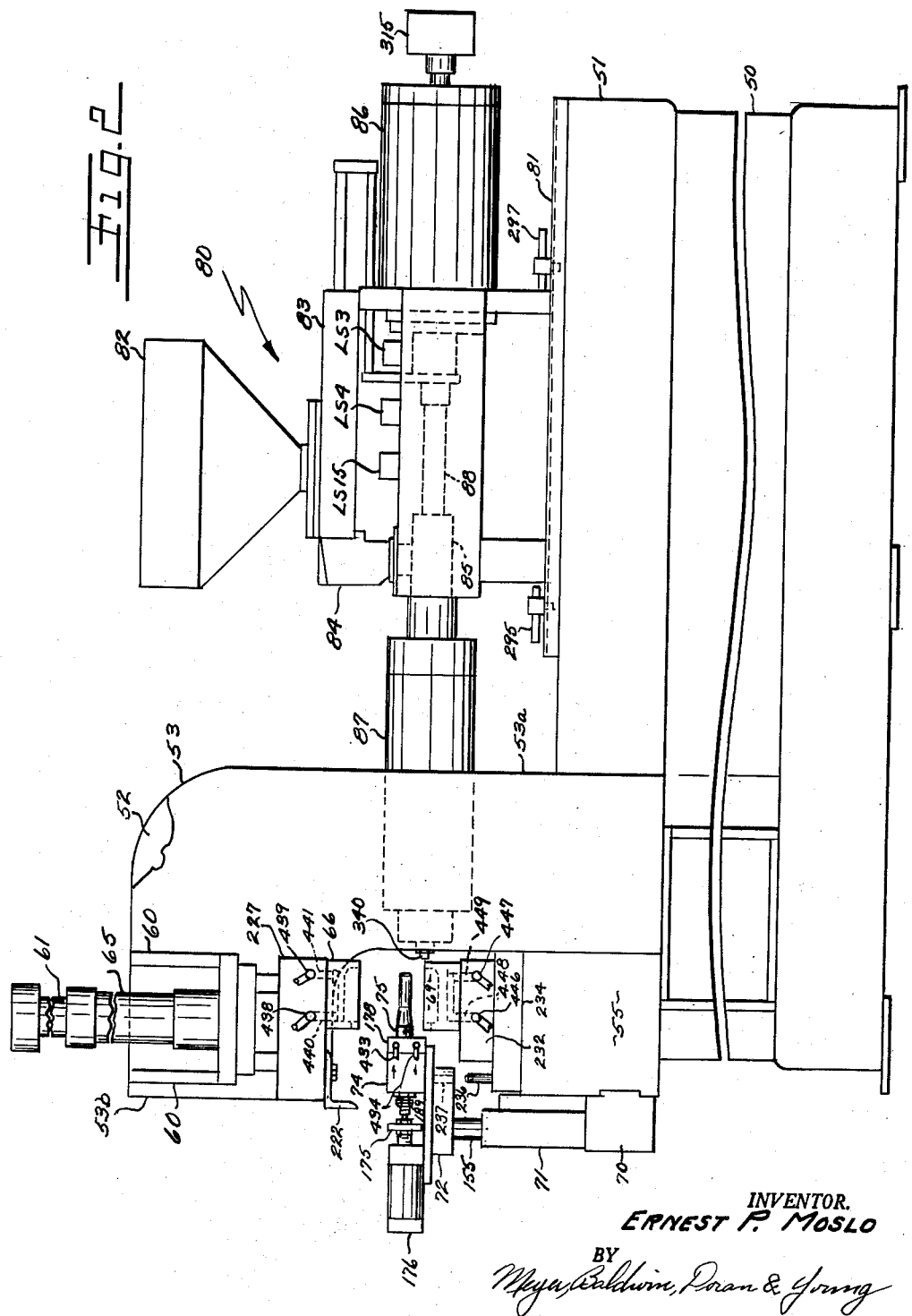
FIG. 2 is a side elevation of the machine as shown in FIG. 1.

Referring now to the drawings in which like parts are designated by like reference numerals, FIGS. 1 and 2 show, generally, the machine of this invention which comprises a supporting frame 50 upon which the various operating elements of the machine are unitarily mounted. As well shown in FIG. 2, the frame 50 supports a bed 51 adjacent the rear of the machine in front of which is provided a pair of upwardly projecting, forwardly extending, parallel mold clamp supporting members 52 and 53. The mold clamp supporting members are laterally spaced a uniform distance on either side of the center line of the machine and are rigidly connected adjacent the upper ends thereof by means of a cross member or plate 54. The mold clamp supporting members 52 and 53 are of identical configuration having vertically upright portions 52a—53a and right angularly disposed, forwardly cantilevered portions 52b—53b. Adjacent the lowermost ends of the upright portions 52a—53a and directly beneath the forwardly cantilevered portions 52b—53b, there is provided a lower mold support base 55. The base 55 extends laterally across the front of the machine and extends in either lateral direction beyond the limits of the frame 50 as well shown in FIG. 1.

It will be understood that the bed 51, the mold clamp supporting members 52—53, and the lower mold support base 55 are all unitarily and solidly mounted upon the frame 50 in any suitable manner.

The forwardly projecting portions 52b and 53b provide mounting means for a parison mold clamp assembly 56 positioned therebetween. A left blow mold clamp assembly 57 is mounted upon the outer side of the supporting member 52 by means of laterally projecting brackets 58. In a similar manner, a right blow mold clamp assembly 59 is secured to the laterally facing, outer surface of the supporting member 53 by means of the brackets 60. The parison mold clamp assembly 56 includes a vertically reciprocably acting cylinder and piston motor 61 adapted to vertically move an upper parison mold half 62. In a similar manner, the mold clamp assemblies 57 and 59 include cylinder and piston motors 63 and 65 adapted to vertically move upper blow mold halves 64 and 66 respectively.

The support base 55 supports the lower mold halves beneath each of the mold clamp assemblies. The lower parison mold half is indicated at 67 and is fixedly secured in the center of the support base 55 to complementarily engage the upper parison mold half 62 when said upper mold half is lowered by means of the cylinder 61. In like manner, lower blow mold half 68 is fixedly secured to the base 55 beneath the upper blow mold half 64, and lower blow mold half 69 is rigidly mounted beneath the upper blow mold half 66.

A table shifting assembly 70 is mounted upon the forward face of the support base 55 and is adapted to reciprocate laterally between the position as shown in FIG. 1 wherein it is disposed generally beneath the parison mold and the right blow mold to a position whereby said assembly 70 would be positioned generally beneath said parison mold and the left blow mold. The table shifting assembly 70 supports and carries with it in its lateral movement the parison core rod holder assembly indicated at 71. The core rod holder assembly 71 comprises generally a vertically shiftable table 72 upon which are mounted a pair of laterally spaced core rod holders 73 and 74. As seen in FIG. 1, the core rod holder 73 is disposed on the left side of the table 72 whereas the other core rod holder 74 is disposed on the right side. In this position, core rods shown at 75 which are associated with the left core rod holder 73 are positioned between the parison mold halves 62, 67, and those core rods associated with the right core rod holder 74 are positioned between the right-hand blow mold halves 66 and 69. It will be understood that when the table shifting assembly 70 moves all the way to the left, the core rods of left-hand core rod holder 73 would be disposed between the blow mold halves 64, 68 while simultaneously the core rods of the right-hand holder 74 would be disposed between the parison mold halves 62, 67.

Referring now to FIG. 2 of the drawings, the bed 51 supports a material injection assembly which is generally indicated at 80. Said material injection assembly is adapted for movement toward and away from the lower parison mold half 67 by means of a slideway 81 which is securely mounted upon the upper surface of the bed 51. The material injection assembly 80 comprises a hopper 82 into which the molding material is initially placed in its granular state. A material feed mechanism 83 transfers the granular molding material in predetermined amounts forwardly to a funnel 84 from which it drops into a packing cylinder 85. Rearwardly of said packing cylinder there is provided an injection cylinder 86 having a forwardly and rearwardly reciprocating ram 88 adapted to propel the downcoming granular molding material in a forward direction into a material heating chamber or plasticizing head 87. The material heating chamber 87 is so positioned adjacent the parison molds and in communication with spaced nozzles 340 (FIGS. 32, 33) that when said parison molds are closed upon the core rods, parisons are injection molded upon said core rods by means of the material injection assembly as will later appear.

It will be understood that the overall views of the machine of this invention as shown in FIGS. 1 and 2 are greatly simplified in a semischematic manner to more readily clarify the relative positions of the main operating elements of the machine. Details of each of the major elements are clearly shown in subsequent views which will be described and discussed in detail.

Figure 3:
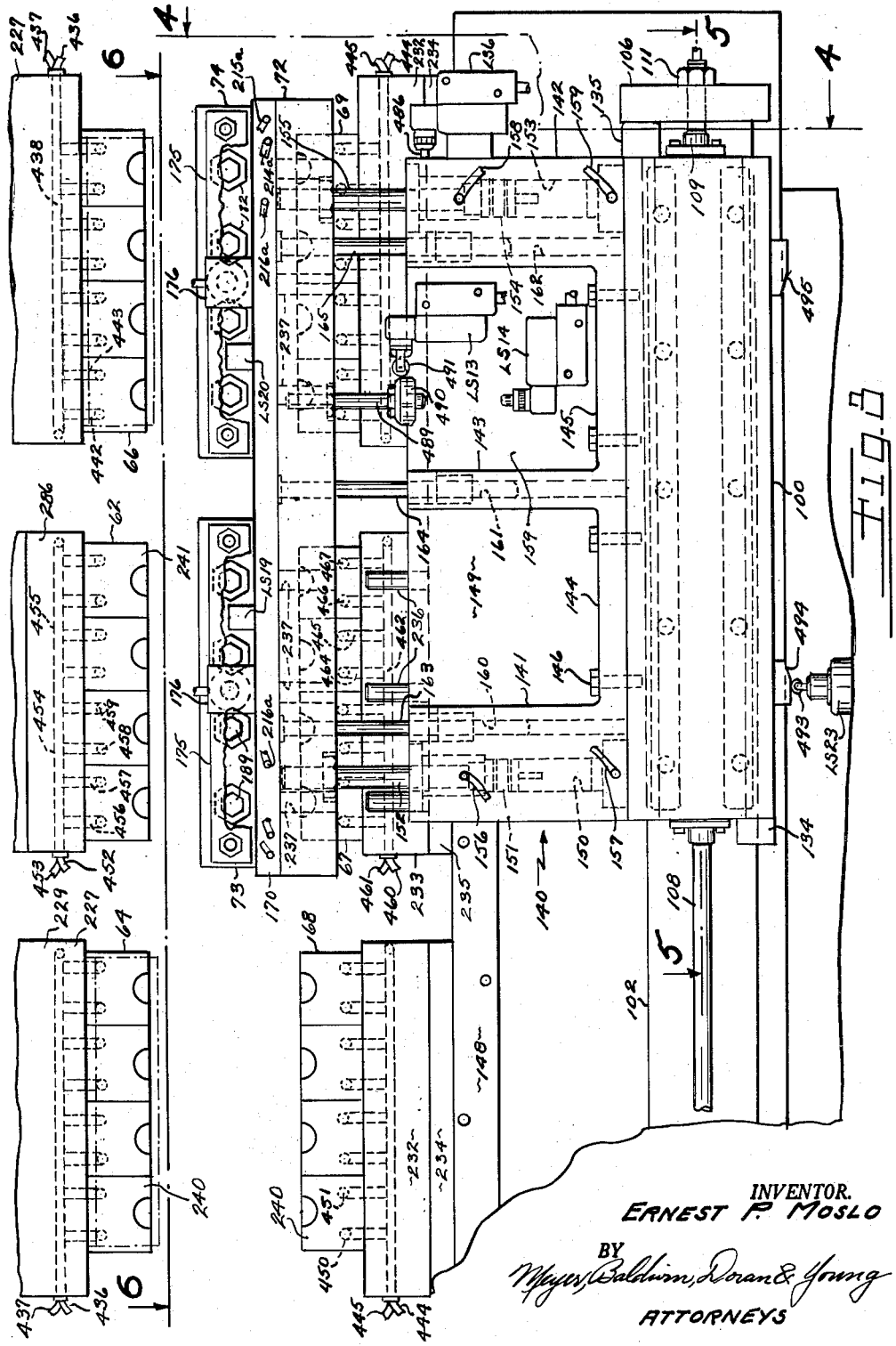
FIG. 3 is an enlarged front elevation of the molds and the core rod table support assembly.
Figure 4:
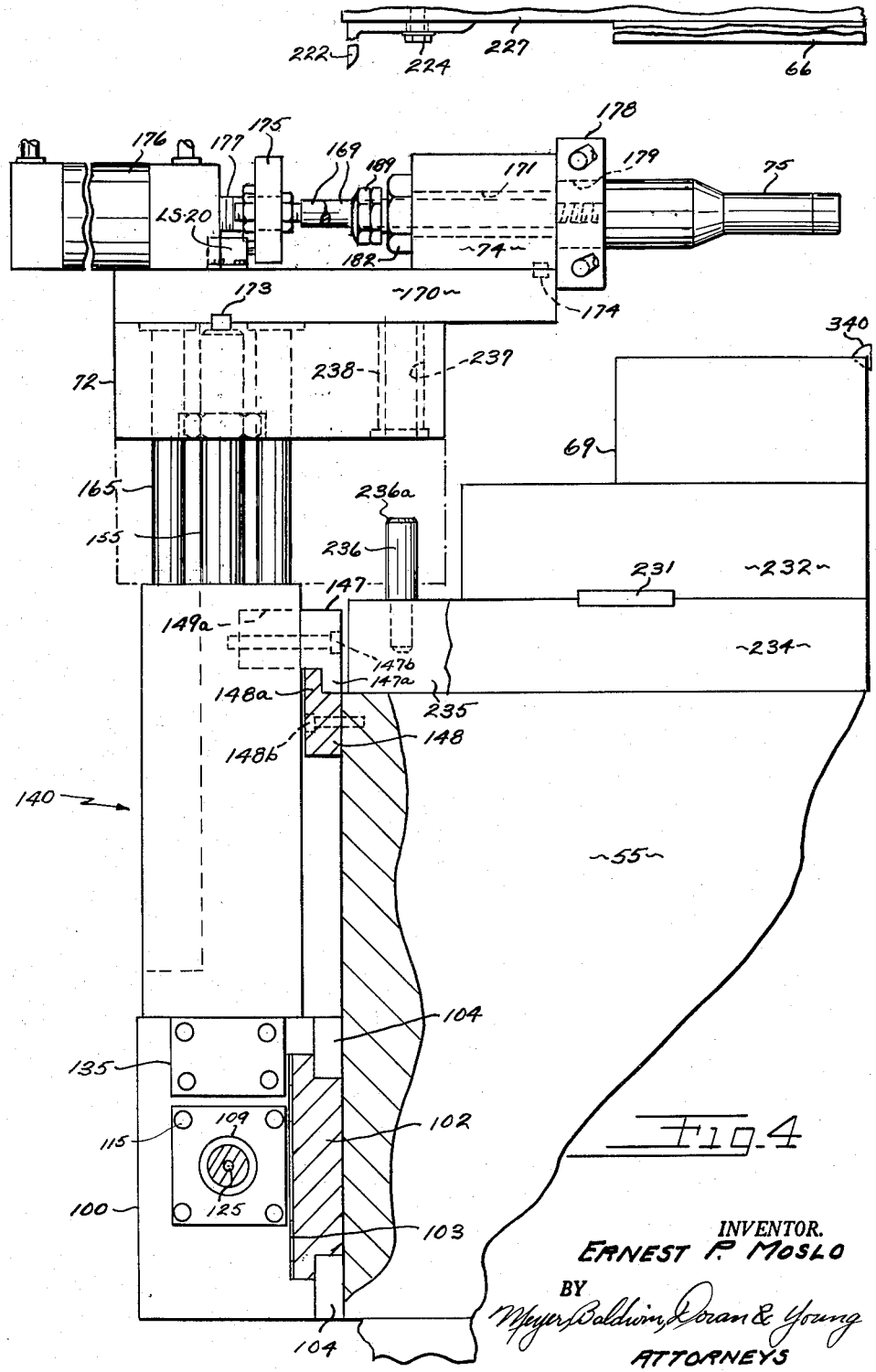
FIG. 4 is an enlarged detail in partial section taken along the line 4—4 of FIG. 3.
Figure 5:
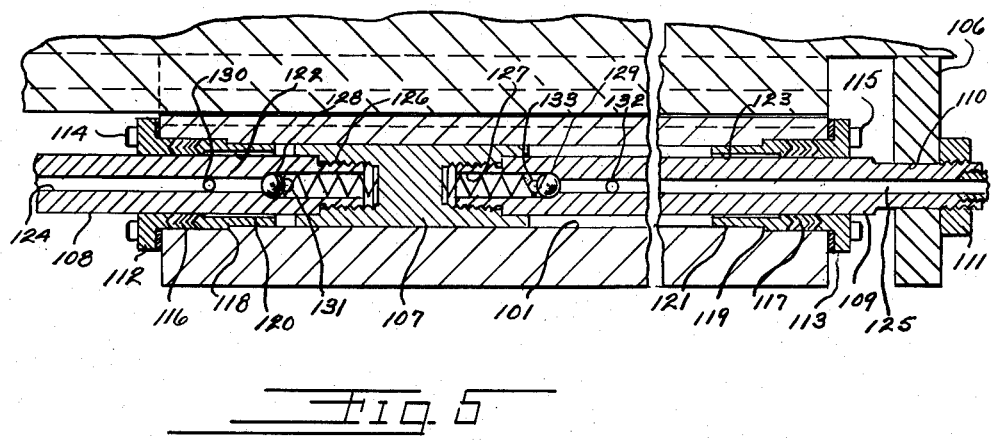
FIG. 5 is a fragmental longitudinal section taken along the line 5—5 of FIG. 3.

Referring now particularly to FIGS. 3, 4, and 5, the table shifting assembly 70 comprises a laterally movable, generally rectangular housing 100 which is longitudinally bored to provide a cylinder 101 therethrough. The housing 100 is slidably mounted to the forward face of the support base 55 by means of a T-shape track 102. The housing 100 is recessed as indicated at 103 (FIG. 4) said recess running longitudinally the length of said housing and adapted to slidably fit over and abut the upwardly and downwardly facing edges of the T-shape track 102. Mounting gibs 104 are secured to said housing at the rearward face thereof and extend partially over the recess 103 whereby said housing is maintained in slidable engagement with the track 102.

As well shown in FIG. 1, stops 105 and 106 are provided adjacent the ends of the track 102, said stop 105 being positioned adjacent the left-hand end of said track and stop 106 being positioned adjacent the right-hand end of said track. The stops 105—106 extend forwardly from the forward face of the support base 55 adjacent the bottom of said base and support therebetween a piston 107 by means of a pair of oppositely extending piston rods 108 and 109. The piston rods 108 and 109 are thread fitted at their inner ends into the ends of the piston 107, the piston rod 108 extending outwardly toward the left side of the machine and the piston rod 109 extending outwardly toward the right side of the machine. The outer ends of said piston rods project through suitable apertures 110 in the stops 105—106 and are rigidly secured to said stops in any suitable manner such as by means of a nut 111.

As best shown in FIG. 5, the cylinder 101 is capped at the left- and right-hand ends thereof respectively by means of cylinder caps 112 and 113. The caps 112 and 113 are provided with radially extending flanges whereby they are bolted to the housing 100 by means of bolts 114 and 115 respectively. Said caps extend inwardly of the cylinder 101 and compress suitable packing material as indicated at 116 and 117 whereby the piston rods 108 and 109 are respectively sealed relative to the cylinder 101. Inwardly of the packing 116 and 117 the cylinder 101 is stepped diametrically inwardly as indicated at 118 and 119 respectively whereby it is adapted to receive complementary stepped sleeves 120 and 121. The inner peripheral surfaces of the sleeves 120 and 121 are additionally stepped diametrically outwardly a slight distance to provide areas of clearance between the piston rods 108 and 109 as indicated at 122 and 123. The clearance as indicated at 122 and 123 is preferably quite small, for example approximately .004 of an inch, and the purpose of these clearances will be herein later fully described.

The piston rods 108 and 109 are tubular in shape having central bores 124 and 125 respectively. The inwardly directed ends of the piston rods which are thread fitted within the piston 107 are provided with outwardly stepped bores 126 and 127. The stepped bores 126 and 127 are concentric with the main bores 124 and 125, the outwardly directed ends of said stepped bores providing seating means for spring pressed ball checkes 128 and 129. The piston rod 108 is provided with a radially extending aperture 130 positioned outwardly from the ball check 128 and another aperture 131 inwardly behind said ball check. In a similar manner, the piston rod 109 is provided with a radially extending aperture 132 positioned outwardly or to the right of the ball check 129 (FIG. 5) and a second aperture 133 inwardly of or behind said ball check.

Lateral reciprocation of the housing 100 relative to the support base 55 is effected by alternately introducing fluid under pressure through one or the other of the hollow piston rod 108 or 109. For example, fluid introduced through the bore 125 of the piston rod 109 will unseat the ball check 129, pass radially outwardly through the aperture 133 into the area behind the piston 107, and cause the housing 100 to move toward the right to the position as shown in FIG. 5. Similarly, fluid introduced through the bore 124 of the piston rod 108 will unseat the ball check 128 and flow through the aperture 131 thereby causing said housing to move to the left.

The cylinder 107 is centrally located relative to the machine as seen from the front in FIG. 1 and the piston rods 108—109 are of the same length whereby the lateral movements of the housing 100 are symmetrical or equal in length on either side of the center line of the machine. As well shown in FIG. 3, the ends of the housing 100 are provided with longitudinally projecting blocks 134 and 135 adapted to abut the stops 105 and 106 respectively when the housing is shifted to either extreme position.

When the housing 100 is being shifted toward the left-hand stop 105, the fluid which has been trapped in the cylinder 101 between the piston 107 and the cylinder cap 113 must, of course, be exhausted. Such fluid can not be exhausted through the ball check 129 because the flow of fluid backward through the bore 125 automatically seats said ball check aided by the associated spring. Exhausting fluid, therefore, passes into the bore 125 through aperture 132. It will be noted, however, that the aperture 132 is so positioned that it passes within the sleeve 121 before the housing 100 reaches the end of its stroke. As hereinbefore mentioned, at this point the sleeve 121 is provided with the outwardly stepped clearance space 123. When the aperture 132 passes within the sleeve 121, the flow of fluid through said passage is naturally restricted due to the reduced amount of clearance provided around the piston rod 109 at this point. This restriction of the flow of fluid slows the movement of the housing for a short distance before it reaches the end of its stroke thereby cushioning the sudden stop of the housing when the block 134 strikes the stop 105.

It will be understood that cushioning of the housing when it is moved in the opposite direction is effected in the same manner by means of coaction between the aperture 130 of the piston rod 108 and the clearance passage 122 of the sleeve 120.

The core rod holder assembly 71 is well shown in FIGS. 3 and 4 where it will be noted that said assembly is mounted upon and moves with the table shifting assembly 70 and, specifically, the housing 100 of said table shifting assembly.

The core rod holder assembly 71 comprises a unitary support weldment, generally indicated at 140, comprising a pair of upright cylinder blocks 141 and 142 and a rod guide block 143. The cylinder block 141 is positioned flush with the left-hand end of the housing 100 and the cylinder block 142 is similarly positioned flush with the right-hand end of said housing. The rod guide block 143 is positioned centrally intermediate the two cylinder blocks. Wall portions 149 connect the cylinder blocks 141—142 and the rod guide block 143, said wall portions being recessed rearwardly from the forward surface of said blocks. Base plates 144 and 145 interconnect the lower ends of the blocks with the front edge of said base plates being flush with the front surfaces of said blocks. Bolts 146 project downwardly through suitable apertures in the base plates 144—145 and are thread fitted into the upper surface of the housing 100 whereby the support weldmen 140 is rigidly fixed to and carried with the housing 100.

As well shown in FIG. 4, a gib block 147 having a downwardly directed lip portion 147a is positioned within a recess 149a in the rear surface of the support weldment 140, said gib block being secured to the weldment by means of bolts 147b. The gib block 147 projects rearwardly from the rear surface of the support weldment 140 and complementarily interfits an upwardly directed lip 148a of a gib retainer bar 148. Said gib retainer bar is bolted to the forwardly directed surface of the support base 55 adjacent the uppermost edge of said base by means of bolts 148b. The gib block 147 and the gib retainer bar 148 coact to maintain the core rod holder assembly in the correct upright position while allowing it to slide freely from left to right with the housing 100.

Means is provided for mounting core rod table 72 on the support weldment 140, as follows. The cylinder block 141 is provided with a vertically disposed cylindrical bore 150 which houses a piston 151 having an upwardly projecting piston rod 152. Similarly, the cylinder block 142 is bored at 153 and houses a piston 154 having an upwardly projecting piston rod 155. Hydraulic connections 156 and 157 in the cylinder block 141 above and below the piston 151 provide means for introducing fluid into the cylinder bore 150 to actuate the piston rod 152 upwardly or downwardly. In a similar manner, upper and lower hydraulic connections 158 and 159 are provided in the cylinder block 142. The cylinder block 141, the rod guide block 143, and the cylinder block 142 are provided with cylindrical bores 160, 161, and 162 respectively into which are slidably disposed guide rods 163, 164, and 165. Said guide rods also project upwardly above the support weldment 140 in a manner similar to that of the piston rods 152 and 155.

The uppermost ends of the piston rods 152 and 155 and the guide rods 163, 164, and 165 are all securely connected to the elongated core rod table 72. Said table is adapted to abut the upper surface of the support weldment 140 when the table is lowered by action of the pistons 151—154 and their associated piston rods, and this vertically positions the core rods 75 at the proper level relative to the lower mold halves.

Referring again to FIG. 4 of the drawings, a core rod base 170 having a length equal to the length of the table 72 but being substantially greater in width is mounted flatwise upon the upper surface of said table with the forward edge of said base being flush with the forward edge of said table. The pair of core rod holders 73 and 74 are mounted side by side upon the core rod base 170, the rearwardly directed surfaces of said holders being flush with the rearwardly directed edge of said base. The core rod base 170 is keyed to the table 72 by means of a key 173 whereby it is laterally adjustable relative to the machine upon said table while maintaining a fixed forward and rearward position relative thereto. The core rod holders are similarly keyed to the core rod base 170 by means of a key 174.

The core rod holders 73 and 74 are identical as to details of construction and, therefore, the same reference numerals will be used in referring to both of them. Referring particularly to FIGS. 4 and 6, each core rod holder comprises an elongated, rectangular block having a plurality of bores 171 therethrough. The core rod holders are positioned upon the core rod base 170 with their longer dimensions disposed parallel with the lengthwise dimension of said base. The bores 171, said bores as herein illustrated being four in number in each core rod holder, are disposed at right angles to the longer dimension of said core rod holders or parallel with the forward and rearward dimensions of the machine itself. Each bore 171 provides mounting means for one of the core rods 75 which is telescopically fitted within its corresponding bore.

Each core rod holder 73—74 is also provided with a pair of apertures 172 (FIG. 6) adjacent the ends thereof which extend through said holder parallel with the bores 171. Forwardly of each core rod holder 73—74 and spaced therefrom there is provided a fluid actuated cylinder 176 which is mounted securely upon the core rod base 170, and each said cylinder contains a conventional reciprocable piston which actuates a rearwardly projecting piston rod 177.

The rearmost end of the piston rod 177 is thread fitted into a pusher bar 175 which is disposed at right angles to said piston rod and extends laterally in either direction slightly beyond the apertures 172 of the core rod holder. Pusher rods 169 are connected adjacent the ends of the pusher bar 175 and project rearwardly therefrom through the apertures 172. The rearmost ends of the pusher rods 169 are thread fitted into a stripper plate 178 which is positioned parallel with the rearwardly directed face of the core rod holder associated therewith. The stripper plate 178 is provided with a plurality of apertures 179 through which the core rods 75 loosely project. Said stripper plate is adapted to be moved rearwardly along the core rods 75 to remove molded articles therefrom by means of the cylinder 176 and its associated piston rod 177. In FIG. 4 the stripper plate is shown in its retracted position whereby it is contiguous with the core rod holder in which position the pusher bar 175 is spaced rearwardly a substantial distance from said core rod holder. The apertures 179 are of sufficient diameter to allow the stripper plate 178 to slide freely over the core rods 75 but are small enough to abut the end of any molded article which may be upon the core rod, and said stripper plate, when actuated, extends rearwardly a sufficient distance to disengage any article from said rod.

As best shown in FIG. 7, each core rod 75 comprises a spindle 180 which is provided with a diametrically reduced portion 181 adapted to closely telescopically interfit one of the bores 171. The reduced portion 181 extends completely through and beyond its associated core rod holder and is secured thereto against axial movement by means of a thread fitted nut 182. Said spindle extends toward the rear of the machine in the direction of the molds a sufficient distance to be embraced by said molds when the molds are in their closed position.

The spindle 180, at the portion thereof which enters the molds, may be of any preferred shape for forming the internal dimension of a parison suitable for the particular article which is to be molded. As herein illustrated, the spindle is shaped for forming a parison for the purpose of blow molding a small size plastic baby bottle. It will be understood that the machine of this invention is adaptable for making bottles of any desired shape by changing the external shape of the core rods, the internal shape of the parison mold, and the internal shape of the associated blow molds.

The spindle 180 is provided with an axial bore 183 into which is slidably interfitted a valve stem 184. The valve stem 184 does not extend all the way through the spindle 180 but terminates within the area of the core rod holder block. Said valve stem is provided with an axial bore 185 which is diametrically outwardly stepped adjacent the end thereof disposed within the core rod holder as indicated at 186 thereby providing an internal shoulder at 187. A stepped retainer plug 188 is rigidly secured within the outwardly stepped bore 186 whereby the end of said plug abuts the shoulder 187. The retainer plug 188 extends outwardly beyond the forward end of the spindle 180 and is threaded to receive lock nuts 189.

The spindle 180 is also provided with a socket 190 which is coaxial with the spindle bore 183 and terminates in a shoulder 191. A spacer 192 is slidably telescoped over the retainer plug 188, abutting the lock nuts 189, and a coil spring 193 is compressively interposed between said spacer and the shoulder 191. It will be readily seen that the spring 193 urges the valve stem 184 in a forward direction or in the direction of the front of the machine.

The rearwardly directed end of the valve stem 184 is provided with a valve head 194 in the form of a caplike member which is telescoped over and rigidly fitted to the end of the valve stem thereby closing the stem at this point. The annular edge of the valve head 194 is provided with an inner bevel at 195 adapted to complementarily fit and coact with an outer bevel 196 of the rearwardly directed end of the spindle 180. The spring 193 normaly holds the bevels 195 and 196 in abutting relation whereby the valve is closed, and opening of the valve is effected by axial pressure exerted in a rearward direction upon the retainer plug 188.

The retainer plug 188 has a socket 197 in the end thereof disposed within the valve stem 184, and a small tube 198 is seated within said socket. The tube 198 projects in the direction of the valve head 194 and terminates a short distance from the end of the valve stem 184. The tube 198 is radially spaced from the bore 185 of the valve stem 184.

The valve stem 184 is provided with three axially spaced, flat bottomed circumferential grooves 199, 200 and 201 in the external surface of said valve stem within the area of the core rod holder. These grooves are sealed from each other by ring gaskets 202 which are seated within suitable external grooves in the valve stem 184.

A radial passageway 203 extends through the spindle 180, the valve stem 184, the retainer plug 188, and the tube 198 at the groove 199. A passage 203' extends radially through the spindle 180 and the valve stem 184 and connects with the axial bore 185 at the groove 200. A third radial passage 203" is provided at the groove 201 and extends through the spindle 180. The circumferential groove 201 in turn connects with a plurality of longitudinal grooves 204 (FIG. 9) which are spaced circumferentially around the valve stem 184 and extend along the valve stem to the area opposite the beveled surfaces 195—196.

The passages 203, 203', and 203'' extend radially downwardly through the bottom of the spindle 180 and interconnect with passages 205, 206, and 207 respectively in the lower portion of the core rod holder. These latter passages are well shown in FIG. 15 and it will be noted that they interconnect respectively with horizontal passages 208, 209, and 210 which extend longitudinally through the core rod holder below the aforementioned passages 205—206—207. The horizontal passages 208—209—210 in turn respectively interconnect with passages 211, 212, and 213 which are vertically disposed and extend downwardly through the bottom of the core rod holder and into the core rod base 170. Horizontal passages 214, 215, and 216 extend from the forward edge of the base 170 and interconnect respectively with the vertical passages 211, 212, and 213. As shown in FIG. 3, passage 216 has an external fluid connection 216a, passage 214 has a similar external connection 214a, and passage 215 is provided with an external connection 215a. Similar connections on core rod holders 73 and 74 are symmetrical left- and right-hand arrangements.

The external connection 216a provides means for introducing air under pressure to be used for either blowing the bottle within the blow mold or to eject a blown bottle from the parison rod in a manner to be herein later more fully described. It will be seen that the air passes through the passages 216, 213, 210, and 207 to the circumferential groove 201 and the longitudinal grooves 204 whereby it escapes from the parison rod when the valve head 194 is opened and the beveled surfaces 195—196 separate. The open position of the core rod valve is shown in FIG. 8, it being necessary to open the valve only a small distance to allow sufficient flow of air.

External connections 214a and 215a provide means for introducing to and discharging from the hollow core rods 75 a coolant, such as water. Water passes inwardly through the passages 214, 211, 208, 205, and through the tube 198 to the end of the spindle at which point the flow is reversed and passes through the axial bore 185 around the tube 198 to the passage 203' from which it is exhausted through passages 206, 209, 212, and 215. By controlling the temperature of the water which is passed through the core rod, said core rod is maintained at the desired temperature for injection molding a parison thereupon at the parison mold, and for controlling the parison in the desired condition for further processing in the machine.

After a bottle has been blown and before the blow mold is opened, it is necessary to exhaust the pressure inside the bottle to prevent the bottle from rupturing as soon as the blow molds are opened. To accomplish this there is provided mechanical means for holding the valve head 194 in the open position when the blow molds are closed and permitting the escape of air after the air pressure is turned off. This means comprises an angular plate 220 having a horizontal mounting portion 221 and a vertically downwardly directed cam portion 222 having a beveled cam surface 223 at its lower edge. The mounting portion 221 is bolted to a horizontally projecting mounting plate 227 to which the upper blow mold halves 64—66 are secured by means of bolts 224 which project upwardly through slots 225 in said mounting portion, said bolts being thread fitted into the mounting plate 227. The slots 225 afford forward and rearward adjustment of the angular plate 220 whereby the cam portion 222 can be positioned in such manner that closing of the blow molds causes the cam surface 223 to abut the foremost nut 189 and cam the valve stem 184 forwardly. This opens the valve head 194 and holds it open as long as the molds are closed.

From the foregoing it will be understood that each time the blow molds are closed, all of the valves in the corresponding core rods 75 which are then associated with a closing blow mold are caused to be opened and are held open until the blow molds are opened. The valve means for directing air to the core rods allows exhaustion of the air when said valve means is deactivated. By control means to be herein later fully described, the air flow used for blowing the bottles is stopped before the molds open whereby the air can be exhausted and the internal pressure relieved.

It is also desirable that the core rod valves be mechanically opened during the stripping of the bottles from said core rods. This is effected by the pusher bar 175 which moves forwardly when the cylinder 176 is actuated to a position whereby it abuts the foremost nuts 189 and simultaneously opens all of the valve heads 194 in the associated core rods. Thus it will be seen that the fully blown bottles are both pushed by the stripper plate 178 and blown free of the core rods by the operation of the pusher bar 175 during ejection of said bottles.

It is anticipated that the distal end of the core rod spindle of FIGS. 7 and 8 may be modified according to the showing as illustrated in FIG. 10. In FIG. 10, 184' represents the valve stem, and the water inlet tube is shown at 198' concentrically disposed within the axial bore 185' of said valve stem. The longitudinal grooves of the valve stem 184' are shown at 204' (spaced like grooves 204) and extend all the way to the end of said valve stem. The valve stem 184' is telescopically fitted within an axial bore 183' of the spindle 180'.

In the modification of FIG. 10, the distal end of the spindle 180' is provided with an inwardly converging bevel 196' adapted to complementarily interfit a bevel 195' of a valve head 194'. The valve head 194' is generally frusto-conical in shape and is provided with a forwardly projecting shank 194'' which tightly seats within and interfits the axial bore 185'. The valve head 194' is rigidly secured and sealed to the end of the valve stem 184', preferably by welding or other suitable means.

It will be understood that the valve arrangement as shown in FIG. 10 operates in substantially the same manner as that hereinbefore described in connection with FIG. 7. Closing of the adjacent blow mold causes the cam portion 222 of the plate 220 to abut the foremost nut 189 which presses the valve stem 184' forwardly and separates the beveled surfaces 195' and 196'. Cooling of the core rod and the introduction of air thereto are the same as in the above mentioned FIG. 7.

FIGS. 11 to 14 inclusive illustrate a completely modified form of a core rod which may be used with a machine or the type herein illustrated and described. Certain parts as shown in the modified form are identical with the first form of the core rods, and where such parts are identical, they are given the same reference numeral as in the first form except that said numeral is primed. The modified core rod is indicated at 400 and is mounted at the proximal end thereof in a core rod holder 74' which is identical with the core rod holder 74. The core rod holder 74' is bored at 171' whereby it is adapted to telescopically receive a reduced portion 402 of a spindle 401. The spindle 401 has a neck forming portion 403 substantially similar to the neck forming portion 381 of the first embodiment. Said spindle 401 terminates in a rearward direction just beyond said neck forming portion and is provided with a circular recess 404 in the rearwardly directed end thereof. The forwardly directed end of the spindle is provided with a clamping nut 405 thread fitted thereupon to hold said spindle securely within the core rod holder 74'. A stripper plate 178' is telescopically fitted over the spindle 401 adjacent the core rod holder 74' and functions in the same manner as the stripper plate 178 of the first embodiment.

Said spindle has a longitudinal bore 406 which telescopically receives a water jacket 407. The water jacket 407 replaces the valve stem 184 of the first embodiment and is fixedly mounted within the spindle bore 406. The water jacket 407 is in turn coaxially bored at 408 and has mounted therein a water injection member 409. Said water injection member comprises a tubular portion 410 of substantially smaller diameter than the water jacket bore 408 and a solid end portion 411 which completely seals the forwardly directed end of the water jacket 407. The water jacket 407 extends rearwardly substantially beyond the distal end of the spindle 401, and the tubular portion 410 of the water injection member 409 terminates within said water jacket a short distance from the end thereof. The water jacket 407 is also provided with a plurality of circumferentially spaced, longitudinally disposed grooves 412 in its outer surface which extend from an air inlet passage 207' along the water jacket and intersect the annular recess 404 in the end of the spindle 401. Water inlet passage 205' and water outlet passage 206' are also provided in the core rod holder 74' in the same manner and for the same purposes as that shown in the first embodiment of FIG. 7. The air supply and water supply and discharge passages are like those described in FIG. 15.

From the foregoing it will be understood that the core rods 75 and 400 are readily interchangeable in either the core rod holder 74 or 74' since said core rod holders are identical in construction. However, when core rods 400 are used, the angular plates 220 become unnecessary.

Circumferentially continuous, flat bottom grooves 413, 414, and 415 are provided in the outer surface of the reduced portion 402 of the spindle 401 in respective alignment with the water inlet passage 205', the water outlet passage 206', and the air passage 207'. Radial passage 416 extends inwardly from the groove 413 to the interior of the water injection member 409 whereby a temperature regulating fluid is introduced into said water injection member. The water flows toward the open end of the tubular portion 410 at which point it reverses direction flowing along the outside of said tubular member to be exhausted through radial passage 417 which connects the water jacket bore 408 with the groove 414. The distal end of the water jacket 407 is completely sealed by a plug 418 welded or otherwise suitably secured in the end thereof.

The plug 418 has a cylindrical shank 418a which is seated within the end of the water jacket 407 and an outwardly flared, frusto-conical retainer portion 418b. The plug 418 is welded or otherwise suitably secured in place to the water jacket 407 whereby the end of said water jacket is completely sealed.

A plurality of sleevelike segments 419 are telescopically fitted over the water jacket 407 and are interposed between the retainer portion 418b and the spindle 401. All of the segments 419 are of the same cross sectional shape as seen from line 14—14 with the two segments designated 419a and 419b adjacent the plug 418 having beveled edge surfaces of the same angle as those of the retainer portion 418b. The segment 419a has parallel beveled surfaces at either axial end of said segment, and the segment 419b is beveled at the end thereof adjacent the segment 419a. All of the other segments 419 have end surfaces perpendicular with the axis of said segment.

As best shown in FIG. 14, each segment is provided with a plurality of apertures 420 which extend through the walls of the segment axially parallel with the segment axis. The apertures 420 are circumferentially evenly spaced 90 degrees apart on the segment. An aperture 421 is also provided in each segment, said aperture 421 being spaced intermediate two of the apertures 420. The aperture 421 is adapted to receive a thin rod 422 which is passed through all of the segments in such manner as to hold all of the apertures 420 of all of the segments in coaxial alignment. The resulting structure provides four continuous passages which extend from the recess 404 to the beveled surface of the retainer portion 418b of the plug 418.

Relatively thin washers 423 are interposed between each pair of adjacent segments. Said washers are of such outer diameter that the outer peripheries thereof are just inside the apertures 420. From the apertures 420 outwardly the segments 419 are, therefore, axially spaced from each other a distance equal to the thickness of the washers 423. The entire assembly is rigidly held together by means of jam nuts 424 which are thread fitted upon the forwardly directed end of the water jacket 407 thereby pulling the retainer portion 418b of the plug 418 tightly against all of the segments.

It will be clearly seen that air entering through the passage 207' which intersects the circumferential groove 415 can pass along the groove 412 in the water jacket 407 to the recess 404 from which point it will be distributed through the segments 419 by means of the apertures 420. From the segments the air escapes radially outwardly through the spaces between the segments 419. It has been found that if the washers 423 are sufficiently thin, for example about .001 inch thick, plastic which is injection molded upon the core rod will not pass inwardly between the segments. The thickness of the washers or the number used can, of course, be varied.

Air which is exhausted through the interstices between the segments is used to blow mold the bottle or to eject the bottle in the usual manner as hereinbefore set forth. This embodiment of FIG. 11 has the advantage that no valve operating mechanism such as the plunger 223 and the valve actuating cam 224 are necessary since the pressure within a newly blown bottle is automatically relieved through the spaces between the segments when the air actuating valve is in a neutral or exhaust position.

The left and right blow molds comprise four individual blow mold units 240 on each side so spaced as to receive the four core rods 75 of one of the core rod holders 73 or 74. Similarly the center parison mold comprises four individual mold units 241 spaced to receive the four core rods. The right- and left-hand blow mold clamp assemblies are substantially identical with the exception that they are mirror images of each other and, therefore, only one of said assemblies will be described in detail.

FIG. 18 shows the left-hand blow mold assembly and is typical of both the left- and right-hand assemblies. The left blow mold clamp assembly, as generally indicated at 57, comprises the pair of spaced, complementary brackets as shown at 58 having a cylinder mounting block 242 secured therebetween. The cylinder 63 is mounted on top of the cylinder mounting block 242, the piston rod 243 thereof projecting downwardly through said block by means of a suitable aperture as indicated at 244. The lowermost end of the piston rod 243 is rigidly secured in any suitable manner to the upper blow mold mounting plate 227 which carries the upper mold half 64. The cylinder mounting block 242 is also apertured at 245 and 246 and slidably receives vertical guide pins 247 which slide within guide bushings 248 and 249. Said guide pins are secured at their lowermost ends to the mold mounting plate 227 and extend upwardly above the cylinder mounting block 242.

The cylinder 63 has external hydraulic connection means 250 adjacent its upper end and a similar connection means 251 adjacent its lower end. It will be readily seen that by directing fluid through the connection 250 the upper mold half 64 is lowered, and by introducing fluid through the connection 251, said upper mold half is raised. The entire blow mold clamp assembly 57 is secured to the mold clamp supporting member 52 in any suitable manner such as by means of bolts 252.

It will be readily understood that the right blow mold clamp assembly 59 is mounted upon the mold clamp supporting member 53 by means of the brackets 60 in substantially the same manner as the mounting of the left blow clamp assembly 57 to the mold clamp supporting member 52.

The lower blow mold halves 68–69 are mounted immediately below the corresponding upper blow mold halves 64—66 respectively in identically the same manner. As best shown in FIG. 4, a mounting plate 234 is secured in any suitable manner upon the lower mold support base and has mounted thereon a water manifold 232. The mounting plate and manifold are keyed together by a key 231 to allow lateral adjustment of the lower mold half and prevent forward or rearward displacement between the two parts. The lower blow mold half 69 (or 68) is in turn rigidly secured on top of the water manifold 232.

The parison mold clamp assembly 56 is mounted between the mold clamp supporting members 52 and 53 and may comprise any suitable mold clamp, but as here shown incorporates a wedging action for holding the parison mold tightly closed during injection which is similar in principle to that shown in Patent No. 2,649,621 issued to E. P. Moslo, August 25, 1953.

Figure 16:
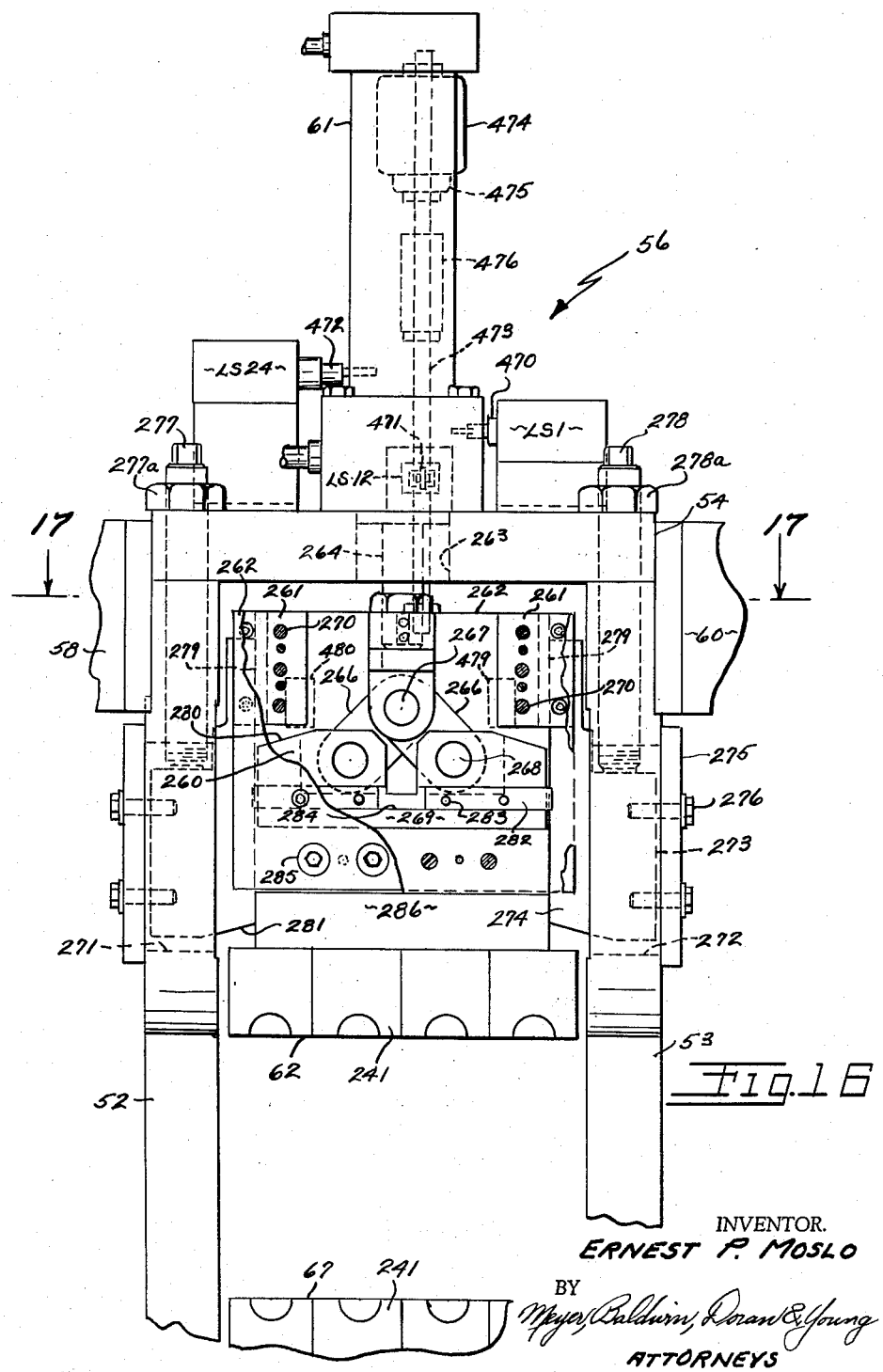
FIG. 16 is a front elevation of the parison mold clamp assembly.
Figure 82:
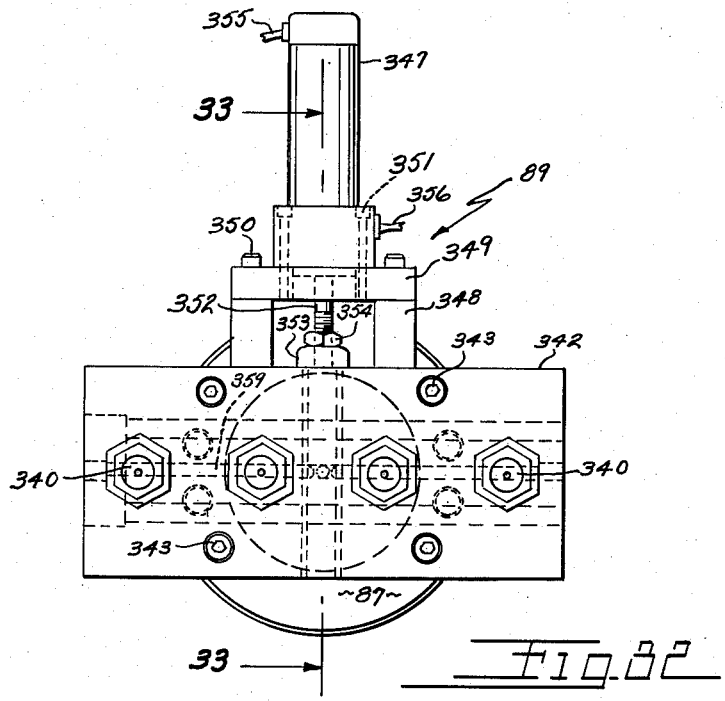
Figure 83:
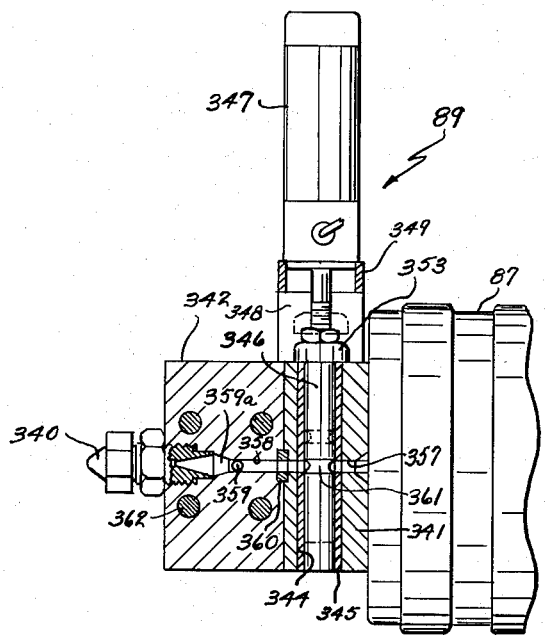

Referring to FIG. 16, the cylinder 61 actuating the parison mold is mounted on top of the cross member 54 which connects the upper ends of the mold clamp supporting members 52 and 53. Said cross member 54 is in the form of a rectangular plate of substantial thickness and is apertured at 263 whereby a piston rod 264 of the cylinder 61 projects downwardly below said cross member. A downwardly projecting toggle yoke 265 is secured to the lowermost end of the piston rod 264, said toggle yoke having a plurality of toggle links 266 pivoted thereto by means of a toggle yoke pin 267. The lowermost ends of the toggle links 266 are pivotally connected to a pair of laterally oppositely acting wedge blocks 260 by means of a pair of pins 268 which are journaled in said wedge blocks. The wedge blocks 260 move in laterally opposite directions from the center line of the parison mold clamp assembly 56 and have inwardly directed abutment portions 269 adjacent their lower edges whereby said wedge blocks abut along said center line.

The wedge blocks 260 are contained within a boxlike structure comprising forward and rearward end plate members 262 which are joined adjacent the upper edges thereof by means of rectangular bars or beams 261. The end plate members 262 are secured to the beams or bars 261 in any suitable manner such as by bolts 270.

The mold clamp supporting members 52 and 53 are provided with vertically disposed, generally rectangular slots 271 and 272 respectively which are disposed generally opposite the wedge blocks 260. A pair of wear blocks 273 are slidably fitted within the slots 271 and 272, said wear blocks being key shape in horizontal section with forwardly and rearwardly directed flanges 274 which overlap and bear against the inner surfaces of the mold clamp supporting members 52 and 53. Clamping plates 275 of larger dimension than the slots 271—272 are bolted to the wear blocks 273 by means of bolts 276 and lie in flatwise engagement with the outwardly directed surfaces of the mold clamp supporting members 52 and 53. Adjustment means for vertically adjusting the wear blocks 273 is provided in the form of a pair of elongated bolts 277 and 278 which project downwardly and are thread fitted through the mold clamp supporting members 52 and 53 and are maintained in any adjusted position by means of lock nuts 277a and 278a respectively. The lowermost ends of the adjustment bolts 277 and 278 abut the upper surfaces of the wear blocks 273 where said wear blocks are disposed within the slots 271 and 272. The flanges 274 extend upwardly above the slots 271—272, the upper ends of said flanges slidably interfitting grooves 279 in the beams 261. The outwardly directed ends of the wedge blocks 260 are adapted to slide upon or be closely adjacent the inwardly directed surfaces of the wear blocks 273.

The wedge blocks 260 are provided with cam surfaces 280 at the upper surfaces of said wedge blocks adjacent the laterally disposed edges thereof. The wear blocks 273 are provided with complementary cam surfaces 281 adjacent their inner surfaces at the bottom of said wear blocks. The wedge blocks 260 are connected to the end plate members 262 by means of keys 282 which are connected by bolts 283 to said end plate members and interfit horizontal and laterally directed grooves 284 in the forward and rearward surfaces of the wedge blocks 260. It will be understood, therefore, that the wedge blocks 260 are maintained against vertical displacement relative to the boxlike structure formed by the end plate members 262 and beams 261 by means of the keys 282; however, said wedge blocks can move laterally outwardly from each other by means of a sliding fit between the key 282 and the grooves 284.

The upper parison mold half 62, which comprises the upper halves of the plurality of parison mold units 241, is secured to the end plate members 262 by means of bolts 285 which extend inwardly into a mold mounting plate 286 upon which said upper parison mold half is mounted. The upper end of the mold mounting plate 286 slidably abuts the lower surfaces of the wedge blocks 260 whereby said wedge blocks are free to move outwardly and inwardly relative to said mold plate.

From the foregoing, the action of the parison mold clamp assembly will be readily understood. When the cylinder 61 is actuated to lower the upper parison mold half, the entire boxlike frame and the wedge blocks move downwardly, this being possible because of the slidable fit between the beams 261 and the flanges 274 of the wear block 260. When the parison mold closes, the cylinder 61 meets with resistance and begins urging the toggle yoke 265 downwardly with great force. Through the toggle links 266 the wedge blocks 260 are consequently urged laterally outwardly in opposite directions.

The wear blocks 273 are so adjusted relative to the stroke of the parison mold that when the wedge blocks 260 are urged outwardly, the cam surfaces 280 of said wedge blocks are horizontally aligned with the cam surfaces 281 of the wear blocks 273 sufficiently to cause said wedge blocks to pass outwardly beneath the wear blocks. The interacting cam surfaces 280 and 281 cause the wedge blocks 260 to be wedged tightly below the wear blocks 273 thereby exerting an extreme force downwardly upon the upper parison mold half 62. The parison mold is, therefore, tightly clamped and held together during the injection molding of the parisons. Reverse action of the cylinder 61 withdrawing the piston rod 264 upwardly will exert a pull on the toggle arrangement thereby first pulling the wedge blocks inwardly into abutting contact with each other and then upwardly between the inwardly directed faces of the wear blocks 273. The wear blocks 273 are preferably adjusted by the adjusting bolts 277 and 278 whereby when the parison molds are fully closed and tightly clamped, the toggle links 266 are still not in horizontal alignment with each other but are still angled upwardly at the center whereby the wedging force of the wedge blocks 260 is positively maintained throughout the injection molding of the parison.

As well shown in FIG. 3, the lower parison mold half 67 is mounted in substantially the same manner as the lower blow mold halves. A mounting plate is provided at 235 which is secured to the base 55 and has mounted thereupon a water manifold 233. The lower parison mold half 67 is mounted upon said water manifold and rigidly secured thereto.

As best shown in FIGS. 3 and 4, the lower parison mold mounting plate 235 projects forwardly beneath the table 72 and has mounted therein a plurality of laterally spaced, vertically upstanding posts 236 which are leveled at their upper ends as indicated at 236a. The table 72 has two sets of vertical apertures 237 having bushings 238 seated therein which are in line with the posts 236. Each set of apertures 237 is provided adjacent one end of the table 72 in such position that when that end of said table is in front of the parison mold and the table is lowered, the posts 236 will enter the adjacent set of apertures and telescopically closely interfit the associated bushings 238. If for any reason the table 72 is not perfectly positioned laterally and the core rods 75 are not properly aligned with the parison molds, the leveled ends 236a will guide the posts into the apertures whereby said posts will bring the table into alignment as it lowers. The posts 236 remain seated within the apertures 237 during the injection at the parison molds whereby the table 72 and its associated core rods 75 are firmly fixed in position during such injection.

The posts 236 operate to align the table 72 when it is in either the right- or left-hand position since apertures 237 are provided adjacent both ends of said table. The posts 236 also prevent any cocking or forward movement of the table 72 and the core rods 75 which may result due to the force exerted against said core rods when plastic is being injected thereupon under substantially heavy injection pressures. Thus the entire core rod holder assembly 71 is maintained in a vertically upright position during injection.

FIGS. 30 and 31 show details of the material injection assembly 80. All of the operating parts of said material injection assembly are unitarily connected together and slidable forwardly and rearwardly on the slideway 81. The assembly is mounted upon a forward supporting member 290 and a rearward supporting member 291 which ride upon the slideway 81 and are provided therebetween with suitable flange means 292 adapted to coact with a support clamping gib 293 whereby the assembly is maintained against vertical displacement from the slideway 81. The slideway 81 is provided with an adjustment block 294 adjacent its forward end, said adjustment block having thread fitted therein an adjustable stop 295. The stop 295 is adapted to abut the forward face of the supporting member 290 whereby the forward movement of the material injection assembly 80 is adjustably limited. A second adjustment block 296 having an adjustable stop 297 thread fitted therein is adapted to abut the rearward surface of the supporting member 291 to limit the movement of the material injection assembly 80 in a rearward direction. The stops 295 and 297 are normally adjusted whereby the forward and rearward movement of the injection assembly is quite small, for example about 1/16 of an inch. However, the adjustment blocks 294 and 296 are bolted to the slideway 81 by means of bolts 298 and 299 respectively, and either stop member may be removed allowing free sliding action of the entire material injection assembly 80 when desired for purposes of access and repair. For example, by removing the adjustment block 296 the assembly may be moved rearwardly any desired amount.

Forward and backward movement of the material injection assembly 80 upon the slideway 81 is effected by means of a hydraulic motor or cylinder 300 which is rigidly secured to the bed 51 between the ways provided by said slideway. The cylinder 300 projects through a suitable opening in the supporting member 291, whereby said supporting member may reciprocatively move freely with respect to said cylinder, and is provided with a forwardly projecting piston rod 301 which is in turn connected at the forward end thereof to the forward supporting member 290. Fluid connections 302 and 303 are provided at the forward and rearward ends of the cylinder 300 respectively whereby fluid is either introduced or exhausted to cause the piston rod 301 to move forwardly or rearwardly thereby effecting movement of the material injection assembly 80.

The injection cylinder 86 is mounted at the forward end thereof to the supporting member 291, and the packing chamber 85 and funnel 84 are mounted upon and to the supporting member 290. The material feed mechanism 83 is mounted bridgelike between the supporting member 291 and the funnel 84. The hopper 82 is mounted upon said material feed mechanism.

The packing chamber 85 is in the form of a cylindrical housing having a reduced portion 310 projecting rearwardly and tightly telescopically interfitting a bore 311 in the supporting member 290. Adjacent its forward end, said packing chamber is provided with a radiating, circumferentially continuous, relatively heavy flange 312 by which it is bolted to the material heating or plasticizing chamber 87 by cap screws 313. The funnel 84 is mounted upon the upper surface of the supporting member 290, and a passage 313 extends downwardly from said funnel through the supporting member 290 and the wall of the packing chamber 85, said passage 313 intersecting a longitudinal coaxial bore 314 of said packing chamber.

The injection cylinder 86 carries the forwardly projecting ram 88 and is adapted to reciprocatively move said ram in either a forward or rearward direction. Said injection cylinder is provided with a check valve 315 and forwardly and rearwardly positioned external fluid connections 316 and 317 respectively. Fluid introduced through either of the connections 316 or 317 moves the ram 88 rearwardly or forwardly respectively, and the check valve 315 serves to prevent rearward movement of said ram under certain conditions to be herein later fully described.

The forward end of the ram 88 telescopically interfits the rearwardly directed mouth of the bore 314, and in its most rearwardly retracted position, the forward end of said ram is positioned behind or rearwardly of the intersecting passage 313 through which granular resin drops. Said ram has two positions forward of its rearward position as indicated by the broken lines 88a and 88b.

The material feed mechanism 83 comprises an elongated, boxlike housing 318 having a material feed plunger 319 slidably positioned therein. A pusher rod 320 projects rearwardly from the plunger 319 and extends rearwardly of the housing 318 and is provided at its rearward end with a threaded portion 320a. The ram 88 has an upwardly projecting arm 321 mounted thereto which is in turn connected to the forward end of a rearwardly projecting rod 322. The pusher rod 320 and the rearwardly projecting rod 322 are vertically spaced and axially parallel with their rearmost ends terminating in substantially the same vertical plane. A material feed actuator 323 is secured at its lowermost end to the distal end of the rearwardly projecting rod 322. The material feed actuator 323 projects upwardly and has a bifurcated upper end 324 which loosely embraces the pusher rod 320 in the area of the threaded portion 320a. The bifurcated end 324 is interposed between a conventional hex nut 325 and an adjusting nut 326. The adjusting nut is positioned and thread fitted upon the threaded portion 320a forwardly of said bifurcated end, and the conventional hex nut is similarly positioned upon said threaded portion rearwardly of said bifurcated end.

The hopper 82 which is adapted to hold the supply of granulated molding material has a bottom flange 327 which rests contiguously upon a shut off guide plate 328. The flange 327 is secured upon the shut off guide plate 328 by means of clamp members 329, and both said flange and said guide plate are laterally and horizontally slotted to receive a slidable shut off plate 330 whereby material moving downwardly from the hopper 82 may be controlled.

Movement of the ram 88 forwardly through the bore 314 in the packing chamber 85 both feeds the molding material forwardly into the material heating chamber 87 and moves the granulated material from the hopper 82 into the funnel 84. It will be readily seen that each time the ram moves forward, the arm 321 and the rod 322 move forwardly with it. This causes the material feed actuator 323 to also move forwardly, and when the bifurcated end 324 meets the adjusting nut 326, the pusher rod 320 is also, from that point, moved forwardly. This causes the plunger 319 to move also, pushing ahead of it some of the granulated molding material which has fallen downwardly from the hopper 82 into the housing 318. The material is thus moved forwardly through the housing into the funnel 84 from which said granulated material drops into the bore 314 of the packing chamber 85. When the ram 88 retracts, the bifurcated end 324 strikes the hex nut 325 thereby retracting the plunger 319. The lost motion of the material feed actuator 323 between the nuts 325 and 326 adjustably determines the stroke of the plunger 319 thereby providing an effective control over the amount of granulated molding material which is pushed forwardly into the funnel 84. For example, if the adjusting nut 326 is moved forwardly thereby increasing the lost motion, the stroke of the plunger 319 will be correspondingly less because said plunger does not begin to move until after the material feed actuator has moved a certain distance. If, however, the adjusting nut 326 is moved to a position closely adjacent the material feed actuator 323, then there will be little or no lost motion and the plunger 319 will be moved its maximum distance thereby feeding a maximum amount of granulated material into the funnel 84.

Simultaneously with the above feeding action each forward motion of the ram 88 forces more of the granulated material into the material heating chamber 87 at which point said material is plasticized for injection through a plurality of nozzles 340 positioned at the extreme forward end of the material injection assembly. The material heating chamber 87 is surrounded by a plurality of resistance heating coils 331 which control the temperature in said heating chamber in a conventional manner for proper plasticizing of the material.

Between the material heating chamber 87 and the plurality of nozzles 340 there is interposed a precompression unit generally indicated at 89 in FIG. 30 and shown in detail in FIGS. 32 and 33. The precompression unit 89 comprises a nozzle connection bar 341 which is positioned against the forward face of the material heating chamber 87 and a laterally directed, nozzle manifold 342 which is positioned against the forwardly directed face of said nozzle connection bar. The nozzles 340 are thread fitted into the manifold 342, and said manifold and the connection bar 341 are secured to the forward end of the heating chamber 87 by means of a plurality of through bolts 343.

The connection bar 341 is vertically apertured at 344 and contains bushing 345 within which is slidably fitted a vertically movable valve 346. The valve 346 is vertically actuated by means of a cylinder 347 which is mounted above said valve upon the nozzle connection bar 341 by means of a pair of laterally spaced posts 348 having a cylinder support plate 349 connected across the upper ends thereof. Bolts 350 extend downwardly through suitable apertures in the ends of the support plate 349 and the posts 348 and connect into the nozzle connection bar 341 whereby the recited parts are secured together in a unitary fashion. The cylinder 347 is mounted on top of the support plate 349 between the posts 348, said cylinder being secured to said support plate by means of a plurality of downwardly projecting bolts 351.

The cylinder 347 has a vertically acting piston rod 352 which projects downwardly through a suitable opening in the support plate 349 and is connected at its lowermost end to the upper end of the valve 346. The upper end of said valve is diametrically enlarged to provide a stop portion 353 which abuts the upper surface of the connection bar 341 and limits the downward extent of the movement of the valve 346. The lower end of the piston rod 352 is threaded fitted into the upper end of the valve 346, and a lock nut 354 firmly secures said valve against rotation relative to said piston rod. The cylinder 347 has suitable fluid connections 355 and 356 adjacent its upper and lower ends respectively whereby the piston rod 352 of said cylinder is vertically reciprocably movable in a conventional manner.

The nozzle connection bar 341 provides a horizontal passage 357 therethrough which intersects and interconnects with the bushing 345, said passage 357 being coaxial with a passage 358 of the manifold 342. The passage 358 intersects a laterally disposed passage 359 which runs lengthwise through the manifold 342 behind the nozzles 340 and is connected with said nozzles by a plurality of short, forwardly directed passages 359a. The connection bar 341 and the manifold 342 are sealed to each other at the juncture of the passages 357 and 358 by means of a washer 360.

The valve 346 has a circumferentially continuous groove 361 so positioned relative to the stop portion 353 that when said valve is in its lowermost position, the groove 361 is in alignment with the passages 357 and 358. When the cylinder 347 is actuated to raise the valve 346, the groove 361 is then moved out of alignment with the passages 357 and 358 whereby movement of plasticized material therebetween is effectively prevented. Plasticized material from the heating chamber 87 enters the passage 357 in the connection bar and, when the valve 346 is in the lowermost position, passes around said valve by means of the groove 361 and enters the passage 358. From that point it is directed laterally through the passage 359 of the manifold 342 and from there forwardly through the short passages 359a into the plurality of nozzles 340. It will be readily seen that the flow of plasticized material can be effectively cut off by means of the cylinder 347 whereby the valve 346 is raised in such manner as to disalign the groove 361 from the passages 357 and 358.

When the flow of material is cut off, a certain amount remains in the passages 358, 359, and 359a. In order to maintain this latter plastic in a plasticized condition thereby it will not solidify and completely block subsequent flow of plastic through the nozzle 340, the manifold 342 is provided with a plurality of heater elements 362 disposed laterally through said manifold above and below the passages therein. The function of the precompression unit will be completely understood in connection with the overall operation of the machine of this invention which will be later fully discussed.

Referring now to FIG. 24, each parison mold unit 241 closely conforms to the shape of a spindle 180, the interior dimension of said parison mold unit being such as to allow only a small space between the spindle and the mold cavity. Each parison mold 241 is provided with a sprue opening 380 at the parting line of the mold in the rearwardly directed face thereof. The sprue opening is so contoured as to nestingly receive one of the injection nozzles 340.

In the present embodiment of the invention as herein illustrated, each spindle 180 has a neck forming portion 381 with a rearwardly directed taper 383. Beyond the taper 383, the spindle 180 is uniformly circular in section. The neck forming portion of each parison mold unit 381 is provided with radially recessed, thread forming cavities 384. The thread forming cavities 384 are adapted to form threads upon the neck of the bottle, said threads being in the present instance about .005 of an inch undersize. By making said threads slightly undersized, it is possible to transfer the parison to a blow mold with less chance of damaging the threads when the blow mold closes upon them.

Figure 26:
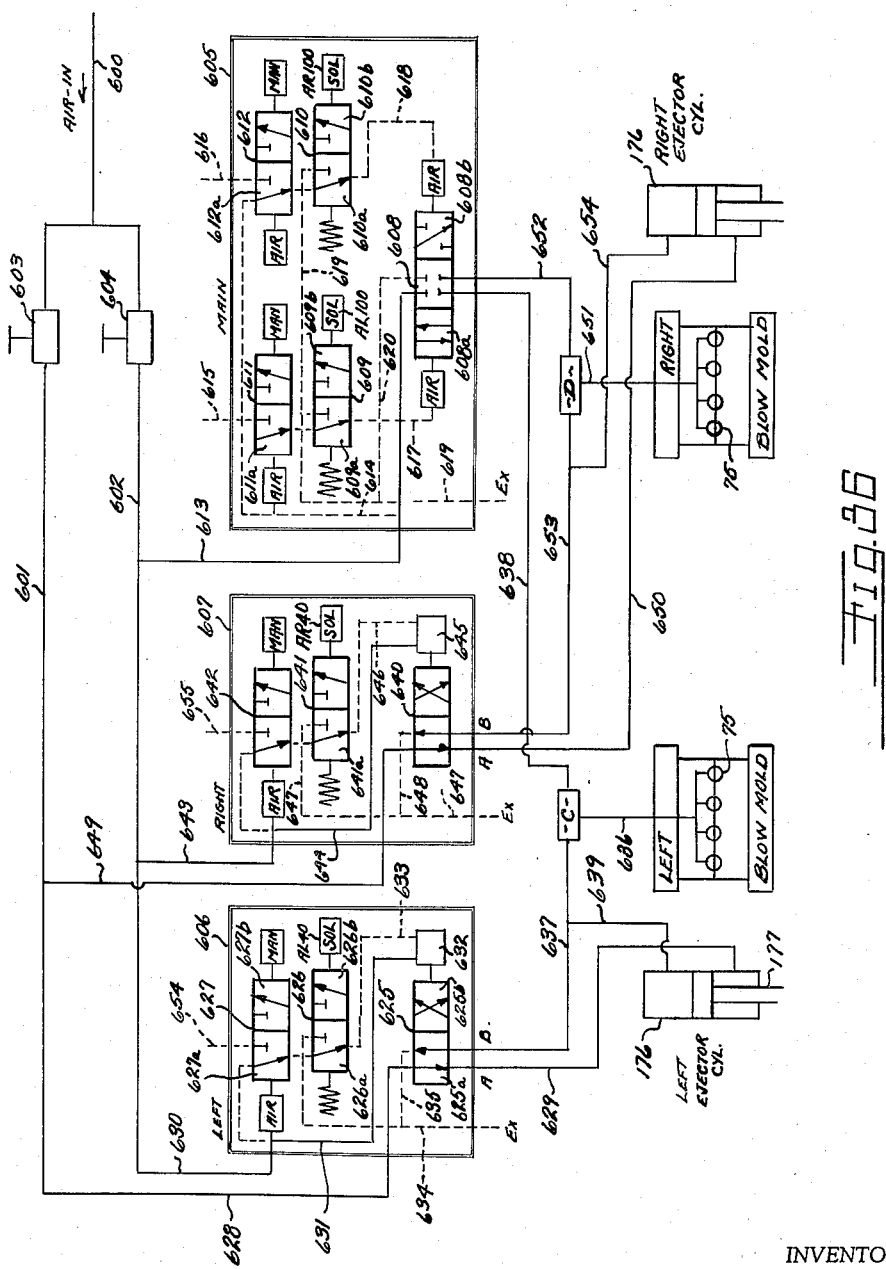
FIG. 26 is an enlarged detail as indicated in the circle 26 of FIG. 25.

As shown in FIGS. 25 and 26, the threads formed at the parison mold and herein designated by the numeral 385 are smaller than the corresponding thread forming cavities 386 in the blow mold. Rearwardly beyond the neck of the bottle it will also be noted that each blow mold unit 240 is interiorly shaped to conform with the ultimate exterior shape of the bottle to be blown.

As hereinbefore described in detail in connection with FIG. 7, the core rods 75 are adapted to be continuously controlled as to their temperature by means of water or similar coolant fluid flowing therethrough. In the case of relatively large core rods such as that illustrated in the accompanying drawings, the problem is generally one of cooling the core rods. The present machine is adapted to be run through an indefinite number of sequential cycles wherein parisons are continuously, alternately injection molded upon the spindles 180. This repeated contact with molten plastic tends to heat the spindles to a point near the temperature of the plastic itself, and the result is that the plastic tends to stick to the core rod or spindle, and the parisons, generally indicated at 387, do not remain uniform in their wall thickness thereby effecting the thickness of the walls of the blown bottle. By keeping the spindles 180 at a substantially lower temperature than the injected plastic, the area of the parison 387 which is contiguous with the spindle 180 partially sets thereby forming a thin, partially hardened skin 387a on the inner surface of the parison as detailed in FIG. 27. Most of the parison wall thickness, however, remains relatively fluid.

When the parison 387 is transferred to a blow mold unit 240, air under substantial pressure such as about 100 p.s.i. is introduced through the core rod 75 entering the parison in front of the valve head 194. The skin 387a readily leaves the spindle although said skin is still in a sufficient plasticized condition to conform to the interior shape of the blow mold 240. The parison walls are, therefore, stretched or expanded in a uniform manner to fill the blow mold cavity and form the finished bottle indicated at 388 in FIG. 28. The pressure exerted upon the inside of the parison also causes the molten plastic to move forwardly along the neck of the bottle whereby the undersized threads 385 are expanded to fill the thread forming cavities 386 of the blow mold thereby providing the bottle with completed or fullsize threads 385a as shown in FIG. 28.

In FIG. 29, the blow molds have been opened after the bottle has been blown and set and the ejection operation takes place. Ejection is effected in two ways: by actuation of the stripper plate 178 and by the simultaneous introduction of air into the blown bottle at a pressure substantially less than that used for blowing the bottle, for example about 40 p.s.i. The stripper plate 178 moves in a rearward direction abutting the mouth of the bottle neck and forcing the bottle 388 to become disengaged from the spindle 180, and the core rod valves are opened by the pusher bar 175. Air thus introduced into the bottle at about 40 p.s.i. tends to urge the bottle away from the spindle 180. In this way, the bottle is thrown sufficiently clear of the core rod whereby it may be intercepted by any suitable chute, container, or the like (not herein illustrated).

The diagrammatic FIGS. 19–23 illustrate, generally the sequence of movement of the molds and core rods. FIG. 19 shows all of the molds closed with the groups of core rods positioned toward the right whereby one group of core rods is within the parison mold and the other group of core rods is within the right blow mold.

In the position of FIG. 19, parisons are molded upon the core rods 75 by means of the material injection assembly 80 at the parison mold (FIG. 30). Concurrently with the injection molding of the parisons, bottles are blown in the right blow mold from previously formed parisons in the manner illustrated in FIGS. 25 and 28.

After the bottles have been blown at the right blow mold and parisons have been injected at the parison mold, the molds begin to open as shown in FIG. 20. The left blow mold is raised by the left blow mold clamp assembly 57 (FIG. 18), the parison mold is raised by the parison mold clamp assembly 56 (FIG. 16), and the right blow mold is opened by the right blow mold clamp assembly 59. After the molds have opened a short distance, the parison rods are raised by the parison core rod holder assembly 71 (FIG. 3). The molds open fully as shown in FIG. 21 at which point the core rods are disposed vertically centrally between the upper and lower mold halves. The newly blown bottles are then ejected at the right blow mold by means of the mechanical stripper mechanism (FIG. 4) and by the introduction of air through the right hand core rod at a pressure of about 40 p.s.i.

Both groups of core rods are then shifted to the left as shown in FIG. 22 by means of the table shifting assembly 70 (FIGS. 3–5) whereby the core rods supporting the newly formed parisons are disposed between the left blow mold halves 64—68 and the group of core rods from which the completed bottles were ejected are positioned between the upper and lower parison mold halves 62—67. The core rods 75 are then lowered into the left blow mold and the parison mold and the molds are closed by the mold clamping assemblies as shown in FIG. 23. Bottles are then blown at the left blow mold while new parisons are injected at the parison mold.

The above described cycle is then repeated indefinitely as desired with bottles being alternately blown and ejected at either the left or right blow mold while the parisons are concurrently formed at the center parison mold.

Figure 15:
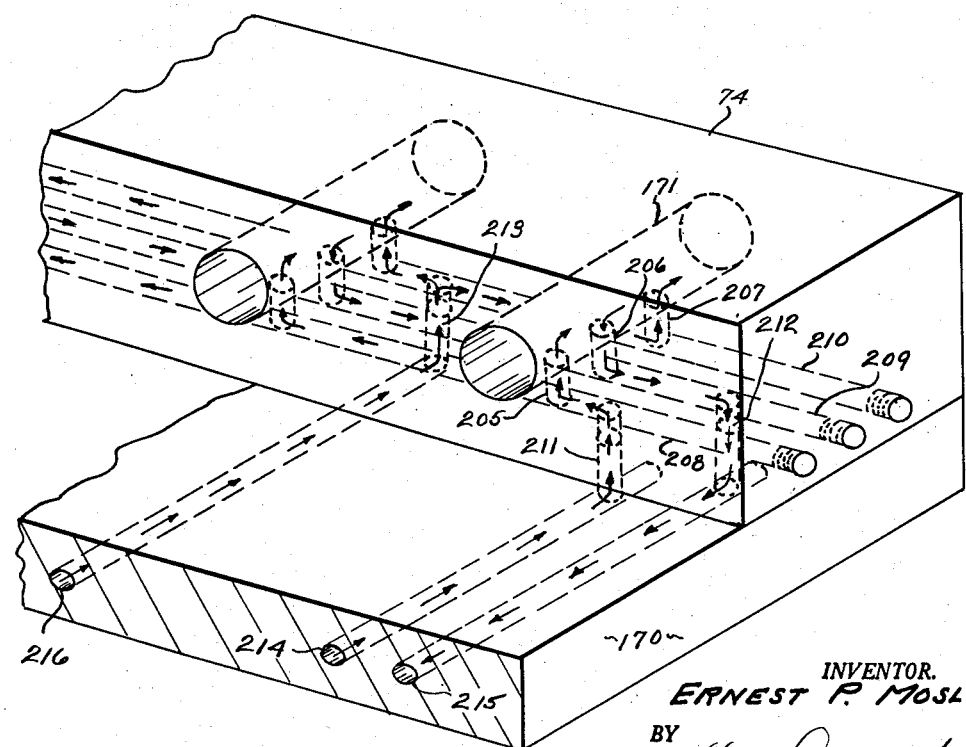
FIG. 15 is a fragmental perspective view of portions of the core rod holder and base showing the flow path of air and water to the core rods.

In the present machine as herein disclosed and illustrated, it is important that certain parts of the machine be maintained at a relatively critical temperature to insure the proper handling of the plastic material. Obviously there are certain variables involved not the least of which is the particular type of plastic from which the finished article is to be blown. For example, FIGS. 7 and 15 illustrate means for circulating a temperature regulating medium such as water through the core rods 75. These core rods will vary in size depending upon the size of the article which is to be manufactured. The size of the bottles to be blown contributes to determining the length of time necessary for running the machine through one complete cycle since larger bottles require more blowing time at the blow mold as well as more injection time at the parison mold due to the need for an increased amount of plastic material. A slower cycle means that the core rods are exposed to the cooling effect of the atmosphere for a longer period of time, and this exposure may be sufficient or more than sufficient to cool said rods. If the rods are overly cooled by the atmosphere, the medium circulated through said core rods is heated by conventional heating means, such as electrical resistance type heaters, to maintain the core rods at the proper elevated temperature. In this case the temperature of the water, if that is the medium used, is maintained within desired critical limits by well known thermostat control means.

In blowing bottles or similar articles wherein a faster cycle is possible, it may be that the core rods 75 are not exposed to the atmosphere for sufficiently lengthy intervals to cool them. Repeated applications in rapid succession of the molten plastic upon the rods will, under these conditions, cause the core rods to overheat. In this case, the parisons remain too molten and the protective skin, hereinbefore described, does not form on the inner surfaces of said parisons. The plastic may then tend to adhere to the core rods or there may be running or dripping of the plastic. This condition is corrected by cooling the water which is circulated through the core rods thereby reducing the temperature of said rods to the optimum point.

Because of the close association between the stripper plates 178 and the core rods 75, it may also be necessary to control the temperature of said stripper plates. This may also be done by circulating water through suitable passages in the stripper plates to either warm or cool the plates as conditions indicate. The stripper plate 178 is shown as having bored passages 430 and 431 (FIG. 7) which communicate with external inlet connection 433 and external outlet connection 434 respectively (FIG. 2). The connection 433 is adapted to be connected to any suitable source of temperature controlled fluid coolant whereby said coolant is introduced into and circulated through the stripper plate 178 to be exhausted through the outlet connection 434.

The blow molds generally must be cooled so that the plastic from the blown parison will cool immediately when it touches the inner surface of the mold. Another and separate water circulation system is, therefore, provided to the blow mold halves 64—68 and 66—79. As well shown in FIG. 3, inlet and outlet connections 436 and 437 in the upper blow mold mounting plate 227 provide means whereby a temperature controlling fluid is introduced and exhausted from horizontal passages 438 and 439 respectively in said mounting plate. Vertical passages 440 and 441 extend downwardly from and are connected respectively to the horizontal passages 438 and 439 whereby the fluid is passed in a parallel manner through horizontal passages 442 and 443 in the individual mold units 240.

The lower blow mold halves 68 and 69 are temperature controlled through the manifolds 232 which also have external inlet and outlet connections at 444 and 445 respectively leading into horizontal passages 446 and 447. The vertical passages 448 and 449 in turn interconnect with parallel passages 450 and 451 in the lower halves of the individual blow mold unit 240 to give a complete circulation. It will be understood that the exact arrangement of the passages through the blow mold is not critical and is given herein as an example of a way to circulate a temperature controlling fluid through said mold.

It will be understood that all of the blow mold halves, both upper and lower, are cooled or temperature regulated from a fluid supply source which is separate and separately controlled from that used in connection with the core rods 75. This will be readily understood since the temperature at which the core rods must be maintained is not necessarily the same and in all likelihood would be different from that of the blow molds.

Temperature regulation of the parison mold halves 62 and 67 generally involves warming or heating the parison mold units 241 to prevent the plastic from setting or hardening while it is still in the parison form, while yet controlling the temperature necessary to transfer the parison and to blow a perfect bottle. Therefore, a third fluid system is provided separate from the first two for maintaining the proper temperature at the parison mold. The upper parison mold half has inlet and outlet connections 452 and 453 interconnecting horizontal passages 454 and 455 respectively of the upper parison mold mounting plate 286. Vertical passages 456 and 457 interconnect the horizontal passages 454 and 455 respectively with horizontal passages 458 and 459 of the individual parison mold units 241.

The lower parison mold manifold 233 has inlet and outlet connections 460 and 461 communicating with horizontal passages 462 and 463 respectively. Horizontal passages 465 and 466 are provided in the lower halves of the individual parison mold units 241 and are interconnected with the horizontal passages 462 and 463 by means of vertical passages 464 and 465. Incoming fluid enters the inlet connection 460 and passes through the individual mold units in a parallel manner to be exhausted through the outlet connection 461 in a manner similar to that of the blow mold.

The automatic operation of the blow molding machine of this invention is achieved through an electrical control system which energizes a series of valve controlling solenoids which in turn supply either hydraulic or pneumatic power to operate the various mechanical elements of the machine in a predetermined sequence. The electrical control system is diagrammatically shown in FIGS. 34—34A of the drawings. The hydraulic system and associated control valve means is shown in FIG. 35, and the pneumatic system is diagrammatically shown in FIG. 36. The valve actuating solenoids of the hydraulic and pneumatic systems are indicated diagrammatically on the electrical system whereby the interrelation of the three diagrams is readily understandable.

The electrical circuit includes a series of electronic timers which have been numerically numbered, each number being prefixed with the letter "T." Each timer has a number of contacts of which three are utilized in the operation of the machine. One set of contacts closes when the timer is started, opens when it times out, and remains open in the reset or normal position. These contacts which first close are indicated by the suffix "a." Another set is open when the timer is started, closes when it times out and is reset in the open position. These contacts have been provided with the suffix "b." A third set of contacts opens when the timer starts, closes when it times out, and is reset in a closed position. These last mentioned contacts are provided with the suffix "C." For example, timer T4 has normally open contacts T4a which are closed when T4 is first energized and contacts T4b which are normally open and remain open during the timing operation and then close when said timer times out. T4 also has contacts T4c which are normally closed but which open when the timer is started and close when it times out. The timers are automatically reset when they are de-energized. Any set of contacts in any timer may be used to complete or break an individual circuit to any other element in the electrical system.

Suitable control relays are provided having normally open and/or normally closed contacts. The control relays are suitably numbered and provided with the prefix "CR" for easy identification. Normally open contacts of the control relay are designated by the control relay number primed and normally closed contacts are designated by the same numeral double primed. When a relay has more than one set of open or closed contacts, the second and subsequent contacts are further differentiated by the letter "a," "b," etc.

Certain circuits in the electrical system are initiated by or routed through limit switches which are tripped by operating members of the machine. These limit switches are of a type having one normally open pair of contacts and one normally closed pair of contacts. When each limit switch is tripped, the normally open contacts close and the normally closed contacts open. Either or both sets of contacts may be used to carry a separate electrical circuit. The limit switches are designated by a number prefixed with "LS," and the normally open contacts of each limit switch are indicated by the same number primed whereas the normally closed contacts are indicated by the same number double primed. With the exception of the limit switch designated LS11 (FIG. 17) all of said switches are made to return to their initial position when the operating member thereof has been released. In the case of LS11, a separate actuation of the operating member of the switch must be made each time it is desired to reverse the position of the contacts therein.

Referring now to FIGS. 1, 16 and 17, the parison mold clamp assembly has associated therewith five limit switches: LS1, LS2, LS11, LS12 and LS24. Limit switches LS1, LS12, and LS24 are mounted upon the cross member or plate 54 of said parison mold clamp assembly. The switch LS1 is provided with a plunger-type operating member 470, switch LS12 is similarly provided with operating member 471, and LS24 is provided with operating member 472. The switches LS1, LS12 and LS24 are clustered around a switch actuating rod 473 which is secured at the lowermost end thereof in the rearwardly positioned end plate member 262 of the parison mold clamp assembly 56.

The switch actuating rod 473 projects upwardly through a suitable opening in the cross member 54 and extends upwardly above all of the switches. The uppermost end of said switch actuating rod has mounted thereon a barrel cam 474, and immediately beneath that there is provided a diametrically smaller, ring-like cam 475. Spaced downwardly from the cam 475 is another barrel cam 476 which is diametrically smaller than the ring-like cam 475. It will be noted that the switches LS1, LS12, and LS24 are mounted at different levels whereby the actuating members 470, 471, and 472 respectively thereof are directed toward different axial portions than the switch actuating rod 473. In the position of the parison mold as shown in FIG. 16, the upper parison mold half 62 is raised to its highest position and none of the switches LS1, LS12 and LS24 is tripped due to the fact that the cams 474, 475 and 476 are raised above said switches. When the parison mold closes and the upper half thereof moves downwardly, the smaller barrel cam 476 moves downwardly to close the switch LS12 by contacting the operating member 471 thereof as said barrel cam passes said limit switch. When the clamp is fully closed, the operating member 471 of LS12 is disposed at a level between the cams 475 and 476 whereby it returns to its normal position. At this time, the cam 475 has been lowered to the level where it abuts and depresses the operating member 470 of switch LS1 thereby tripping LS1 when the parison mold is in a fully closed position. The barrel cam 474 also moves downwardly during the closing operation whereby it depresses the operating member 472 of LS24 thereby tripping it also.

Referring now to FIG. 17, limit switches LS2 and LS11 are mounted upon a lateral support member 49 which extends between the mold clamp supporting members 52 and 53 behind or rearwardly of the rearwardly disposed end plate member 262. The switches LS2 and LS11 have pivoted operating members 477 and 478 respectively adapted to be tripped by lugs 479 and 480 which project rearwardly from the adjacent end plate member 262. The lugs 479 and 480 are so positioned that the switches LS2 and LS11 are tripped just as the parison mold reaches its uppermost or fully opened position.

Referring now to FIG. 18, the left blow mold has associated therewith a pair of limit switches LS9 and LS7. The switches are mounted between the brackets 58, the switch LS7 having an operating member 481 and the switch LS9 having an operating member 482. The switches are positioned at different vertical levels with the switch LS9 being disposed with its operating member 482 slightly above the operating member 481. Both operating members are directed toward a centrally disposed, vertically upwardly directed switch actuating rod 483 which projects upwardly from the upper blow mold mounting plate 227. The switch actuating rod 483 has an upper cam adjacent its upper end as indicated at 484, and a lower cam 485 adjacent its lowermost end. The cams 484 and 485 are adapted to actuate the operating members 482 and 481 respectively of the switches LS9 and LS7. The upper cam 484 is so positioned that it trips LS9 when the left blow mold is in a completely closed position. The lower cam 485 is so vertically disposed upon the switch actuating rod 483 that it trips LS7 when the left blow mold is in a fully opened position. It will be understood from the above that when either switch is tripped the other switch is in a released or normal position.

By referring to FIG. 1, it will be noted that the right blow mold clamp assembly 59 is also provided with a pair of limit switches LS8 and LS10. These switches are mounted to the right blow mold assembly in substantially the same manner as the switches LS7 and LS9 of the left blow mold clamp assembly 57. It is felt, therefore, that a detailed showing and description of the switches LS8 and LS10 is unnecessary. The manner in which the switches associated with the right blow mold are mounted is indicated by showing parenthetically alongside the switch on the left blow mold assembly that reference which corresponds to the similar switch on the right blow mold assembly. For instance, in FIG. 18 the switch LS9 is also designated LS10 in parentheses; similarly, LS7 is parenthetically also identified as LS8.

As well known in FIG. 3, certain of the limit switches are associated with and responsive to movable elements of the table shifting assembly 70. Limit switch LS6 is mounted upon the lower mold support base 55 and has an operating member 486 which is tripped by contact with the weldment 140 when the core rods are shifted completely to the right-hand position. As shown in FIG. 1, a switch LS5 having an operating member 487 is disposed at the opposite end of the lowermost support base 55 and is adapted to be tripped when the table shifting assembly 70 is moved all the way to the left. The limit switch LS16 is mounted below LS5 and has an operating member 488 which also contacts the weldment 140 when the table shifting assembly 70 is moved all the way to the left.

The table 72 has mounted thereto a downwardly directed switch actuating rod 489. The lower end of the switch actuating rod 489 is provided with a radially outwardly directed cam 490 which actuates an operating member 491 of a limit switch LS13 which is mounted upon one of the wall portions 149. The cam 490 trips the switch LS13 when the table 72 is raised to its uppermost position, said switch LS13 being released and in its normal position when said table is lowered. The lowering of the table 72 causes the switch actuating rod 489 to move downwardly whereby the downwardly directed end thereof contacts an operating member 492 of a switch LS14. LS14 is also mounted to the same wall portion 149 as the switch LS13. From the above it will be understood that when the table 72 is lowered to its lowest position, LS14 is tripped whereas when said table is raised to its uppermost position, LS13 is tripped.

Also shown in FIG. 3, a limit switch LS23 is mounted upon the front of the base 55 and is provided with a plunger-type operating member 493 adapted to coact with a pair of cams 494 and 495 which are fixed to the bottom of the housing 100 of the table shifting assembly 70. The cam 494 is disposed generally adjacent the left hand end of the housing 100, and the cam 495 is similarly disposed adjacent the right hand end of said housing. LS23 is mounted in alignment with the centerline of the machine or in such manner as to be tripped by the cam 494 when the housing 100 is in the right hand position (FIG. 3) or by cam 495 when said housing is in the extreme left hand position.

Referring now to FIG. 1, a pair of whisker switches LS17 and LS18 are mounted upon the mold clamp supporting members 52 and 53 respectively on either side of the parison mold. The switches LS17 and LS18 have wire-like operating members 496 and 497 so disposed that they will be actuated or tripped by any bottle or ruptured parison remaining upon one of the core rods after attempted ejection thereof and during transfer of said rod from one of the blow molds to the parison mold. Said whisker switches are so positioned that the distal ends of the operating members 496 and 497 barely touch the newly formed parisons as said parisons are shifted from the parison mold to a blow mold. However, said switches are so constructed that no actuation takes place during such movement but only when a parison or unejected bottle strikes one of the operating members from the opposite direction as the rods move from a blow mold to the parison mold. Normally, the core rods are empty upon leaving a blow mold and therefore no contact would be made with the operating members 496 and 497.

Three limit switches, LS3, LS4, and LS15 are associated with the material injection assembly 80 as shown in FIGS. 30 and 31. The switches LS3, LS4 and LS15 are mounted upon a support plate 332 which is secured to one side of the supporting member 291. A horizontally disposed, laterally projecting switch operating arm 333 is mounted at the proximal end thereof to the arm 321 by means of bolts 334. The distal end of the switch operating arm 333 extends laterally outwardly beyond the support plate 332 and has a threaded adjusting pin 335 thread fitted therein.

LS3 is mounted upon the upper edge of the support 332 behind the operating arm 333 and has an operating member 498 which abuts and is depressed by said arm 333 when the ram 88 is moved to its fully retracted position. LS4 and LS15 are mounted in front or forwardly of the arm 333 (FIG. 31) and are adapted to be sequentially tripped by the forward movement of said arm and the adjusting pin 335 during the forward motion of the ram. LS4 is tripped by the lower edge of the arm 333 which contacts and depresses the operating member 499 as said arm passes over the switch. The adjusting pin 335 is positioned well above LS4, and further forward movement of the arm 333 brings the forward end of said adjusting pin into engagement with the operating member 500 of the limit switch LS15 whereby LS15 is tripped.

As best shown in FIG. 6, two limit switches LS19 and LS20 are positioned upon the core rod base 170 in such manner as to be actuated by a retracting movement of the pusher bar 175. LS19 has a forwardly projecting operating member 501 so positioned as to be depressed by the left-hand pusher bar 175, and LS20 has a similarly forwardly projecting operating member 502 adapted to be depressed by the right-hand pusher bar.

The foregoing description of the limit switches is given by way of example of the manner in which said switches may be mounted to be mechanically actuated by the movements of the various parts of the bottle blowing machine. Further reference will be made to said switches in conjunction with the diagrammatic showings of the electrical, hydraulic, and pneumatic systems.

For the purpose of describing one cycle of the machine of this invention in relation to the diagrammatic showing of FIGS. 34—34A, FIG. 35 and FIG. 36, it will be assumed that the parison core rod holder assembly 71 and the table 72 are positioned all the way to the left, that the clamp assemblies 56, 57 and 59 are completely open, and the table 72 and the core rod 75 are in the down position whereby said core rods are disposed within the lower mold halves. In this position of the machine, the group of core rods 75 which are disposed to the left are positioned within the lower blow mold half 68 and that group of core rods disposed to the right of the first mentioned group is disposed within the lower parison mold half 67. If the machine were just beginning operation, it will be understood that there would be no parisons upon the group of core rods disposed in the left hand blow mold. If, however, the machine had been operating, the left hand core rods would have parisons thereon.

The electrical system for initiating and carrying out the cycle of operation of the machine is diagrammatically shown in FIGS. 34—34A. Two main electrical power lines are provided at L1 and L2, said lines having fuses 510 and 511 interposed therein to provide sufficient protection against overloading. L1 has three branch lines 512, 513 and 514 as shown at the left hand side of the diagram. The branch lines 512, 513 and 514 are connected in parallel with L1 and are provided with switch contacts 515, 516 and 517 respectively whereby said branch lines may be selectively energized in any desired combination. The line 512 is utilized in both manual and automatic operation, line 513 is utilized for manual operation only, and line 514 is energized for automatic operation only. To cause the machine to operate automatically through one or more complete cycles the contacts 515 and 517 are closed whereas in strictly manual operation contacts 515 and 516 are closed. It will be understood that these contacts may be closed in the desired pairs from a single, manually operable switch (not shown) or they may be closed individually.

Air for use in blowing and ejecting the bottles is provided by closing a selector switch 518 (FIG. 34A) which is interposed in a conductor 519 which is connected at one end to the manual-auto line 512 and directs current in a manner herein later to be fully described through air valve actuating solenoids of the air system.

A conductor 520 is connected across the line 512 and L2 as seen adjacent the top of the electrical diagram and has interposed in series therein a lamp 521 and a bi-metal flasher 522. A conductor 523 is connected across the line 512 and L2 as shown just below the conductor 520, said conductor 523 having a control relay CR1 interposed therein. A conductor 524 connects the conductors 520 and 523 whereby the lamp 521, the flasher 522 and CR1 are disposed between said conductor 524 and L2.

A cycle start button 525 is interposed in a conductor 526 which is connected across the line 514 and L2. Between the cycle start button 525 and the automatic line 514 there is connected a selector switch 527 having contacts 528 and 529. The conductor 526 is connected through the contacts 528 and a parallel conductor 530 is connected at the ends thereof into the conductor 526 around the contacts 528 and the cycle start button 525 and through the contacts 529. As shown by the legend, the contacts 528 are closed when it is desired to operate the machine through one cycle only, and the contacts 529 are adapted to be closed when it is desired to have the machine operate through repeated cycles. The control relay CR2 is connected into the conductor 526, CR2 having a holding line 531 with normally open contacts CR2' of said control relay interposed therein.

When the selector switch 527 is adjusted to close the contacts 528 and the cycle start button 525 is depressed, CR2 is energized. The cycle start button 525 is resiliently biased to return to the open position as shown in FIG. 34 when it is released, but the contacts CR2' close thereby energizing the holding line 531 to maintain energization of CR2. An overall timer T1 is connected into a conductor 532 which connects the lines 514 and L2. When CR2 is energized, a second pair of normally open contacts of the controlled relay as indicated at CR2'a close thereby energizing T1 by completing the circuit through conductor 532. It will be noted that T1 is provided with a holding line 533, and it will be understood that all of the subsequently mentioned timers are similarly provided with holding lines.

A mold clamp timer T2 is connected in series with a conductor 534 which is also connected across the lines 514 and L2. When T1 is energized, contacts T1a in the conductor 534 close thereby starting the mold clamp timer T2. Normally open contacts T2a then close completing a circuit through a conductor 535 which is connected across the lines 514 and L2. Conductor 535 has control relay CR4 connected in series therein, and it will also be noted that limit switches LS5, LS6 and LS14 are positioned in conductor 535. Limit switches LS5 and LS6 are connected in parallel whereby at least one of them must have closed contacts since the conductor 535 is connected through the normally open contacts of the said limit switches. To close one of the limit switches LS5 or LS6, the table shifting assembly 70 must be either all the way to the left or all the way to the right of the bottle blowing machine. In the present instance, it is assumed that said table shifting assembly is positioned on the extreme left thereby depressing the operating member 487 of LS5 and closing contacts. LS14 is connected in series in the conductor 535 and has normally open contacts. It will be readily seen, therefore, by referring to FIG. 3 that the table 72 must be all the way down whereby the operating member 492 of LS14 is depressed by the switch actuating rod 489 before CR4 can be energized. In this way, it is assured that the core rods 75 are all the way down and the table is shifted either completely to the right or completely to the left before the clamps can close.

Energization of CR4 initiates the closing of all of the mold clamps. Clamp close solenoids HA and JB are connected across the line 512 and L2 by means of conductors 536 and 537 respectively. A low pressure solenoid NA is connected across the line 512 and L2 by means of a conductor 538. It will be noted that the conductor 537 is connected into the line 538 at the junction 539 whereby energy is delivered to the clamp close solenoid JB. A conductor 540 is also connected at one end to the junction 539 and at the other end thereof to the line L2. Conductor 540 has interposed therein contacts 541 which are closed when the contacts 515 and 517 are closed to form the circuit for the automatic cycle. A thermal relay 542 is also connected into the conductor 540 in series with the contacts 541.

Circuits to the solenoid HA, NA and JB are completed by the closing of normally open contacts CR4' and CR4'a in the conductors 536 and 538 respectively which close in response to the energizing of CR4. Solenoid HA is energized directly by the closing of the contacts CR4' and the solenoids NA and JB are energized through limit switches LS9, LS10 and LS12. The circuit is connected through the normally closed contact LS9" and LS10" which open when the blow molds close completely (FIG. 18). LS12', a normally open pair of contacts, provide the connection through LS12 and are closed by the barrel cam 476 during a portion of the closing movement of the parison mold assembly 56. It will be noted that the limit switches LS9, LS10 and LS12 are connected in parallel in the conductor 538 whereby as long as any one of the contacts LS9", LS10" or LS12' is closed, both solenoids NA and JB will be energized.

By referring to FIG. 35, it will be seen that energizing of the solenoids HA, NA and JB actuate values which direct fluid to the clamp cylinders 61, 63 and 65 under a controlled pressure. Solenoid HA actuates a valve 543 whereby it directs fluid as indicated by the arrows at 543a. Another solenoid HB is also adapted to actuate the valve 543 whereby fluid is directed in a pattern as indicated by the arrows at 543b. Solenoid JB similarly actuates a valve 544 to direct fluid as indicated by the arrows at 544b. A similar solenoid JA actuates the valve to direct fluid according to the pattern as indicated at 544a. Solenoid NA actuates valve 545 to direct the fluid as indicated at 545a.

The hydraulic system comprises two pumps, a relatively higher volume pump 546 and a relatively lower volume pump 547. Both of these pumps 546 and 547 are driven by a suitable motor 548. The larger pump 546 is adapted to deliver a relatively high pressure, for example, 1250 p.s.i., by means of a pressure control relief valve 549. A second relief valve 550 drains through line 551 to a valve 552 which normally directs the draining fluid back to a common supply reservoir or tank as indicated at X. The relief valve 550 is adapted to reduce the pressure from the pump 546 to a relatively lower pressure, for example, 500 p.s.i.

The high volume pump 546, when all of the valves are in the positions as shown in FIG. 35, delivers hydraulic fluid outwardly through lines 553 and 554. Hydraulic line 553 directs fluid to the valve 544 through which it passes into an outgoing line 555. The lines 554 and 555 interconnect and fluid therein is directed through a branch line 556 into and through another valve 557. From the valve 557 the fluid from the larger pump is directed through a line 558 to a heat exchanger 559, which directs the fluid back to the supply tank X and is provided with a by-pass line 560 in which is a safety valve 561.

A relief valve 562 adapted to maintain the fluid from the larger pump 546 at the same potential pressure level as the relief valve 549 is connected into the line 553. A drain line 563 from the valve 562 is connected into the control valve 545 where, as shown in the drawings, it is ordinarily blocked. From the foregoing it will be understood that when the high volume pump 546 is operating under conditions shown in the diagram of FIG. 35, the potential pressure in the line would be that maintained by the relief valve 550 or about 500 p.s.i.

The relatively smaller volume pump 547 is adapted to deliver a maximum high pressure of, for example, 1250 p.s.i. by means of a relief valve 564 which is similar to the valves 562 and 549. A pilot line 565 connects the relief valve 564 with a control valve 566, said control valve 566 normally directing the fluid from the pilot line 565 through line 567 to a relief valve 568. Relief valve 568 reduces the potential pressure in the line to approximately 400 p.s.i. Fluid from the low volume pump 547, as shown in the diagram, is blocked in every direction except through the relief valve 568.

From the foregoing it will be readily seen that when the solenoids HA and JB are energized, the fluid in the lines passes through the valves 543 and 544 in the directions as indicated by the flow patterns at 543a and 544b respectively. Fluid from the line 553 crosses through and leaves the valve 544 by means of the line 569. Fluid from the relatively smaller pump 547 leaves the pump through a line 570 and enters the valve 543 through lines 571 and 572. The fluid passes through the valve 543 and through line 573 and enters line 574 which interconnects said line 573 with the line 569. From line 574 the fluid passes through line 575 to be delivered to the upper ends of the clamp cylinders 61, 63 and 65 by means of a line 576 connected to said cylinders. Energization of the solenoid NA simultaneously drops the pressure in the line to approximately 150 p.s.i. by directing fluid from the pilot line 563 to a suitable relief valve 577. As a result the mold clamps close under the relatively low pressure of 150 p.s.i. until such time as all of the contacts of the limit switches LS9, LS10 and LS12 are opened. In other words, all of the clamps are maintained under low pressure until they are completely closed. Any obstruction which may be in the path of the closing clamps will, therefore, hold the clamps open and prevent the application of high pressure upon the mold halves.

The thermo relay 542 (FIG. 34) is connected into the same circuit which energizes the low pressure solenoid NA. Said thermo relay has a pair of normally open contacts 542' disposed in the conductor 523. If, due to an obstruction in one of the molds, said molds do not close within a predetermined length of time, the contacts 542 of the thermo relay close thereby completing a circuit through the conductor 523 and energizing the control relay CR1. The lamp 521 and the bi-metal flasher 522 are also energized through conductors 523—524—520. Thus the lamp 521 begins to flash on and off.

Normally open contacts CR1' disposed in the conductor 520 between lines 512 and conductor 524 immediately close thereby providing a holding circuit to keep the lamp 521 flashing. At the same instant, normally closed contacts CR1" in the conductor 526 open thereby de-energizing control relay CR2. This causes contacts CR2'a to open thereby isolating the overall timer T1 and stopping the operation of the machine.

The thermo relay safety feature not only operates when there is an obstruction in the closing molds, but also under any circumstances wherein the low pressure solenoid NA remains energized after the clamps have closed. If the parisons were to be injected at the parison molds with the clamps under low pressure, the pressure from the incoming molten plastic would tend to open said parison molds. Therefore, it is important to stop the machine and warn the operator if for any reason the lower pressure solenoid remains energized.

It will also be noted that the whisker switches LS17 and LS18 are connected in parallel with the thermo relay contacts 542' through their normally open contacts LS17' and LS18'. LS17 is connected around the contacts 542' in conductor 597, and contacts LS18' are connected around the contacts LS17' by conductor 593. Thus it will be seen that closing one of the contacts LS17' or LS18' has precisely the same effect as closing of the contacts 542', that is, stopping the machine and causing the lamp 521 to flash a warning signal.

As well shown in FIG. 16, closing of the parison mold causes the limit switch LS1 to be tripped by the downwardly moving cam 475. Contacts LS1′ of the limit switch LS1 are thereby closed energizing control relay CR11 through a conductor 580. The conductor 580 is connected between the lines 512 and L2 with LS1′ and CR11 connected in series therein. Normally open contacts CR11′ in a conductor 581 thereby close. Conductor 581 is connected between the lines 512, L2 and has interposed therein in series a full pressure control solenoid NA4. At the same time a second pair of normally open contacts CR11′a start an injection delay timer T3. The timer T3 is connected in series across the lines 517 and L2 by a conductor 582, and the circuit through said conductor and said timer is completed when contacts CR11′a are closed.

Referring now to FIG. 35, it will be seen that solenoid NA4 actuates control valve 566 causing fluid from the pilot line 565 to follow the flow pattern shown at 566a or, in other words, to cut off the flow of fluid to the relief valve 568. As hereinbefore mentioned, closing of the clamps also de-energizes solenoid NA thereby blocking fluid in the pilot line 563 and preventing it from passing through the relief valve 577. At the same time, solenoid JB is de-energized whereby fluid from the large volume pump 456 is taken out of circuit with the fluid from the lower volume pump 547. The result is that fluid from the low volume pump 547 is directed above the clamp closing cylinders 61, 63 and 65 under high pressure of about 1250 p.s.i.

When the limit switch LS9 is tripped due to the closing of the left blow mold assembly, normally open contacts LS9′ are closed thereby energizing a control relay CR14 (FIG. 34A) through a conductor 583 which is connected across the lines 514 and L2. CR14 has a pair of normally open contacts CR14′ and CR14′a. Closing of CR14′ energizes a control relay CR10 by completing a circuit through a conductor 584 between lines 512 and L2. Closing of CR14′a starts a bottle blowing timer T7 by completing a circuit through conductor 585 across the lines 512 and L2.

CR10 is a selector relay which selects between 100 p.s.i. air pressure to be delivered to the core rods. Normally open contacts CR10′ and CR10′a are closed in conductors 586 and 587 respectively which provide energy to air left solenoid AL100 and AR100. Both the conductors 586 and 587 are connected through the limit switch LS16 which determines whether the air will be delivered to the right hand group of core rods or the left hand group of core rods. With the table 72 shifted all the way to the left, normally open contacts LS16′ close and normally closed contacts LS16″ open whereby energy is available to solenoid AL100 through the conductor 586. Completion of the circuit through 586 also depends upon normally open contacts T7a of the bottle blowing timer and LS10′ which are associated with the right clamp assembly and which will be closed if the right hand clamp is closed.

An air left solenoid AL40 is energizable through conductor 588 which is connected at one end to the conductor 586 between LS16′ and AL100 and at the other end thereof to L2. Similarly, an air right solenoid AR40 is energizable through a conductor 589 which is connected at one end to the conductor 587 between LS16″ and AR100. Normally closed contacts CR10″ and CR10″a are respectively interposed in the conductors 588 and 589. The normally closed contacts of CR10 open when the normally open contacts close whereby the air is selectively delivered to the core rods at either 100 p.s.i. or 40 p.s.i. In the present instance, CR10′ is closed and CR10″ is open whereby the air will be delivered to the core rods at 100 p.s.i. when contacts T7a close. The air will be delivered to the left group of core rods because the contacts LS16′ will be closed and the contacts LS16″ will be open thereby breaking the circuit to either AR100 or AR40.

Concurrently with the above, the injection delay timer T3 times out thereby closing normally open contacts T3b. The contacts T3b (FIG. 34) complete a circuit through a conductor 590 between line 514 and L2 to energize control relays CR12 and CR16. CR12 is connected directly in series with the conductor 590 and CR16 is connected in series with a conductor 591 which is in turn connected at either end into the conductor 590 on either side of CR12. CR12 and CR16 are, therefore, connected in parallel to be simultaneously energized when contacts T3b close.

Normally open contacts of CR12 as indicated at CR12′ then close starting the injection timer T4 through conductor 592 which is connected across the automatic operation line 514 and L2. At the same time, normally open contacts CR12′a close and energize nozzle forward solenoid F1A through conductor 593 which is connected across the lines 514 and L2. Contacts CR16′ of control relay CR16 also close completing a circuit from line 514 to L2 through conductor 594 to start a precompression timer T6.

As seen in FIG. 35, energization of nozzle forward solenoid F1A causes a control valve 595 to direct fluid to the hydraulic cylinder 300 through line 622 as indicated by the arrows at 595a thereby moving the injection nozzle 340 forwardly into the sprue openings 380 of the parison mold units 241. Hydraulic fluid is directed to the control valve 595 by a hydraulic line 596 which is connected into the line 571.

The injection delay timer T3 delays actuation of the injection timer T4 whereby the injection of the parisons at the parison molds will not be completed substantially before the bottles are blown at the left hand blow mold. Particularly in the case of larger bottles a relatively substantial length of time is necessary for blowing them. Premature injection of the parisons would give said parisons too much time to cool upon the core rods 75. Therefore, the injection delay timer T3 is utilized to hold back on the injection of the plastic until the optimum time whereby the blown bottles will be completed at the same time as the complete formation of the new parisons. Meanwhile, of course, the nozzles 340 are moved forward.

Slightly before the injection of the parison, therefore, the contacts T7a close thereby energizing air left solenoid AL100 through the conductor 586 and contacts LS10′, LS16′ and CR10′. Air is then introduced through the left hand group of core rods at 100 p.s.i. to blow the bottles.

Referring now to FIG. 36, the air system for providing pressure to either blow the parisons into bottles or eject the blown bottles from the core rods selectively at either the right or left hand group of core rods comprises a main air line 600 which supplies air under sufficient pressure and in sufficient volume from a suitable air compressor or the like (not shown). The main air line 600 has a pair of branching lines 601 and 602 wherein the pressure is controlled by a pair of pressure regulating valves 603 and 604 respectively. In the present embodiment, the regulating valve 603 maintains the pressure in the branch line 601 at 40 p.s.i. whereas the regulating valve 604 similarly controls the pressure in the branch line 602 and maintains it at 100 p.s.i. A main valve means is provided at 605 and left and right ejection valve means are provided at 606 and 607 respectively. The main valve means 607 is adapted to direct air at 100 p.s.i. to either the group of core rods disposed within the left blow mold or that group of core rods disposed within the right blow mold. The ejection valve means 606 is adapted to direct air at 40 p.s.i. to the core rods positioned in the left blow mold while simultaneously directing air to the left hand ejection cylinder 176 which is associated with said left blow mold. Ejection valve means 607 similarly directs air to the right hand group of core rods and simultaneously to the ejection cylinder associated therewith. The system is so arranged that air at either a high or relatively lower pressure is directed to that group of core rods which is associated with a blow mold while delivering no air to that group of core rods which at the same time is associated with the parison mold.

The main valve means 605 comprises a main air valve 608, a pair of solenoid operated pilot valves 609 and 610, and a pair of manually operable pilot valves 611 and 612. Air conduit 613 directs air from the branch line 602 to the main valve 608 which, in turn, in its normal or neutral position, blocks the air from said conduit 613. Pilot line 614 is connected into the conduit 613 and directs air to the manually controllable pilot valves 611 and 612. Said pilot valves 611 and 612 are also provided with exhaust lines 615 and 616 respectively. The normal position of pilot valve 611 as designated at 611a is connected in series with the solenoid operated valve 609 when the latter is in its neutral or normal position as indicated at 609a. Similarly, pilot valve 612 when in neutral as indicated at 612a is connected in series with the solenoid operated valve 610 when the latter is in its inactive position as indicated at 610a. Pilot valve 609 is in turn connected to the main valve 608 by a pilot line 617 whereas the pilot valve 610 is similarly connected to said main air valve through pilot line 618. From the foregoing it will be understood that when all of the valves in the main valve means 605 are in their neutral or unactuated positions, the pressure in the pilot lines 617 and 618 will be equal, thereby maintaining the main air valve 608 in its neutral or inactive position.

The solenoid operated valves 609 and 610 are provided with exhaust line 619, said exhaust line 619 being also connected to the main air valve 608 by exhaust line 620.

The left hand ejection valve means as shown at 606 comprises a main valve 625, a solenoid operated pilot valve 626, and a manually operable pilot valve 627. The main valve 625 is connected to the 40 p.s.i. line 601 by a connecting line 628 which normally directs air through the main valve 625 into another connecting line 629 which in turn directs it to the left hand ejection cylinder 176. The line 629 is connected to said ejection cylinder whereby the stripper plate 178 thereof is normally held in a retracted position. A line 630 interconnects the branch line 602 carrying 100 p.s.i. pressure to the manually operable pilot valve 627, which in its normal position directs air according to the flow pattern 627a to connect said manual valve in series with valve 626. The line 630 is also connected to a line 631 which is directed to an operating means 632 of the main valve 625, and a pilot line 633 interconnects the operating means 632 with the solenoid operated pilot valve 626 at 626a. An exhaust line 634 leaves the pilot valve 626, and is connected to the main valve 625 by the line 635.

From the foregoing it will be seen that air under 100 p.s.i. is introduced to the operating means 632 through both the line 631 and the pilot line 633. Under these conditions, said operating means holds the valve 625 in the position shown whereby the flow pattern as indicated at 625a is effective. When either the solenoid operated valve 626 is energized or the manual valve 627 is actuated, the pilot line 633 is thereby connected to an exhaust line and this causes the main valve 625 to shift whereby the flow pattern at 625b is effective. When solenoid AL40 is energized, air in the line 633 is exhausted through the exhaust line 634. When the manual valve 627 is actuated air from the line 633 exhausts through the valve 626 and through the manual valve 627 according to the flow pattern 627b to be exhausted through an exhaust line 654. Either valve 626 or 627 is therefore effective to shift the main valve 625.

The left blow mold is provided with an air line 636 which is connected to the core rods 75 at one end thereof and to a selector valve C at the other end thereof. A low pressure line 637 interconnects the main valve 625 with the selector valve C, and a high pressure line 638 interconnects said valve C with the main air valve 608. The low pressure line 637 passes through the main valve 625 to direct air through the exhaust lines 635 and 634. Low pressure line 637 is also connected to the injection cylinder 176 behind the piston thereof by means of line 639. It will be readily seen that lines 639—637 serve as exhaust means for the ejection cylinder 176 when the piston rod 177 thereof is retracted.

Selector valve C is adapted to direct air to the left group of core rods 75 from either the main valve 625 at 40 p.s.i. or from the main valve 608 at 100 p.s.i. Said valve C is also adapted to automatically block the low pressure line 637 when air under high pressure is directed through the high pressure line 638 thereby preventing the air from the main valve 608 from being exhausted through the main valve 625.

The right hand ejection valve means 607 comprises the same functional elements and operates in the same manner with respect to the right hand group of core rods as does the valve means 606 with respect to the left hand group of core rods. Valve means 607 has a main valve 640, a solenoid operated valve 641, and a manually operable pilot valve 642. The pilot valve 642 is connected to the high pressure line 602 by means of a line 643, and line 644 is connected between line 643 and operating means 645 of the main valve 640. An exhaust line 646 is connected from the operating means 645 to the solenoid pilot valve 641 which is connected in series with the manual valve 642. Exhaust line 647 is directed from the pilot valve 641, said exhaust line 647 being interconnected with the main valve 640 by line 648. The pilot valve 642 also has an exhaust line at 655.

A connecting line 649 directs air from the low pressure line 601 through the main valve 640 and through a line 650 to the forward end of the ejection cylinder 176 which is associated with the right hand group of core rods 75. Selector valve D operates in the same manner as selector valve C, said selector valve D being connected into the right hand group of core rods by means of line 651. Selector valve D is in turn connected on one side by a line 652 to the main air valve 608 and on the other side by a line 653 to the main valve 640. The selector valve D directs air at either high or low pressure to the right hand group of core rods and also serves to block line 653 when air is directed from the main air valve 608 to the core rods 75. Line 654 connects the ejection cylinder 176 with the line 653 whereby air is exhausted from said ejection cylinder through the valve 640 when the piston rod thereof is retracted.

Referring now to FIGS. 34—34A, the solenoid AL100 actuates the pilot valve 609, and the solenoid AR100 actuates the pilot valve 610. Solenoid AL40 actuates pilot valve 626, and solenoid AR40 actuates pilot valve 641. When solenoid AL100 is energized by the closing of contacts T7a, the valve 609 shifts to the flow pattern indicated at 609b thereby causing the main air valve 608 to shift to the air flow pattern as indicated at 608a. Air at 100 p.s.i. then flows from branch line 602 through 613, the main valve 608, line 638, selector valve C, and line 636 to the left hand group of core rods 75. In this manner, the parisons on the left hand group of core rods are blown into bottles. After the bottles are blown and AL100 is de-energized, and before the clamps are opened, the pressure within the newly blown bottles is relieved through the selector valve C, line 637, main valve 625, and exhaust lines 635—634.

Energization of solenoid AR100 operates to direct air to the right hand group of core rods 75 in a manner similar to that effected by the energization of solenoid AL100. Solenoid AR100, when energized, connects the exhaust line 618 with the line 614 through the flow pattern as indicated at 610b. This causes the main air valve 608 to shift to the flow pattern indicated at 608b whereby air from connecting line 613 passes through said main air valve, through line 652, selector valve D, and line 651 to the right hand group of core rods. The pressure within the newly blown bottles can also exhaust from the right side through the line 653 and the main valve 640. It will be understood that both the selector valves C and D effectively prevent exhausting of the low pressure during ejection of the bottles by blocking the path to the exhaust line 620 of the main air valve.

When the injection timer T4 is energized by closing of the contacts CR12', contacts T4a close thereby energizing a control relay CR5 through a conductor 660 connected across the line 514 and L2. Normally open contacts CR5' thereby close energizing injection forward solenoid KB through conductor 661 which is also connected across the lines 514 and L2.

Referring now to FIG. 35 and the schematic showing of the hydraulic system, it will be seen that energization of solenoid KB causes the valve 557 to shift whereby the flow pattern as indicated at 557b is effected. Fluid from the line 556 then passes through the valve 557 and into a fluid line 662 from which it is directed through the check valve 315 into the injection cylinder 86. The fluid is introduced behind the piston whereby the ram 88 is caused to move forwardly. The pressure with which the ram 88 is moved forwardly at this point is relatively low since the maximum potential in the line is controlled by relief valve 550 which drains through the drain line 551 into the valve 552 and back to the tank or reservoir X. Pressure is thus maintained at a maximum of about 500 p.s.i. The injection ram 88, therefore, moves forwardly placing the plasticized material in the material heating chamber 87 under pressure preparatory to the injection molding of the parisons at the parison mold.

Almost immediately the precompression timer T6 times out thereby closing the contacts T6b (FIG. 34) and energizing a control relay CR13. CR13 is connected across the lines 514 and L2 by a conductor 664. It will be noted that conductor 664 also has a second normally open pair of contacts CR5'a interposed therein which said contacts have been previously closed by energization of CR5.

CR13 has a pair of normally open contacts CR13' and CR13'a. These contacts close when CR13 is energized, CR13' (FIG. 34) starting an injection booster timer T5 and CR13'a (FIG. 34A) energizing precompression solenoid RB. CR13' is connected in series with conductor 665 across the lines 514 and L2 to energize the timer T5. CR13'a is connected in series with a conductor 666 which is connected at one end to the line 514 and at the other end thereof to a conductor 667. Conductor 667 energizes solenoid RB and is connected into L2.

When the injection booster timer T5 is started, contacts T5a close thereby energizing injection booster solenoid N2a which actuates the valve 552. T5a is connected in series with conductor 668 which in turn energizes N2a across lines 514 and L2.

The energization of solenoid RB actuates a control valve 669 which is connected into the fluid line 571 by lines 670. Control valve 669, in its normal position, directs fluid from the line 670 to the precompression cylinder 347 in such manner as to hold the precompression valve in its closed position. Energization of solenoid RB causes the fluid to follow the flow path as indicated at 669b whereby fluid coming from the line 670 enters the precompression cylinder 347 in such manner as to cause said valve to open. The precompression unit 89 is, therefore, closed by the valve 669 directing fluid through the fluid line 671 and is opened by said valve directing fluid through the line 672.

The purpose of the precompression valve is to give a more rapid fill of the parison mold. This is accomplished by holding the plasticized material in check adjacent the nozzles 340 until the ram 88 has moved forward a short distance. This places the plastic under increased pressure which is suddenly released when the precompression valve is opened by energization of the solenoid RB. It has been found that filling the parison mold in this manner insures a more completed and positive fill resulting in a more perfect finished article.

Immediately upon opening of the precompression valve, solenoid N2a causes the valve 552 to shift whereby the flow pattern as indicated at 552a is made effective. This blocks the flow through the drain line 551 thereby rendering the relief valve 550 ineffective. The result is that the potential pressure in the lines from the high volume pump 546 suddenly increases to its maximum as determined by the relief valve 549 and 562. The ram 88 is, therefore, urged forward with suddenly increased power.

It has been given by way of example that the pressure in the lines from the high volume pump 546 is maintained at a controlled 1250 p.s.i. by the relief valves 549 and 562. However, the high pressure which is desired behind the ram when the injection booster solenoid N2a is energized may vary with different plastics and different articles of manufacture. Therefore, a relief valve 673 is connected into the line 662 which furnishes fluid for moving the ram 88 forward. Relief valve 673 is adjustable and may be used to reduce the high pressure boost that the ram 88 gets, if so desired.

The full pump delivery and pressure are provided to the ram 88 until the injection booster timer T5 times out at which point the contacts T5a open and the injection booster solenoid N2A is de-energized. By this time, the ram 88 has reached the forward end of its stroke at which point limit switch LS15 (FIG. 31) is tripped by the adjusting pin 335 of the switch operating on 333. Normally open contacts LS15' close thereby energizing conductor 674 which in turn energizes an injection low pressure dwell solenoid N3a. The conductor 674 is connected across the lines 512 and L2, and it will be noted that current through this conductor is also dependent upon a third pair of normally open contacts CR5'b which were closed by the control relay CR5. Energization of the low pressure dwell solenoid N3A actuates a valve 675 which is connected on one side to the relief valve 673 of the cylinder 86 and on the other side to a relief valve 676. A pilot line 677 connects the relief valve 673 to the valve 675 which normally blocks the flow of fluid through said pilot line. When solenoid N3A is energized, fluid from the pilot line 677 is allowed to pass through the valve 675 according to the flow pattern as indicated at 675a from which it proceeds to the relief valve 676. Relief valve 676 immediately drops the pressure behind the ram 88 to a much lower pressure, for example, about 400 p.s.i.

This drop in pressure is timed to come just after the parison molds are full, and pressure at this lower level is maintained upon the plastic in the parison molds to insure a complete fill. Plastics tend to shrink as they cool upon being injected upon the core rods and into the parison mold and some injection pressure must be maintained to insure a complete fill and to keep the plastic from shrinking back out of the mold. The period of low pressure dwell is very short, although it varies with different types of plastic, and would generally be for one or two seconds.

The injection timer T4 controls the length of time during which injection takes place, and after a sufficient period of low pressure dwell, T4 times out. This causes contacts T4a to open thereby de-energizing CR5. CR5' contacts in conductor 661 thereby open, de-energizing the injection forward solenoid KB causing the valve 557 to return to its neutral or normal position as shown in FIG. 35. Contacts CR5'a open and de-energize control relay CR13. Contacts CR5'b also open and deactivate the low pressure dwell by de-energizing solenoid N3A. As a result of de-energizing control relay CR13, contacts CR13' open thus preparing the booster timer T5 for the next cycle. Contacts CR13'a also open thereby de-energizing solenoid RB and allowing the precompression unit 89 to return to its normally closed position. As the injection timer T4 times out, contacts T4b close thereby energizing control relay CR6 through conductor 678 which is connected across the lines 514 and L2.

When CR6 is energized, normally open contacts CR6' disposed in series with a conductor 679 close. The conductor 679 is connected at one end thereof to the line 514 and at the other end thereof to one side of normally closed contacts LS3" and normally open contacts LS3' of the limit switch LS3. The other side of the normally closed contact LS3" is connected by L2 by conductor 680 which has disposed in series therein injection return solenoid KA. The other side of the contacts LS3' are connected to a conductor 681 which is in turn connected to conductor 682 which is connected into the line L2. As soon as contacts CR6' close, a circuit is made through contacts LS3" and conductors 679 and 680 to energize the injection ram return solenoid KA. Referring to FIG. 35, energization of solenoid KA causes the valve 557 to shift whereby the flow pattern 557a is effected. Fluid then flows from the hydraulic line 556 through the valve 557 and through hydraulic line 683 to the injection cylinder 86 thereby retracting the ram 88.

As well shown in FIG. 31, when the ram returns, limit switch LS3 is tripped by the switch operating arm 333 striking the operating member 498 of said switch LS3. When this happens, normally closed contacts LS3" open thereby de-energizing the injection return solenoid KA. Normally open contacts LS3' close thereby completing a circuit through conductors 679—681—682 to energize a control relay CR7 connected in series with said last mentioned conductor. CR7 immediately closes a pair of normally open contacts CR7' connected into a jumper line 684 which is connected at one end to the conductor 682 (FIG. 34A) and at the other end thereof to the conductor 661 (FIG. 34). Normally open contacts CR7'a of CR7 also close. These latter mentioned contacts CR7'a are disposed in a conductor 685 which is connected at one end to line 514 and into the normally closed contacts LS4" of the limit switch LS4. The other side of the contacts LS4" are in turn connected to the conductor 681. With CR7' and CR7'a both closed, it will be readily seen that a circuit is formed through conductor 685, contacts LS4", conductor 681, conductor 684, and conductor 661 whereby the injection forward solenoid KB is again energized and the ram 88 again moves forwardly.

As the ram 88 again moves forwardly, LS4 is tripped thereby opening the contacts LS4" and de-energizing the injection forward solenoid KB. At the same time, normally open contacts LS4' are closed. LS4' is connected into conductor 679 by means of a conductor 686. The other end of conductor 686 is connected to L2, and when LS4' closes a circuit is made to a count coil 687 which is connected in series with the said conductor 686. The count coil 687 is part of a prepack system whereby the ram 88 moves between the fully retracted position and the position as indicated at 88a in FIG. 30 for a predetermined number of times in order to pack the material heating chamber 87 with sufficient plastic material for the next injection of parisons.

The prepack system comprises a counter generally indicated at 690 having a wiper arm 691 and wiper contacts 692. Opposite the wiper contacts 692 and connected electrically therewith are count contacts 693 adapted to be selectively contacted by a counter arm 694.

To set the counter 690, the counter arm 694 is placed in contact with one of the count contacts 693 which corresponds to the number of prepack strokes it is desired for the ram to make. For example, if the ram is to make one prepack stroke only, counter arm 694 is placed in contact with the first count contact 693 counting from left to right. If two prepack strokes are desired, the counter arm 694 is placed upon the second count contact. If three prepack strokes are desired as indicated in the present illustration (FIG. 34A), count contact No. 3 is used. The wiper arm 691 is normally positioned out of contact with any of the wiper contacts 692 as shown in the electrical diagram. Said wiper arm 691 so responds to the count coil 687 that each time said count coil is energized said wiper arm moves in a counterclockwise direction to the adjacent wiper contact. When the wiper arm 691 reaches the wiper contact opposite the count contact upon which the counter arm 694 is positioned, an electrical circuit is possible across the counter mechanism.

The wiper arm 691 is connected to the automatic operation line 514 by a conductor 695. The counter arm 694 is connected to L2 by a conductor 696 and has a control relay CR8 connected in series therewith. A conductor 697 is connected between the conductor 696 and L2 and has a counter reset coil 698 connected in series therewith. A conductor 699 connects the conductor 697 with L2 and is adapted to supply current for energizing a control relay CR18. It will be noted that another set of normally open contacts CR6'a are in the conductor 695 whereby a potential circuit through the counter 690 has been previously set up by energization of the control relay CR6 which closed contacts CR6'a.

Normally closed contacts CR7" and CR8" of the control relays CR7 and CR8 respectively are connected in series in the conductor 680 which energizes the injection return solenoid KA. Thus when the normally open contacts of LS3 close as the ram reaches its rearward position, contacts CR7' open thereby deenergizing the injection return solenoid KA. When the ram moves forward, contacts CR7" open but CR7 is maintained in an energized condition due to the closed condition of contacts CR7'a until LS4 is tripped thereby opening contacts LS4".

In view of the above, it will be understood that when contacts LS4' close, the count coil 687 is energized and the wiper arm 691 moves to the adjacent wiper contact 692. Contact LS4" opens de-energizing control relay CR7 and closing contact CR7". This re-energizes the injection return solenoid KA whereby the ram is returned to its retracted position where it again trips the limit switch LS3. This cycle is repeated until the wiper arm 691 has progressed in a counterclockwise direction to the wiper contact 692 which is directly opposite the count contact 693 upon which the counter arm 694 rests. At this instant, a circuit is made through conductor 695, wiper arm 691, counter arm 694, and conductors 696, 697 and 699 respectively simultaneously energize control relay CR8, counter reset coil 698 and control relay CR18. The ram then stops in the position as indicated by the broken line at 88a in FIG. 30 due to the fact that normally closed contacts CR8" open and break the circuit to the injection return solenoid KA while at the same time CR7 is de-energized through the opening of LS4" thereby reopening normally open contacts CR7 and breaking the circuit to the injection forward solenoid KB. With both the injection forward and the injection return solenoids de-energized the ram 88 will remain in the position indicated in the drawings.

The control relay CR8 in conductor 696 acts to energize a holding line 703 which is connected at one end to the conductor 660 between the branchline 514 and the contacts T4a and at the other end thereof to the conductor 696. Normally open contacts CR8' in the conductor 703 close in response to energization of control relay CR8 thereby maintaining a circuit to the counter reset coil 698 and the control relay CR18. Contacts T4c which are closed at all times except when the injection timer T4 is timing are also disposed within the conductor 703. This prevents the maintaining line 703 from being energized until after T4 has timed out and injection operation is terminated. By energizing CR8 and closing contacts CR8', energy is provided to the counter reset coil 698 for a sufficient length of time to insure that the wiper arm 691 is completely reset at its starting position. At the same time, energization of control relay CR18 opens normally closed contacts CR18″ in the conductor 686 thereby opening the circuit to the count coil.

As the ram 88 is going through the prepack operation just described, the plunger 319 of the material feed mechanism 83 reciprocates with said ram thereby feeding the granulated material from the hopper 82 through the housing 318 and into the funnel 84. From the funnel 84 the material drops down into the bore 314 and is progressively moved through said bore by the reciprocating action of the ram to move it into the material heating chamber 87 to be plasticized. The amount of material to be packed into the heating chamber 87 is controllable by the number of prepack ram strokes to be taken in conjunction with the adjustments hereinbefore described in relation to the material feed mechanism 83.

The foregoing prepack operation is generally concurrent with the latter portion of the blowing of the bottles at the left blow mold in the cycle presently being described. In other words, the parisons are injected at the parison mold and the material injection assembly 80 is prepared for the next injection during the blowing of the bottles. The bottle blowing timer T7 then times out whereby contacts T7a return to their open position and air left solenoid AL100 is de-energized.

With the bottles fully blown at the left hand blow mold, the mold clamp timer T2 times out thereby opening contacts T2a, de-energizing CR4, opening contacts CR4′ and CR4′a, and de-energizing the clamp close solenoids HA and JB. Valves 543 and 544 are thereby allowed to return to their neutral or normal position as shown in FIG. 35. However, at the same time contacts T2b close to cause the clamps to open.

Contacts T2b are disposed in a conductor 700 which also has connected in series therewith the normally closed contacts LS2″ of the limit switch LS2. The conductor 700 is connected across the lines 514 and L2 and has interposed therein in series a nozzle retract solenoid F1B. Conductor 701 is connected from the conductor 700 across to L2 and energizes clamp open solenoid HB. Conductor 702 is likewise connected from the conductor 700 to L2 and is adapted to energize clamp open solenoid JA. Conductor 703 is connected across from conductor 700 to line L2 for energization of a table up solenoid E2A, said conductor 703 having in series therewith normally closed contacts LS13″ and LS24″ of limit switches LS13 and LS14 respectively.

By referring to FIG. 3 it will be noted that LS13 is tripped within the table 72 is in the uppermost position whereby the contacts LS13″ are opened. By referring to FIG. 16, it will be noted that the limit switch LS24 is tripped when the parison mold is closed whereby the contacts LS24″ would be held in their open position. The barrel cam 474 which actuates the limit switch LS24 is of such length that LS24 is not released until the clamps have opened a predetermined distance, preferably about two inches. At that time the operating member 472 rides off the barrel cam 474 thereby allowing LS24″ to close and complete a circuit to the table up solenoid D2A. Since LS13, at this time, has not been tripped, the table 72 is allowed to move upwardly due to the fact that both contacts LS24″ and LS13″ are now closed and E2A is energized.

It will be readily seen, therefore, that the closing of contacts T2b provide circuits through conductors 700, 701, 702, to immediately energize the clamp open solenoids HB and JA and the nozzle retract solenoid F1B. After the clamps have opened a predetermined distance, contacts LS24″ close thereby energizing conductor 703 and consequently the table up solenoid E2A.

Referring to FIG. 35, energization of solenoid HB and JA will cause fluid passing through the valves 543 and 544 to follow the flow pattern indicated at 543b and 544a whereby fluid enters a common fluid line 705 from which it is directed to the bottom of the cylinders 61, 63 and 65 through fluid line 706. In this manner, all of the clamps are caused to open. At the same time as the clamps are opened, the nozzles 340 are retracted by energization of the nozzle retract solenoid F1B. This causes the valve 595 to shift whereby it affords the flow pattern indicated at 595b to the fluid whereby fluid is directed to the front of the cylinder or motor 300 to retract the injection assembly.

When limit switch LS24 is released, table up solenoid E2A is energized thereby actuating a control valve 707. Said valve 707 shifts to effect the flow pattern indicated at 707a whereby fluid is directed from line 596 through a fluid line 708, the valve 707, and a fluid line 709 to raise the table 72. The raising of the table 72 raises all of the core rods, the left hand group of core rods now having fully blown bottles thereon and the right hand group of core rods having freshly molded parisons thereon.

Delaying the energization of the solenoid E2A until the clamps have opened approximately two inches insures that said clamps and the molds associated therewith will always be opening ahead of the upwardly moving core rods. This prevents the newly blown bottles and the newly formed parisons from being damaged or distorted in shape by pressing against or striking the upwardly moving upper blow mold halves. Contact with the upper parison mold half by the parisons may also cause the upper part of the parison to be overheated resulting in an inconsistency in the softness of the parison. In other words, the upper mold halves always separate from the upwardly moving core rods to prevent contact therebetween as the clamps open and the table raises.

When the limit switch LS13 is tripped by the raising of the table 72, normally open tacts LS13′ close thereby energizing a control relay CR15 through a conductor 710 connected across the lines 512 and L2. A normally open contact CR15′ immediately closes to start a stripper timer T8 which is connected in series with a conductor 711 across the lines 514 and L2. Normally open contacts T8a in the conductor 587 are thereby closed. This completes a circuit across the lines 512 and L2 through the conductor 519, conductor 586, conductor 587, a conductor 712 back to conductor 586, and through the contacts LS16′ which are normally open but which are now closed due to the position of the table shifting assembly 70 toward the left. Selector relay CR10 is now de-energized due to the opening of normally open contacts LS9′ when the limit switch LS9 was released upon opening of the left blow mold clamp assembly 57. The opening of contacts LS9′ de-energizes control relay CR14 thereby opening normally open contacts CR14′ and de-energizing CR10. De-energization of CR10 causes the normally closed contacts CR10″ to again close and the normally open contacts CR10′ to open. The circuit is thus completed through the conductor 588 to the air left solenoid AL40 to cause the newly blown bottles to be ejected from the left hand group of core rods. Actuation of solenoid AL40 (FIG. 36) causes the control valve 626 to shift to the flow pattern indicated at 626b. As a consequence thereof, the main valve 625 shifts to the flow pattern as indicated at 625b whereby air from the low pressure branch line 601 is directed through line 628, valve 625, and line 637 to both line 639 and the selector valve C. Air entering the line 639 actuates the ejector cylinder 176 and operates the left hand stripper plate 178 and the associated pusher bar 175. Air passing through the selector valve C enters the left hand group of core rods through line 636 to assist in ejecting the bottles by blowing thereinto at 40 p.s.i.

When the stripper timer T8 times out, contacts T8a open thereby de-energizing solenoid AL40. As can be easily understood, this causes the valve 625 and 626 to return to the position shown and also causes the piston rod 177 of the ejection cylinder 176 to retract. Retraction of said cylinder also retracts the left-hand pusher bar 175 which in turn trips the limit switch LS19. It will be noted that the right-hand pusher bar is also in the retracted position whereby LS20 is also tripped. At this time, contacts T8b close thereby energizing a table right solenoid E1A. Contacts T8b are interposed in a conductor 713 which is connected between the automatic line 514 and the limit switch LS11. Also, connected in series with the conductor 713 are a plurality of safety interlocked contacts all of which must be closed before the table will shift. Normally open contacts of limit switches LS7 and LS8 as indicated at LS7' and LS8' are in the line 713 to insure that the table will not shift unless the blow molds are fully opened (see FIG. 18). Normally open contacts LS2' of limit switch LS2 are also provided in conductor 713 to insure that the table will not shift unless the parison mold is fully opened (see FIG. 17). Normally closed contacts LS17'' and LS18'' of the whisker switches LS17 and LS18 respectively are also interposed in line 713 to break the table shifting circuit if a blown article or ruptured parison is still on a core rod thereby striking one of the whisker switches. When the table is shifting from left to right, the articles have just been blown on the left hand group of core rods and, therefore, whisker switch LS17 would be utilized to break the table shifting circuit if a blown bottle were still on one of the core rods. The parisons, newly formed on the right hand group of core rods, would lightly brush against the operating member 497 of LS18 but would not trip it because said parisons would be moving from the parison mold toward the blow mold. Upon reverse movement of the table 72, it will be readily seen that limit switch LS18 would strike any blown bottles or parisons still on the right hand core rods and consequently stop the machine.

As previously indicated, the operation of the limit switch LS11 is an exception to the general operation of all other limit switches herein described. The contacts of LS11 do not reverse position except upon a separate actuation of the operating member 478 thereof. In other words, each time the parison mold fully opens, the operating member 478 is struck by the lug 480 and the contacts of LS11 respectively reverse their position and remain there. In the present instance, already open contacts LS11' would close upon opening of the parison mold and consequently already closed contacts LS11'' would open.

As seen in FIG. 34A, table shift left solenoid E1A is connected in series with a conductor 714 between contacts LS11' and L2. Table shift right solenoid E1B is similarly connected between contacts LS11'' and L2 by conductor 715. It will be readily seen that when the table 72 is initially in the left hand position and providing that all of the contacts LS7'—LS2'—LS8'—LS17''—LS18'' are closed, E1A is energized. An additional safety interlock is provided in the form of a pair of normally open contacts CR15'a which are positioned in the conductor 713 and are closed when the control relay CR15 is energized. Contacts CR15'a contribute in setting up a potential circuit to solenoid E1A only after the ejector timer T8 has been started.

As shown in FIG. 35, solenoid E1A and E1B operate a control valve 716 shiftable to provide flow patterns as indicated at 716a and 716b. When solenoid E1B is energized, flow pattern 716a is set up whereby fluid from line 596 passes through a fluid line 717, through the valve 716, and through another fluid line 718 to cause the housing 100 to move from left to right. When solenoid E1B is energized, fluid enters the valve 716 by line 717, follows the flow pattern as indicated at 716b, and enters on the opposite side of the piston 107 through fluid line 719. This causes the housing 100 to shift from right to left. Once the limit switch LS11 is set to a position corresponding to the initial position of the table 72, said table will shift either toward the right or the left depending upon the terminal position of said table just prior to any given shifting operation.

With the table shifting assembly 70 shifted all the way to the right side of the machine, the overall timer T1 times out thereby closing normally open contacts T1b. Contacts T1b are interposed in a conductor 720 which is connected across the lines 514 and L2. Normally closed contacts LS14'' are also disposed in the conductor 720 to render a circuit therethrough impossible when the table 72 is in the lowermost position (see FIG. 3). Contacts T1b complete a circuit through conductor 720 to energize a control relay CR3. A first pair of normally open contacts CR3' disposed in a holding line 721 connected across the line 514 and conductor 720 around the contacts T1b close. A second pair of normally open contacts CR3'a disposed in a conductor 722 close to energize a table down solenoid E2B. The conductor 722 is connected across lines 514 and L2 and completes its circuit through normally open contacts LS23' of the limit switch LS23. By referring to FIG. 3, it will be noted that when the housing 100 is in the extreme right hand position, the cam 494 trips the limit switch LS23 resulting in the closing of the normally open contact LS23'. Since LS23 can be tripped only when the housing is in one extreme position or the other, the table 72 is disabled from moving downwardly in any intermediate position. This safety interlock prevents the core rods from being brought downwardly at any time other than when they are perfectly aligned with one or the other pair of molds. Conductor 722 also has normally open contacts LS19' and LS20' of the limit switches LS19 and LS20 interposed therein. LS19' and LS20' are closed only when the pusher bars 175 are retracted (FIG. 6) thereby assuring that the table 72 will not be lowered with said pusher bars and their associated stripper plates 178 are in the extended or rearmost position.

As seen in FIG. 35, energization of the table down solenoid E1B causes the control valve 707 to direct fluid according to the flow path 707b. Fluid from the line 708 thereby passes through the valve 707 and into a fluid line 723 by which it is directed above piston 154 to cause the table 72 to move downwardly.

Closing of the contacts CR3'a also energizes a control relay CR17. CR17 is disposed in a conductor 724 which is connected at one end thereof to the cycle start button 525 (see FIG. 34) and at the other end thereof to L2 (FIG. 34A). A jumper line 725 interconnects conductor 722 with conductor 724 whereby a circuit is completed to CR17 around the cycle start button through conductors 722—725—724. This causes normally open contacts CR17', which are disposed in the conductor 724 between the jumper line 725 and the cycle start button 525, to close. A second pair of normally open contacts CR17'a are disposed in a conductor 726 which is connected between the automatic line 514 and the conductor 535 and by-passes contacts T2a, contact LS5', and contacts LS6' (FIG. 34). The downward movement of the table 72 has, at this time, already caused the switch actuating rod 489 to trip the limit switch LS14 by depressing the operating member 492 (FIG. 3). Thus the closing of contacts CR17'a completes a circuit through conductor 726, limit switch LS14, and conductor 535 to again energize the control relay CR4.

Energization of CR4 closes contacts CR4' and CR4'a thereby energizing the clamp close solenoids HA and JB and the low pressure solenoid NA to cause all of the clamps to close under low pressure as hereinbefore described.

It will be noted that the cycle start button 525 (adjacent the top of FIG. 34) has two pairs of contacts, normally open contacts 525a and normally closed contacts 525b. It will also be noted that the terminals of the contacts 525a and 525b are connected together by a short conductor 727 on the side thereof adjacent the selector switch 527. The conductor 724 which energizes the control relay CR17 (adjacent the bottom of FIG. 34A) is connected to the normally closed contacts 525b of the cycle start button 525. Thus, when the table moves to the lower position and the normally closed contacts LS14" are open thereby de-energizing CR3 and opening contacts CR3'a, CR17 is held in circuit through contacts 528 of the selector switch 527, the conductor 526, the normally closed contacts 525b of the cycle start button, and conductor 724. As long as the cycle start button is not again depressed and the closed contacts 528 are left in their closed position, a new cycle of the machine will not start at this point due to the fact that no current reaches the control relay CR2. As hereinbefore noted, energization of CR2 is necessary to begin another cycle since the overall timer T1 is controlled by and started by the normally open contacts CR2'a in the conductor 532.

If only one cycle is desired, it is necessary to prevent injection of new parisons into the parison molds which now hold the left hand group of core rods. This is accomplished by the opening of normally closed contacts CR17" in the conductor 580 which energizes the control relay CR11. When contacts LS1' close as a result of closing the parison mold, they are ineffective because conductor 580 is broken by the now open contacts CR17'. In this way, the injection delay timer T3 and the entire injection part of the cycle is rendered ineffective.

However, it is necessary at this point to blow the parisons which have been formed upon the right hand group of core rods which were formerly at the parison mold and are now in the right hand blow mold. This is accomplished by the closing of normally open contacts LS9' which completes the circuit through conductor 583 to energize the control relay CR14. Normally open contacts CR14'a then start the bottle blowing timer T7 while contacts CR14' energize the selector relay CR10. Under these conditions, the bottles are blown at the right hand blow mold but no new parisons are formed upon the left hand group of core rods.

At any time during the one cycle operation, the machine may be changed to a repeat cycle by means of the selector switch 527. The repeat contacts 529 are then closed and the one cycle contacts at 528 are opened. As hereinbefore described, when the overall timer T1 times out contacts T1b thereof in conductor 720 close and energize the control relay CR3. Contacts CR3'a thereupon close in conductor 722 and energize control relay CR17. In turn, normally open contacts CR17'a close the conductor 726 thereby preparing a circuit to the clamp close solenoid when limit switch LS14 is tripped thereby closing contacts LS14' in conductor 535. However, when the table is lowered and contacts LS14' close, the normally closed contacts LS14" simultaneously open thereby de-energizing control relay CR3 and opening contacts CR3'a. This leaves the control relay CR17 isolated or de-energized since the circuit through the conductor 724, start cycle button, and conductor 526 is broken at the now opened contacts 528 of the selector switch 527. The result is that the contacts CR17'a are open, and closing of contacts LS14' does not complete a circuit to the clamp close solenoid. However, upon the de-energization of control relay CR3, normally closed contacts CR3" in the starting circuit conductor 526 close thereby completing a circuit across the lines 514 and L2 by means of said conductor 526 and the repeat conductor line 530 which by-passes the cycle start button 525. This circuit is made due to the fact that the repeat contacts 529 are now closed and the result is that control relay CR2 in the conductor 526 is energized and the entire cycle is repeated.

Manual switches are provided in the electrical circuit for moving individual elements of the machine without setting an entire cycle into operation. These manual switches are useful in initially adjusting and setting up the machine for use in blowing a specific article from a specific type of plastic. The manual or push buttons are connected into conductors which are connected at one end to the manual branch line 516 and at the other end to the particular conductor which initiates the desired movement in such manner as to by-pass the contacts which ordinarily complete the circuit for said movement. For manual operation it will be understood that the switch contacts 515 and 516 are closed as a pair and the switch contacts 517 of the automatic line 514 are open.

To close the clamps manually there is provided a manual swtich 730 disposed in conductor 731 which is connected at one end to the manual line 513 and at the other end thereof to the conductor 535. Conductor 731 by-passes the contacts T2a to energize the clamp close solenoids when the table shifting assembly 70 is holding either LS5' or LS6' contacts closed and when the table 72 is down thereby closing contacts LS14'.

A selector switch is shown at 732 having a pair of contacts 733 and 744. Contacts 733 are interposed in a conductor 735 which is connected across the line 513 and conductor 593 thereby by-passing contacts CR12'a of the control relay CR12. It can be readily seen that closing of the contacts 733 will energize nozzle forward solenoid F1A and cause the nozzles 340 to move forwardly. Contacts 744 are connected into a conductor 736 which by-passes all of the contacts in the conductor 709 to energize the nozzle retract solenoid F1B (FIG. 34A).

At 740 there is shown a switch adapted to alternatively close pairs of contacts 740a and 740b. Contacts 740b are disposed in a conductor 741 which is connected at one end to the branch line 513 and at the other end thereof to the conductor 661 which energizes the injection forward solenoid KB. It will be noted that the conductor 741 by-passes the contacts CR5'. Contacts 742 which are disposed in the conductor 741 are contacts of the selector switch for the automatic line and are normally open when the automatic line is in use. On manual operation, the contacts 742 would, of course, be closed. Contacts 740a are disposed in conductor 743 which is connected at one end to the conductor 741 and at the other end thereof into the conductor 679 which controls the injection return solenoid KA. Contacts 744 in conductor 743 are also contacts of the selector switch of the automatic line and, on manual operation, would be closed. It will readily be seen that the switch 740 may be used to either move the injection ram forwardly or rearwardly and that it may be used as a jogging or inching device when making adjustments of the material injection assembly 80.

At 750 there is a manual switch for opening the normally closed precompression unit 89. The switch 750 is connected into a conductor 751 which is connected from the branch line 513 to the junction of conductor 665 and 667. This provides means for opening the precompression unit independently of operating the rest of the machine.

The bottle blowing operation may be initiated through a manual switch 760 interposed in a conductor 761 which is connected at one end to the branch line 513 and at the other end thereof to the conductor 583. Conductor 583 carries the current to energize control relay CR14 which starts the bottle blowing timer T7 through contacts CR14'a and energizes control relay CR10 through contacts CR14'. It will be recalled that the control relay CR10 is the selector relay controlling the air solenoids AL100, AL40, AR100 and AR40.

If it is desired to blow air through the core rods independently of the bottle blowing timer T7, a switch 770 is depressed which completes a circuit through a conductor 771 connected from line 513 to the conductor 712 which is in turn connected across the conductors 586 and 587. A circuit will thereby be completed through either the conductor 586 or 587 and the limit switch LS16 to energize one of the air actuating solenoids.

Manual operation of the clamp open solenoids HB and JA is effected through a switch 780 which completes the circuit through a conductor 781, said conductor 781 being connected across from the branch line 513 to the conductor 709. It will be noted that the conductor 709 has a pair of contacts 782 of the automatic selected switch disposed therein between the junction of conductor 709 with conductor 781 and the junction of conductor 709 with conductor 736. These contacts 782 would be open on manual operation whereby the clamp open solenoids HB and JA and the table up solenoid E2A may be energized by the switch 780 without energizing the nozzle retract solenoid F1B.

The manual switch for shifting the table 72 left or right is shown at 790 and is connected into a conductor 791 which by-passes contacts T8b of the timer T8 and connects branch line 513 with the conductor 713.

A manual button for lowering the core rods is shown at 800 and is disposed in a conductor 801 connected at one end to the branch line 513 and at the other end thereof into the conductor 722. Closing of the switch 800 completes a circuit to the table down solenoid E2B thereby lowering the table.

From the foregoing it will be understood that through the electrical system of FIGS. 34—34A, the bottle blowing machine of this invention may be operated in one of three ways: manually, semi-automatically or one cycle, and automatically or by repeat cycles. The manual operation is primarily effective in setting up the machine and making the proper adjustment for the particular article to be manufactured and/or the material being used. One cycle operation is useful in determining whether or not the machine, once adjusted manually, is fully ready for full automatic use. The automatic cycle is, of course, the normally used cycle for long runs of continuous manufacture whereby the bottles or other articles may be produced economically and in large volume. The many safety interlocks of this machine as hereinbefore described in detail insure that no part of the operation of the machine will take place unless all prerequisite conditions exist and the necessary circuits have been previously prepared. The machine is entirely adjustable in matters of feed, clamp and ram pressure, temperature control, time intervals and the like whereby it is adaptable to all types of thermoplastic material for constructing a wide variety of articles by the blow molding process.

It will be understood that many changes in the details of this invention may be made without, however, departing from the spirit thereof or the scope of the appended claims.

What is claimed is:

1. A machine for molding plastic articles comprising a centrally disposed parison mold and a pair of blow molds disposed one on either side of said parison mold; all of said molds comprising upper and lower mold halves; means for opening and closing all of said mold halves together; a pair of core rod means unitarily mounted together and projecting respectively between said parison mold halves and the halves of a first blow mold; means for laterally shifting said pair of core rod means whereby they are moved to a position projecting respectively between said parison mold halves and the halves of a second blow mold; injection means injecting plasticized molding material at said parison mold when one of said core rod means is between said parison mold halves in closed position and the other of said core rod means is between the closed halves of a blow mold; means operating concurrently with said injection means directing air through said other of said core rod means; electrical control means initiating and maintaining an automatic cycle of operation of said machine wherein the molds are alternately opened and closed, finished articles are ejected from the core rod means and said core rod means are shifted laterally each time the molds open, and parisons are injected upon one core rod means at the parison mold and other parisons are blown into finished articles at a blow mold each time the molds are closed; said injection means comprising compressing means actuatable to subject the molten plastic to pressure; nozzle means on said compressing means for directing the molten plastic into said parison mold; and valve means responsive to said control means mounted adjacent said nozzle means preventing injection of the plastic through said nozzle means for a predetermined length of time after actuation of said compressing means.

2. A machine for molding plastic articles comprising a centrally disposed parison mold and a pair of blow molds disposed one on either side of said parison mold; all of said molds comprising upper and lower mold halves; means for opening and closing all of said mold halves together; a pair of core rod means unitarily mounted together and projecting respectively between said parison mold halves and the halves of a first blow mold; means for laterally shifting said pair of core rod means whereby they are moved to a position projecting respectively between said parison mold halves and the halves of a second blow mold; injection means injecting plasticized molding material at said parison mold when one of said core rod means is between said parison mold halves in closed position and the other of said core rod means is between the closed halves of a blow mold; means operating concurrently with said injection means directing air through said other of said core rod means; electrical control means initiating and maintaining an automatic cycle of operation of said machine wherein the molds are alternately opened and closed, finished articles are ejected from the core rod means and said core rod means are shifted laterally each time the molds open, and parisons are injected upon one core rod means at the parison mold and other parisons are blown into finished articles at a blow mold each time the molds are closed; said injection means comprising a reciprocable ram; means for reciprocating said ram; said ram extending into a packing chamber at one end of said chamber; hopper means mounted above said packing chamber and feeding granulated thermoplastic material thereto; a heating chamber mounted to the other end of said packing chamber and having nozzle means for directing plasticized material into said parison mold; said ram movable from a fully retracted position to a fully extended position to compress the material in said heating chamber and eject the same through said nozzle means; said ram movable from said fully retracted position to an intermediate position during which motion said ram moves granulated material from said hopper through said packing chamber; said control means causing said ram to move between said fully retracted position and said intermediate position a plurality of times between each movement of said ram to a fully extended position; said valve means responsive to said control means mounted adjacent said nozzle means preventing injection of the plastic through said nozzle means during said plurality of movements between said fully retracted and said intermediate positions and during a portion of the movement between said intermediate position and said fully extended position.

3. A machine for molding plastic articles comprising a centrally disposed parison mold and a pair of blow molds disposed one on either side of said parison mold; all of said molds comprising upper and lower mold halves; means for opening and closing all of said mold halves together; a pair of core rod means unitarily mounted together and projecting respectively between said parison mold halves and the halves of a first blow mold; means for laterally shifting said pair of core rod means whereby they are moved to a position projecting respectively between said parison mold halves and the halves of a second blow mold; injection means injecting plasticized molding material at said parison mold when one of said core rod means is between said parison mold halves in closed position and the other of said core rod means is between the closed halves of a blow mold; means operating concurrently with said injection means directing air through said other of said core rod means; electrical control means initiating and maintaining an automatic cycle of operation of said machine wherein the molds are alternately opened and closed, finished articles are ejected from the core rod means and said core rod means are shifted laterally each time the molds open, and parisons are injected upon one core rod means at the parison mold and other parisons are blown into finished articles at a blow mold each time the molds are closed; said injection means comprising a heating chamber mounted adjacent said parison mold and having nozzle means at one end for injecting molten thermoplastic material into said parison mold; reciprocable ram means actuatable to compress molten material within said heating chamber and cause it to be injected into said parison mold; power means for moving said ram; said control means causing said ram to inject said material initially under high pressure and subsequently to maintain said material under a substantially lower pressure for a predetermined length of time after the parison mold has been filled.

4. A machine for molding plastic articles comprising a centrally disposed parison mold and a pair of blow molds disposed one on either side of said parison mold; all of said molds comprising upper and lower mold halves; means for opening and closing all of said mold halves together; a pair of core rod means unitarily mounted together and projecting respectively between said parison mold halves and the halves of a first blow mold; means for laterally shifting said pair of core rod means whereby they are moved to a position projecting respectively between said parison mold halves and the halves of a second blow mold; injection means injecting plasticized molding material at said parison mold when one of said core rod means is between said parison mold halves in closed position and the other of said core rod means is between the closed halves of a blow mold; means operating concurrently with said injection means directing air through said other of said core rod means; electrical control means initiating and maintaining an automatic cycle of operation of said machine wherein the molds are alternately opened and closed, finished articles are ejected from the core rod means and said core rod means are shifted laterally each time the molds open, and parisons are injected upon one core rod means at the parison mold and other parisons are blown into finished articles at a blow mold each time the molds are closed; said parison mold halves being provided with complementary, neck forming portions forming threaded necks on parisons molded therein; said blow molds having similar neck forming portions for receiving the threaded necks of the parison prior to blowing a finished article; said neck forming portions of said parison mold halves providing relatively smaller threads upon the parison than said neck forming portions of said blow molds whereby threads formed at said parison mold are subsequently increased in size at a blow mold during the blowing operation.

5. A machine for molding plastic articles comprising a centrally disposed parison mold and a pair of blow molds disposed one on either side of said parison mold; all of said molds comprising upper and lower mold halves; means for opening and closing all of said mold halves together; a pair of core rod means unitarily mounted together and projecting respectively between said parison mold halves and the halves of a first blow mold; means for laterally shifting said pair of core rod means whereby they are moved to a position projecting respectively between said parison mold halves and the halves of a second blow mold; injection means injecting plasticized molding material at said parison mold when one of said core rod means is between said parison mold halves in closed position and the other of said core rod means is between the closed halves of a blow mold; means operating concurrently with said injection means directing air through said other of said core rod means; electrical control means initiating and maintaining an automatic cycle of operation of said machine wherein the molds are alternately opened and closed, finished articles are ejected from the core rod means and said core rod means are shifted laterally each time the molds open, and parisons are injected upon one core rod means at the parison mold and other parisons are blown into finished articles at a blow mold each time the molds are closed; said means for laterally shifting the core rod means comprising a fixedly mounted piston having tubular, coaxial piston rods projecting outwardly from either end thereof for alternately introducing and exhausting fluid on either side of said piston; the outer ends of said piston rods rigidly mounted to frame means which also supports all of said molds; a housing supporting said core rod means and having a cylindrical bore by means of which it is telescoped over said piston and piston rods, said bore and piston closely interfitted; closure means at either end of said bore for sealing said bore relative to said piston rods; each piston rod having an internal ball check valve adjacent said piston preventing outward flow of fluid through the piston rod and permitting inward flow therethrough; each piston rod having a pair of lateral flow passages connected to the interior thereof and disposed respectively outwardly and inwardly of said ball check valve; each said closure means having fluid restriction means adapted to encompass the outwardly disposed lateral flow passage of its respective piston rod during a final portion of movement of said housing in one direction whereby the flow of exhausting fluid is restricted to cushion the final movement of said housing.

6. A machine for molding plastic articles comprising a centrally disposed parison mold and a pair of blow molds disposed one on either side of said parison mold; all of said molds comprising upper and lower mold halves; means for opening and closing all of said mold halves together; a pair of core rod means unitarily mounted together and projecting respectively between said parison mold halves and the halves of a first blow mold; means for laterally shifting said pair of core rod means whereby they are moved to a position projecting respectively between said parison mold halves and the halves of a second blow mold; injection means injecting plasticized molding material at said parison mold when one of said core rod means is between said parison mold halves in closed position and the other of said core rod means is between the closed halves of a blow mold; means operating concurrently with said injection means directing air through said other of said core rod means; electrical control means initiating and maintaining an automatic cycle of operation of said machine wherein the molds are alternately opened and closed, finished articles are ejected from the core rod means and said core rod means are shifted laterally each time the molds open, and parisons are injected upon one core rod means at the parison mold and other parisons are blown into finished articles at a blow mold each time the molds are closed; said core rod means including valve means having exposed, operating portions; each core rod means having a cylinder and reciprocable piston rod mounted unitarily therewith; a pusher bar mounted upon the distal end of each piston rod in such manner that extension of said piston rod brings said pusher bar into operating contact with said operating portions; a stripper plate slidably mounted to each said core rod means in such manner that any article disposed on said core rod means is ejected therefrom by movement of said stripper plate; each said stripper plate connected to its associated pusher bar and moved thereby whereby when said piston rod is extended, said pusher bar opens said valve means and said stripper plate is moved at the same time; and means directing air to said cylinder to extend said piston rod simultaneously with the directing of air at ejection pressure to said core rod means.

7. A blow molding machine for making hollow articles comprising, a central parison mold and a pair of blow molds disposed one on either side of said parison mold, said molds comprising lower fixed and upper movable halves; a laterally and vertically shiftable table disposed in front of said molds; a pair of core rod means mounted on said table and so laterally spaced as to be alternatively projected between the halves of pairs of adjacent molds, one of which is always said parison mold; an injection assembly disposed behind said parison mold in such position as to inject parisons upon either of said core rod means when said core rod means is disposed between closed halves of said parison mold; said injection assembly comprising a heating chamber, a hopper for holding granulated plastic material, and a reciprocable ram for loading the material into said heating chamber and subjecting plasticized material in said chamber to injection pressure; valve means mounted to said heating chamber for controlling the flow of plasticized material therefrom; pneumatic means for delivering air at different pressures to be expelled through said core rod means; means for opening and closing said molds together; means for vertically and laterally shifting said table; means for reciprocating said ram; means for opening said valve means; electrical control means initiating and maintaining an automatic cycle of operation of said machine wherein the molds are alternately opened and closed; both core rod means are raised, finished articles are ejected therefrom, and they are subsequently shifted laterally and then lowered each time the molds are opened, and parisons are injected upon one core rod means at the parison mold and other parisons are blown into finished articles at a blow mold each time the molds are closed; said control means including safety interlock means responsive to the closing movement of said molds; said means for vertically and laterally shifting said table being responsive as to its lateral movement to said safety interlock means; said safety interlock means initiating a lateral shifting of said table only when said molds are fully open.

8. A blow molding machine for making hollow articles comprising, a central parison mold and a pair of blow molds disposed one on either side of said parison mold, said molds comprising lower fixed and upper movable halves; a laterally and vertically shiftable table disposed in front of said molds; a pair of core rod means mounted on said table and so laterally spaced as to be alternatively projected between the halves of pairs of adjacent molds, one of which is always said parison mold; an injection assembly disposed behind said parison mold in such position as to inject parisons upon either of said core rod means when said core rod means is disposed between closed halves of said parison mold; said injection assembly comprising a heating chamber, a hopper for holding granulated plastic material, and a reciprocable ram for loading the material into said heating chamber and subjecting plasticized material in said chamber to injection pressure; valve means mounted to said heating chamber for controlling the flow of plasticized material therefrom; pneumatic means for delivering air at different pressures to be expelled through said core rod means; means for opening and closing said molds together; means for vertically and laterally shifting said table; means for reciprocating said ram; means for opening said valve means; electrical control means initiating and maintaining an automatic cycle of operation of said machine wherein the molds are alternately opened and closed; both core rod means are raised, finished articles are ejected therefrom, and they are subsequently shifted laterally and then lowered each time the molds are opened, and parisons are injected upon one core rod means at the parison mold and other parisons are blown into finished articles at a blow mold each time the molds are closed; said control means including switches separately responsive to the closing movements of the respective molds; said means for vertically and laterally shifting said table being responsive as to its lateral movement to the actuation of all of said switches; said switches initiating a lateral movement of said table only when all of said molds are fully open.

9. A blow molding machine for making hollow articles comprising, a central parison mold and a pair of blow molds disposed one on either side of said parison mold, said molds comprising lower fixed and upper movable halves; a laterally and vertically shiftable table disposed in front of said molds; a pair of core rod means mounted on said table and so laterally spaced as to be alternatively projected between the halves of pairs of adjacent molds, one of which is always said parison mold; an injection assembly disposed behind said parison mold in such position as to inject parisons upon either of said core rod means when said core rod means is disposed between closed halves of said parison mold; said injection assembly comprising a heating chamber, a hopper for holding granulated plastic material, and a reciprocable ram for loading the material into said heating chamber and subjecting plasticized material in said chamber to injection pressure; valve means mounted to said heating chamber for controlling the flow of plasticized material therefrom; pneumatic means for delivering air at different pressures to be expelled through said core rod means; means for opening and closing said molds together; means for vertically and laterally shifting said table; means for reciprocating said ram; means for opening said valve means; electrical control means initiating and maintaining an automatic cycle of operation of said machine wherein the molds are alternately opened and closed; both core rod means are raised, finished articles are ejected therefrom, and they are subsequently shifted laterally and then lowered each time the molds are opened, and parisons are injected upon one core rod means at the parison mold and other parisons are blown into finished articles at a blow mold each time the molds are closed; said control means including safety interlock means responsive to the vertical shifting of said table; said means for opening and closing said molds being responsive as to its closing movement to said safety interlock; said safety interlock means initiating a closing movement of said molds only when said table is in its lowermost position.

10. A blow molding machine for making hollow articles comprising, a central parison mold and a pair of blow molds disposed one on either side of said parison mold, said molds comprising lower fixed and upper movable halves; a laterally and vertically shiftable table disposed in front of said molds; a pair of core rod means mounted on said table and so laterally spaced as to be alternatively projected between the halves of pairs of adjacent molds, one of which is always said parison mold; an injection assembly disposed behind said parison mold in such position as to inject parisons upon either of said core rod means when said core rod means is disposed between closed halves of said parison mold; said injection assembly comprising a heating chamber, a hopper for holding granulated plastic material, and a reciprocable ram for loading the material into said heating chamber and subjecting plasticized material in said chamber to injection pressure; valve means mounted to said heating chamber for controlling the flow of plasticized material therefrom; pneumatic means for delivering air at different pressures to be expelled through said core rod means; means for opening and closing said molds together; means for vertically and laterally shifting said table; means for reciprocating said ram; means for opening said valve means; electrical control means initiating and maintaining an automatic cycle of operation of said machine wherein the molds are alternately opened and closed; both core rod means are raised, finished articles are ejected therefrom, and they are subsequently shifted laterally and then lowered each time the molds are opened, and parisons are injected upon one core rod means at the parison mold and other parisons are blown into finished articles at a blow mold each time the molds are closed; said control means including a pair of switches having operating members which respectively project between the parison mold and one of said blow molds in the area traversed by said core rod means when said core rod means are laterally shifted; each said core rod means passing close to but not contacting one of said operating members when being laterally shifted from a blow mold to said parison mold; said control means being connected through said switches whereby actuation of either switch de-energizes said control means; said operating members so positioned relative to said core rod means that a finished article or ruptured parison remaining on either said core rod means, when said core rod means is laterally shifted from a blow mold to the parison mold, contacts one of said operating members and actuates the respective switch connected thereto, said pair of switches being ineffective to de-energize said control means when struck by a core rod means moving from said parison mold to a blow mold.

11. A blow molding machine for making hollow articles comprising, a central parison mold and a pair of blow molds disposed one on either side of said parison mold, said molds comprising lower fixed and upper movable halves; a laterally and vertically shiftable table disposed in front of said molds; a pair of core rod means mounted on said table and so laterally spaced as to be alternatively projected between the halves of pairs of adjacent molds, one of which is always said parison mold; an injection assembly disposed behind said parison mold in such position as to inject parisons upon either of said core rod means when said core rod means is disposed between closed halves of said parison mold; said injection assembly comprising a heating chamber, a hopper for holding granulated plastic material, and a reciprocable ram for loading the material into said heating chamber and subjecting plasticized material in said chamber to injection pressure; valve means mounted to said heating chamber for controlling the flow of plasticized material therefrom; pneumatic means for delivering air at different pressures to be expelled through said core rod means; means for opening and closing said molds together; means for vertically and laterally shifting said table; means for reciprocating said ram; means for opening said valve means; electrical control means initiating and maintaining an automatic cycle of operation of said machine wherein the molds are alternately opened and closed; both core rod means are raised, finished articles are ejected therefrom, and they are subsequently shifted laterally and then lowered each time the molds are opened, and parisons are injected upon one core rod means at the parison mold and other parisons are blown into finished articles at a blow mold each time the molds are closed; said control means including safety interlock means responsive to the lateral shifting of said table; said means for vertically and laterally shifting said table being responsive as to its vertical movement only to the said safety interlock means; said safety interlock means initiating the downward movement of said table only when said table is fully shifted in one lateral direction.

12. A blow molding machine for making hollow articles comprising, a central parison mold and a pair of blow molds disposed one on either side of said parison mold, said molds comprising lower fixed and upper movable halves; a laterally and vertically shiftable table disposed in front of said molds; a pair of core rod means mounted on said table and so laterally spaced as to be alternatively projected between the halves of pairs of adjacent molds, one of which is always said parison mold; an injection assembly disposed behind said parison mold in such position as to inject parisons upon either of said core rod means when said core rod means is disposed between closed halves of said parison mold; said injection assembly comprising a heating chamber, a hopper for holding granulated plastic material, and a reciprocable ram for loading the material into said heating chamber and subjecting plasticized material in said chamber to injection pressure; valve means mounted to said heating chamber for controlling the flow of plasticized material therefrom; pneumatic means for delivering air at different pressures to be expelled through said core rod means; means for opening and closing said molds together; means for vertically and laterally shifting said table; means for reciprocating said ram; means for opening said valve means; electrical control means initiating and maintaining an automatic cycle of operation of said machine wherein the molds are alternately opened and closed; both core rod means are raised, finished articles are ejected therefrom, and they are subsequently shifted laterally and then lowered each time the molds are opened, and parisons are injected upon one core rod means at the parison mold and other parisons are blown into finished articles at a blow mold each time the molds are closed; said control means including safety interlock means responsive to the closing of the molds; said pneumatic means being responsive to said safety interlock means; said safety interlock means actuating said pneumatic means to blow finished articles at one of said blow molds only when said blow molds are in a closed position.

13. A blow molding machine for making hollow articles comprising, a central parison mold and a pair of blow molds disposed one on either side of said parison mold, said molds comprising lower fixed and upper movable halves; a laterally and vertically shiftable table disposed in front of said molds; a pair of core rod means mounted on said table and so laterally spaced as to be alternatively projected between the halves of pairs of adjacent molds, one of which is always said parison mold; an injection assembly disposed behind said parison mold in such position as to inject parisons upon either of said core rod means when said core rod means is disposed between closed halves of said parison mold; said injection assembly comprising a heating chamber, a hopper for holding granulated plastic material, and a reciprocable ram for loading the material into said heating chamber and subjecting plasticized material in said chamber to injection pressure; valve means mounted to said heating chamber for controlling the flow of plasticized material therefrom; pneumatic means for delivering air at different pressures to be expelled through said core rod means; means for opening and closing said molds together; means for vertically and laterally shifting said table; means for reciprocating said ram; means for opening said valve means; electrical control means initiating and maintaining an automatic cycle of operation of said machine wherein the molds are alternately opened and closed; both core rod means are raised, finished articles are ejected therefrom, and they are subsequently shifted laterally and then lowered each time the molds are opened, and parisons are injected upon one core rod means at the parison mold and other parisons are blown into finished articles at a blow mold each time the molds are closed; said control means including a pair of switches respectively responsive to the closing of said blow molds; said pneumatic means being responsive to actuation of both said switches; said switches actuating said pneumatic means to blow finished articles at one of said blow molds only when said blow molds are in closed position whereby both said switches are tripped.

14. A blow molding machine for making hollow articles comprising, a central parison mold and a pair of blow molds disposed one on either side of said parison mold, said molds comprising lower fixed and upper movable halves; a laterally and vertically shiftable table disposed in front of said molds; a pair of core rod means mounted on said table and so laterally spaced as to be alternatively projected between the halves of pairs of adjacent molds, one of which is always said parison mold; an injection assembly disposed behind said parison mold in such position as to inject parisons upon either of said core rod means when said core rod means is disposed between closed halves of said parison mold; said injection assembly comprising a heating chamber, a hopper for holding granulated plastic material, and a reciprocable ram for loading the material into said heating chamber and subjecting plasticized material in said chamber to injection pressure; valve means mounted to said heating chamber for controlling the flow of plasticized material therefrom; pneumatic means for delivering air at different pressures to be expelled through said core rod means; means for opening and closing said molds together; means for vertically and laterally shifting said table; means for reciprocating said ram; means for opening said valve means; electrical control means initiating and maintaining an automatic cycle of operation of said machine wherein the molds are alternately opened and closed; both core rod means are raised, finished articles are ejected therefrom, and they are subsequently shifted laterally and then lowered each time the molds are opened, and parisons are injected upon one core rod means at the parison mold and other parisons are blown into finished articles at a blow mold each time the molds are closed; said control means including safety interlock means responsive to a portion of the opening movement of said molds in such a way that said safety interlock is actuated only after said molds have opened a predetermined distance; and said means for vertically and laterally shifting said table responsive as to its vertically upward movement to actuation of said safety interlock means.

15. A safety interlock control system for an automatic blow molding machine having a parison mold and two flanking blow molds with fixed lower and vertically movable upper halves, a pair of unitarily mounted core rod means sequentially shiftable upwardly, laterally, and downwardly from positions within one lower blow mold half and said lower parison mold half to positions respectively within said lower parison mold half and the other lower blow mold half each time said molds open, and injection means injecting parisons on that one of said core rod means at said parison mold and blowing parisons into finished articles at one of said blow molds each time said molds close; said safety interlock system comprising means preventing injection at the parison mold unless the molds are closed; means preventing blowing of the parisons unless the molds are closed; means preventing upward movement of said core rod means until after said molds have started to open; means preventing the clamps from closing while the core rod means are in a raised position; means preventing the core rod means from shifting laterally unless the molds are fully open; means preventing the molds from closing unless the core rod means is fully laterally shifted; means preventing the core rod means from moving downwardly unless the core rod means are fully laterally shifted; and means stopping the machine if a blown article remains on one of the core rod means during a lateral shifting of said core rod means.

16. A safety interlock control system for an automatic blow molding machine having a parison mold and two flanking blow molds with fixed lower and vertically movable upper halves, a pair of unitarily mounted core rod means sequentially shiftable upwardly, laterally, and downwardly from positions within one lower blow mold half and said lower parison mold half to positions respectively within said lower parison mold half and the other lower blow mold half each time said molds open, stripper means slidable on each core rod means and having means extending it to eject blow bottles from said core rod means after blowing and when the molds are open, and injection means injecting parisons on that one of said core rod means at said parison mold and blowing parisons into finished articles at one of said blow molds each time said molds close; said safety interlock system comprising means preventing injection at the parison mold unless the molds are closed; means preventing blowing of the parisons unless the molds are closed; means preventing upward movement of said core rod means until after said molds have started to open; means preventing the clamps from closing while the core rod means are in a raised position; means preventing the core rod means from shifting laterally unless the molds are fully open; means preventing the molds from closing unless the core rod means is fully laterally shifted; means preventing the core rod means from moving downwardly unless the core rod means are fully laterally shifted; means preventing the core rod means from moving downwardly unless the stripper means is fully retracted; and means stopping the machine if a blown article remains on one of the core rod means during a lateral shifting of said core rod means.

17. Core rod means for a blow molding machine comprising a core rod holder; a spindle mounted at one end thereof in said holder having a distal end thereof projecting outwardly from said holder; said spindle having valve means therein admitting and exhausting fluid from said distal end; said valve means having an operative member projecting from the mounted end of said spindle beyond said holder; a pusher bar disposed adjacent said operative member; an apertured stripper plate telescoped over said distal end and normally disposed adjacent said holder; means connecting said pusher bar and said stripper-plate for unitary movement in the direction of the axis of said spindle; reciprocable power means connected to said pusher bar in such manner that when actuated said stripper-plate moves outwardly along said distal end and said pusher bar is moved into contact with said operative member to open said valve means.

18. Core rod means as set forth in claim 17 including a pair of mold sections adapted to close upon said distal end of said spindle; clamp means reciprocatively moving one of said sections to close upon the other section; actuating means mounted to said clamp means in such manner that when said clamp means closes said mold sections, said actuating means contacts said operative member and opens said valve means.

19. Core rod means as set forth in claim 18 wherein the recited spindle has a longitudinal bore therethrough; said valve means comprising a hollow valve stem slidably seated in said bore; a tube mounted coaxially inside said valve stem and spaced from the inner periphery thereof; a valve head mounted upon and enclosing the end of said valve stem and adapted upon axial movement of said valve stem in the direction of the mounted end of said spindle to close the distal end of said spindle; spring means biasing said valve stem in the direction of the mounted end of said spindle; air passage means provided between said valve stem and said spindle whereby air introduced adjacent the mounted end of said spindle exhausts between said valve head and the distal end of said spindle; said operative member connected to said valve stem; means introducing a fluid temperature regulating medium into said tube adjacent said mounting end; and a means exhausting said medium from said valve stem adjacent the point of entry.

20. Injection means for injecting molten plastic into a mold of a plastic molding machine, said injection means comprising a reciprocable ram; means for reciprocating said ram; said ram extending into a packing chamber at one end of said chamber; hopper means mounted above said packing chamber and feeding granulated thermo-plastic material thereto; a heating chamber mounted to the other end of said packing chamber and having nozzle means for directing plasticized material into a mold of a plastic molding machine, said ram movable from a fully retracted position to a fully extended position to compress the material in said heating chamber and eject the same through said nozzle means; said ram movable from said fully retracted position to an intermediate position during which motion said ram moves granulated material from said hopper through said packing chamber; control means causing said ram to move between said fully retracted position and said intermediate position a plurality of times between each movement of said ram to a fully extended position; and valve means response to said control means mounted adjacent said nozzle means preventing injection of the plastic through said nozzle means during said plurality of movements between said fully retracted and said intermediate positions and during a portion of the movement between said intermediate position and said fully extended position.

References Cited in the file of this patent

UNITED STATES PATENTS

| | | | |
|---|---|---|---|
| 2,298,716 | Moreland | Oct. 13, | 1942 |
| 2,330,668 | Biggs | Sept. 28, | 1943 |
| 2,336,162 | Bridges | Dec. 7, | 1943 |
| 2,552,679 | Hogeman | May 15, | 1951 |
| 2,803,852 | Cook | Aug. 27, | 1957 |
| 2,853,736 | Gussoni | Sept. 30, | 1958 |
| 2,854,691 | Strong | Oct. 7, | 1958 |
| 2,864,124 | Strauss | Dec. 16, | 1958 |
| 2,872,700 | Knowles | Feb. 10, | 1959 |
| 2,962,227 | Whitehurst | Nov. 29, | 1960 |
| 2,974,362 | Knowles | Mar. 14, | 1961 |
| 3,011,216 | Gussoni | Dec. 5, | 1961 |
| 3,029,468 | Valyi | Apr. 17, | 1962 |

FOREIGN PATENTS

| | | | |
|---|---|---|---|
| 154,343 | Australia | Nov. 27, | 1953 |
| 568,485 | Belgium | June 30, | 1958 |
| 1,192,475 | France | Apr. 20, | 1959 |
| 746,505 | Great Britain | Mar. 14, | 1956 |